US010558830B2

United States Patent
Havas et al.

(10) Patent No.: US 10,558,830 B2
(45) Date of Patent: Feb. 11, 2020

(54) SYSTEM AND METHOD FOR ACTIVITY MONITORING

(71) Applicant: PILLDRILL, INC., Las Vegas, NV (US)

(72) Inventors: Peter Roy Havas, Las Vegas, NV (US); Cameron John Carrett, Sydney (AU)

(73) Assignee: PillDrill, Inc., Las Vegas, NV (US)

( * ) Notice: Subject to any disclaimer, the term of this patent is extended or adjusted under 35 U.S.C. 154(b) by 0 days.

(21) Appl. No.: 15/549,677

(22) PCT Filed: Feb. 17, 2016

(86) PCT No.: PCT/US2016/018349
§ 371 (c)(1),
(2) Date: Aug. 9, 2017

(87) PCT Pub. No.: WO2016/134074
PCT Pub. Date: Aug. 25, 2016

(65) Prior Publication Data
US 2018/0046833 A1 Feb. 15, 2018

Related U.S. Application Data

(60) Provisional application No. 62/117,878, filed on Feb. 18, 2015.

(51) Int. Cl.
*G06K 7/08* (2006.01)
*G06K 7/10* (2006.01)
*G06Q 10/10* (2012.01)

(52) U.S. Cl.
CPC ..... *G06K 7/10386* (2013.01); *G06Q 10/1095* (2013.01)

(58) Field of Classification Search
CPC ..... A61J 7/0418; A61J 7/0436; G11B 7/0045; G11B 7/00736; G06Q 50/22;
(Continued)

(56) References Cited

U.S. PATENT DOCUMENTS 4,016,544 A * 4/1977 Morita .................. G09G 5/022
345/550
4,419,016 A 12/1983 Zoltan
(Continued)

FOREIGN PATENT DOCUMENTS

DE 3818705 A1 7/1989
EP 298627 A2 1/1989
(Continued)

OTHER PUBLICATIONS

Agarawala et al.; The context-aware pill bottle and medication monitor; Video Porceedings / Porceedings Supplement of the UBICOMP 2004 Conference; (year of pub. sufficiently earlier than effective US filing date and any foreign priority date) 2004.
(Continued)

*Primary Examiner* — Thien T Mai
(74) *Attorney, Agent, or Firm* — Shay Glenn LLP

(57) ABSTRACT

Aspects of the present invention provides a system for monitoring and reminding a user of specific activities. In one embodiment, a machine detectable element is provided to an appropriate contactless reader that, when read, provides a proxy for the user completing the activity. Schedule and adherence information may be provided via a display-containing portable electronic device that may also be configured as the contactless reader. The system may also be configured to provide reminders or other information to the user or third parties.

24 Claims, 40 Drawing Sheets

(58) Field of Classification Search
CPC ...... G06Q 10/087; G06Q 10/08; G06Q 10/00;
G06Q 10/083; G06Q 10/06; G06Q 10/10;
G06Q 40/08; G06Q 50/24; G06Q
10/0832; G06Q 10/1093; G06Q 20/203;
G06Q 30/0185; G06Q 30/06; G06Q
30/0631; G06Q 50/00; G06Q 50/26;
G06K 7/1413; G06K 7/10366; G06K
19/06028; G06K 19/06037; G06K
7/1417; G06K 7/10297; G06K 7/10861;
G06K 15/024; G06K 15/4095; G06K
19/0717; G06K 19/0723; G06K
19/07773; G06K 2007/10524; G06K
2209/17; G06K 5/00; G06K 7/10; G06K
7/10405; G06K 7/10445; G06K 7/10712;
G06K 7/10792; G06K 7/10881; G06K
9/00; G06K 9/00362; G06K 9/00664;
G06K 9/00771; G06K 9/4652; G06K
9/52; G06K 9/6215; G06K 9/6285
See application file for complete search history.

(56) References Cited

U.S. PATENT DOCUMENTS

| | | |
|---|---|---|
| 4,473,156 A | 9/1984 | Martin |
| 4,490,711 A | 12/1984 | Johnston |
| 4,616,316 A | 10/1986 | Hanpeter et al. |
| 4,617,557 A | 10/1986 | Gordon |
| 4,695,954 A | 9/1987 | Rose et al. |
| 4,768,176 A | 8/1988 | Kehr et al. |
| 4,803,625 A | 2/1989 | Fu et al. |
| 4,811,845 A | 3/1989 | Baggett |
| 4,823,982 A | 4/1989 | Aten et al. |
| 4,837,719 A | 6/1989 | McIntosh et al. |
| 4,857,716 A | 8/1989 | Gombrich et al. |
| 4,911,327 A | 3/1990 | Shepherd et al. |
| 4,975,842 A | 12/1990 | Darrow et al. |
| 5,053,774 A | 10/1991 | Schuermann et al. |
| 5,059,951 A | 10/1991 | Kaltner |
| 5,157,640 A | 10/1992 | Backner |
| 5,177,800 A | 1/1993 | Coats |
| 5,200,891 A | 4/1993 | Kehr et al. |
| 5,239,491 A | 8/1993 | Mucciacciaro |
| 5,289,157 A | 2/1994 | Rudick et al. |
| 5,291,399 A | 3/1994 | Chaco |
| 5,319,185 A | 6/1994 | Obata |
| 5,340,972 A | 8/1994 | Sandor |
| 5,347,453 A | 9/1994 | Maestre |
| 5,390,238 A | 2/1995 | Kirk et al. |
| 5,408,443 A | 4/1995 | Weinberger |
| 5,410,140 A | 4/1995 | Bard et al. |
| 5,465,082 A | 11/1995 | Chaco |
| 5,548,291 A | 8/1996 | Meier et al. |
| 5,557,096 A | 9/1996 | Watanabe et al. |
| 5,577,335 A | 11/1996 | Tucker |
| 5,602,377 A | 2/1997 | Beller et al. |
| 5,602,802 A | 2/1997 | Leigh Spencer et al. |
| 5,612,869 A | 3/1997 | Letzt et al. |
| 5,616,901 A | 4/1997 | Crandall |
| 5,619,991 A | 4/1997 | Sloane |
| 5,640,002 A | 6/1997 | Ruppert et al. |
| 5,642,731 A | 7/1997 | Kehr |
| 5,646,592 A | 7/1997 | Tuttle |
| 5,646,912 A | 7/1997 | Cousin |
| 5,657,236 A | 8/1997 | Conkright |
| 5,700,998 A | 12/1997 | Palti |
| 5,706,258 A | 1/1998 | Poe et al. |
| 5,708,627 A | 1/1998 | Gormley |
| 5,719,780 A | 2/1998 | Holmes et al. |
| 5,745,366 A | 4/1998 | Higham et al. |
| 5,751,660 A | 5/1998 | Chappell |
| 5,752,235 A | 5/1998 | Kehr et al. |
| 5,762,235 A | 6/1998 | Coughlin |
| 5,774,865 A | 6/1998 | Glynn |
| 5,805,051 A | 9/1998 | Herrmann et al. |
| 5,812,064 A | 9/1998 | Barbour |
| 5,812,410 A | 9/1998 | Lion et al. |
| 5,822,544 A | 10/1998 | Chaco et al. |
| 5,826,217 A | 10/1998 | Lerner |
| 5,827,180 A | 10/1998 | Goodman |
| 5,835,455 A | 11/1998 | Hanson et al. |
| 5,838,224 A | 11/1998 | Andrews |
| 5,839,108 A | 11/1998 | Daberko et al. |
| 5,850,344 A | 12/1998 | Conkright |
| 5,852,590 A | 12/1998 | de La Huerga |
| 5,899,335 A | 5/1999 | Boyer et al. |
| 5,899,855 A | 5/1999 | Brown |
| 5,905,653 A | 5/1999 | Higham et al. |
| 5,912,818 A | 6/1999 | McGrady et al. |
| 5,915,558 A | 6/1999 | Girvetz |
| 5,917,174 A | 6/1999 | Moore et al. |
| 5,917,429 A | 6/1999 | Otis et al. |
| 5,958,536 A | 9/1999 | Gelsinger et al. |
| 5,963,136 A | 10/1999 | O'Brien |
| 5,971,279 A | 10/1999 | Raistrick et al. |
| 5,971,594 A | 10/1999 | Sahai et al. |
| 5,990,782 A | 11/1999 | Lee |
| 5,992,742 A | 11/1999 | Sullivan et al. |
| 6,004,020 A | 12/1999 | Bartur |
| 6,008,727 A | 12/1999 | Want et al. |
| 6,014,346 A | 1/2000 | Malone |
| 6,018,289 A | 1/2000 | Sekura et al. |
| 6,021,392 A | 2/2000 | Lester et al. |
| 6,032,155 A | 2/2000 | de La Huerga |
| 6,088,695 A | 7/2000 | Kara |
| 6,194,995 B1 | 2/2001 | Gates |
| 6,203,430 B1 | 3/2001 | Walker et al. |
| 6,294,999 B1 | 9/2001 | Yarin et al. |
| 6,335,907 B1 | 1/2002 | Momich et al. |
| 6,490,054 B1* | 12/2002 | Matsui ............... G11B 7/0045 |
| | | 358/1.16 |
| 6,588,670 B2 | 7/2003 | Bukowski |
| 6,637,649 B2 | 10/2003 | Walsh |
| 6,687,190 B2 | 2/2004 | Momich et al. |
| 6,751,730 B1 | 6/2004 | Walker et al. |
| 6,877,658 B2 | 4/2005 | Raistrick et al. |
| 7,216,802 B1* | 5/2007 | De La Huerga .... G06F 19/3462 |
| | | 235/380 |
| 7,366,675 B1 | 4/2008 | Walker et al. |
| 7,646,294 B2 | 1/2010 | Kow et al. |
| 7,702,421 B2 | 4/2010 | Sullivan et al. |
| 7,810,726 B2 | 10/2010 | de la Huerga |
| 7,993,055 B2 | 8/2011 | Nurse et al. |
| 8,055,509 B1 | 11/2011 | Walker et al. |
| 8,154,390 B2 | 4/2012 | Heath et al. |
| 8,196,185 B2 | 6/2012 | Geadelmann et al. |
| 8,224,667 B1 | 7/2012 | Miller et al. |
| 8,239,922 B2 | 8/2012 | Sullivan et al. |
| 8,332,240 B1 | 12/2012 | Garver et al. |
| 8,402,382 B2 | 3/2013 | Agarawala et al. |
| 8,407,611 B2 | 3/2013 | Zhang et al. |
| 8,429,565 B2 | 4/2013 | Agarawala et al. |
| 8,648,713 B2 | 2/2014 | Garavaglia et al. |
| 8,648,716 B2 | 2/2014 | Steinmetz |
| 8,856,675 B1 | 10/2014 | Agarawala et al. |
| 2006/0065713 A1 | 3/2006 | Kingery |
| 2008/0030309 A1 | 2/2008 | Darrouzet |
| 2008/0172253 A1 | 7/2008 | Chung et al. |
| 2008/0303638 A1 | 12/2008 | Nguyen et al. |
| 2009/0057428 A1 | 3/2009 | Geadelmann et al. |
| 2009/0125825 A1 | 5/2009 | Rye et al. |
| 2009/0294521 A1 | 12/2009 | de La Huerga |
| 2010/0052548 A1* | 3/2010 | Allard ................. G09G 3/3413 |
| | | 315/154 |
| 2010/0094656 A1 | 4/2010 | Conant |
| 2010/0145479 A1 | 6/2010 | Griffiths |
| 2011/0018849 A1 | 1/2011 | Lowe et al. |
| 2011/0264033 A1 | 10/2011 | Jensen et al. |
| 2011/0298587 A1 | 12/2011 | Walz |
| 2012/0056000 A1* | 3/2012 | Shores ................ A61J 7/0418 |
| | | 235/492 |
| 2012/0313785 A1 | 12/2012 | Hanson et al. |
| 2013/0265231 A1 | 10/2013 | Cleveland et al. |

(56) References Cited

U.S. PATENT DOCUMENTS

| | | | |
|---|---|---|---|
| 2014/0164938 A1 | 6/2014 | Petterson et al. | |
| 2014/0166529 A1 | 6/2014 | Fung et al. | |
| 2014/0263423 A1* | 9/2014 | Akdogan | A61J 7/0076 222/23 |
| 2018/0046833 A1* | 2/2018 | Havas | G06Q 10/06 |

FOREIGN PATENT DOCUMENTS

| | | | |
|---|---|---|---|
| GB | 2233317 A | 1/1991 | |
| WO | WO98/038909 A1 | 9/1998 | |
| WO | WO2011/031492 A1 | 3/2011 | |
| WO | WO2013/127564 A1 | 9/2013 | |
| WO | WO2013/152128 A1 | 10/2013 | |
| WO | WO2014/037850 A2 | 3/2014 | |

OTHER PUBLICATIONS

Connectthings; Fast path to patient-fass on the web; retrieved from the internet (http://www.connecthings.com/press/press991209_eng.htm); 1 page; (Press Release); Dec. 9, 1999.

Covin; Re: bar code search engine; retrieved from the internet (http://wearables.blu.org/wear-hard/199999165.htm); 1 page; Dec. 12, 1999.

Crabb; Mastering the code to independence; The Braille Forum; vol. XXXVI(12); The American Council of the Blind; retrived from the internet (http://acb.org/sites/default/files/bf/1998/bf0698.html#bf09); 5 pages; Jun. 1998.

Fishkin et al.; A flexible, low-overhead ubiquitous system for medication monitoring; InIn: Intel Research; retrieved from the internet (https://pdfs.semanticscholar.org/eb62/0eb18dd12bb5fd82aaad3d5dabaca83b4a32.pdf); 21 pages; Oct. 2003.

Ho et al.; A prototype on RFID and sensor networks for elder healthcare: progress report; In Porceedings of the 2005 ACM SIGCOMM workshop on Experimental approaches to wireless network design and analysis; pp. 70-75; Aug. 22, 2005.

McCall et al.; A system that implements automatic medication management and passive remote monitoring to enable independent living of healthcare patients; University of Central Florida; (Doctoral Dissertation); 120 pages; retrieved from the internet (http://www.eecs.ucf.edu/~czotu/research/McCall_HIM_Thesis.pdf); (year of pub. sufficiently earlier than effective US filing date and any foreign priority date) Fall 2010.

McCall et al.; An automatic medication self-management and monitoring system for independently living patients; Med. Eng. Phys.; 35(4); pp. 505-514; doi:10.1016/j.medengphy.2012.06.018; (Author Manuscript); Apr. 2013.

McCall et al.; RMAIS-based medication adherence intelligence system; In Engineering Medicine and Biology Society (EMBC); 2010 Annual International Conference of the IEEE; pp. 3768-3771; Aug. 31, 2010.

Shapiro; Doctoring a sickly system: deadly medical mistakes are rampant. On expert thinks thay can be avoided; US News and World Report; 127(3); pp. 60-61; Dec. 13, 1999.

Shieh et al.; RFID medicine management system; In Machine Learning and Cybernetics (ICMLC); 2012 International Conference, IEEE; vol. 5; pp. 1890-1894; Jul. 15, 2012.

Electronic Specifier Wireless; UHF RFID reader and long range rfid reader; 4 pages; retrieved from the internet (https://wireless.electronicspecifier.com/wireless/uhf-rfid-reader--long-range-rfid-reader); on Mar. 28. 2019.

\* cited by examiner

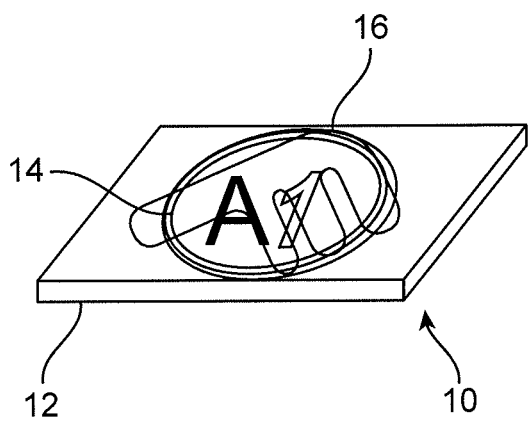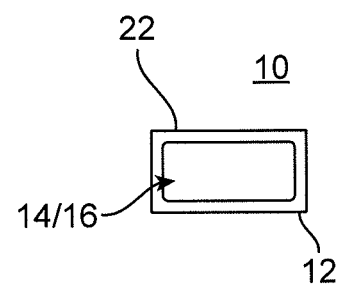
FIG. 1E  FIG. 1F
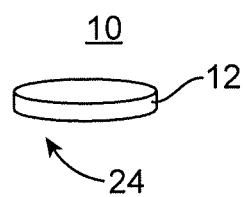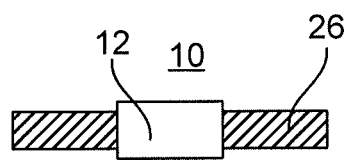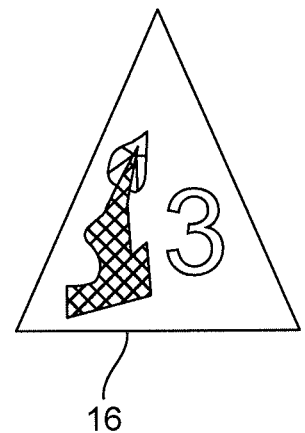
FIG. 1G  FIG. 1H  FIG. 1I

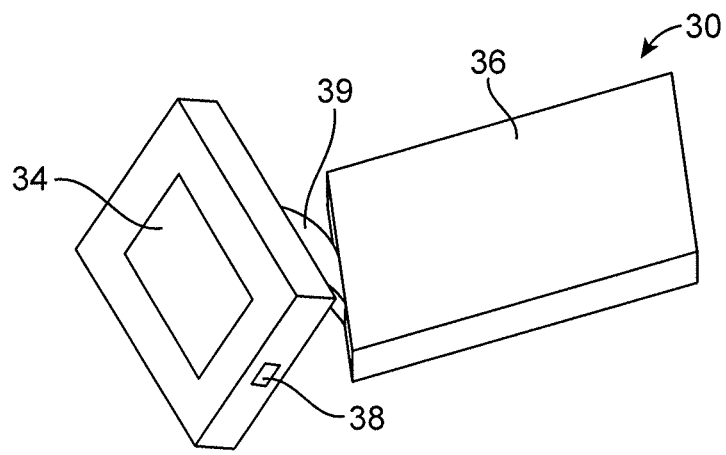
FIG. 2C1
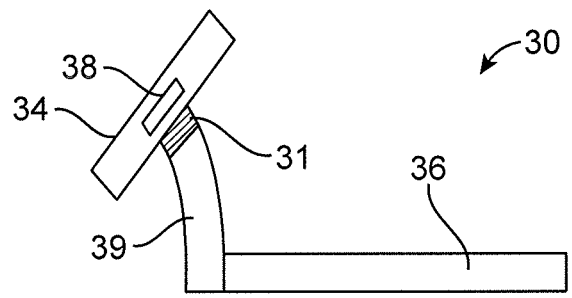
FIG. 2C2
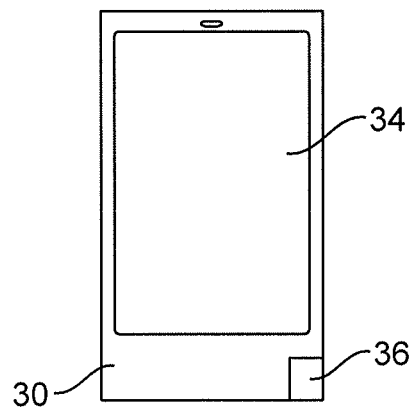
FIG. 2D

| ACTIVITY | ICON | SCHEDULED |
|---|---|---|
| WATER PLANT | P1 | 3 x WEEK |

| ACTIVITY | ICON | SCHEDULED |
|---|---|---|
| FEED DOG | D1 | DAILY |

| ACTIVITY | ICON | SCHEDULED |
|---|---|---|
| BEAT RUG | R5 | 2 x YEAR |

| ACTIVITY | ICON | SCHEDULED |
|---|---|---|
| GET WEIGHT | S8 | DAILY |

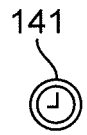 141

Upcoming scheduled event; an activity to occur in the future

FIG. 9A

 142

Late or missed scheduled event; an activity to be taken now or in the past

FIG. 9B

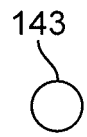 143

Completed event; activity performed at or near a scheduled event time. An event performed within a scheduling window or before triggering an exception event.

FIG. 9C

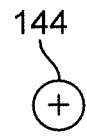 144

Completion of an unscheduled activity - may occur at/near completion of a scheduled activity or at any time in a monitoring period.

FIG. 9D

 Happy; perfect adherence.

FIG. 9E

 Unhappy; almost perfect adherence.

FIG. 9F

 Sad; poor to no adherence.

FIG. 9G

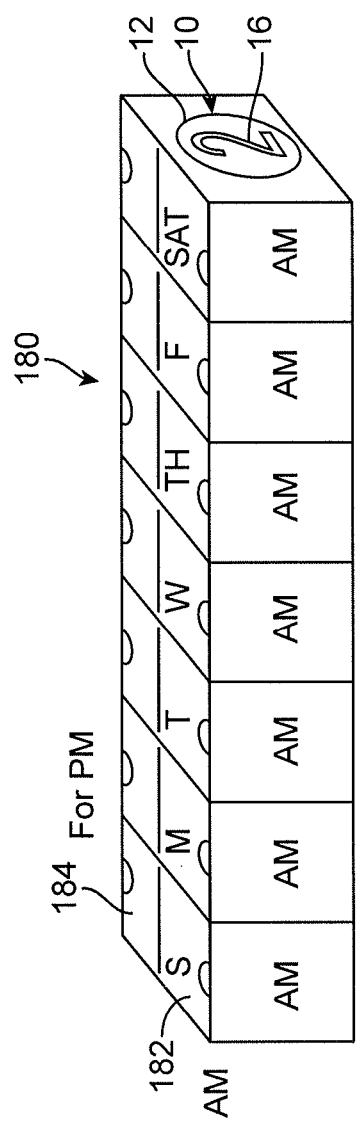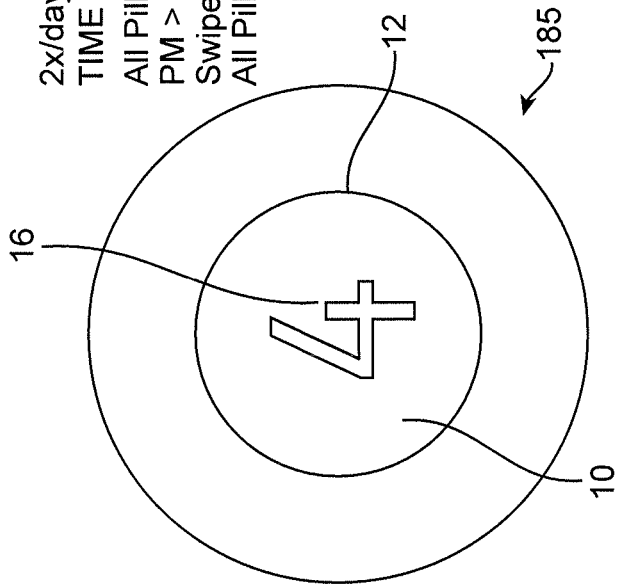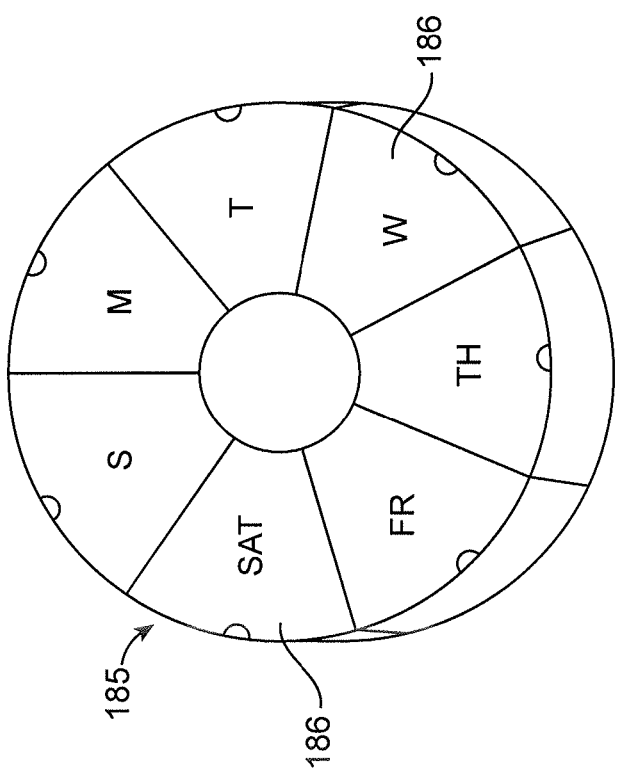
FIG. 11
FIG. 12B
FIG. 12A

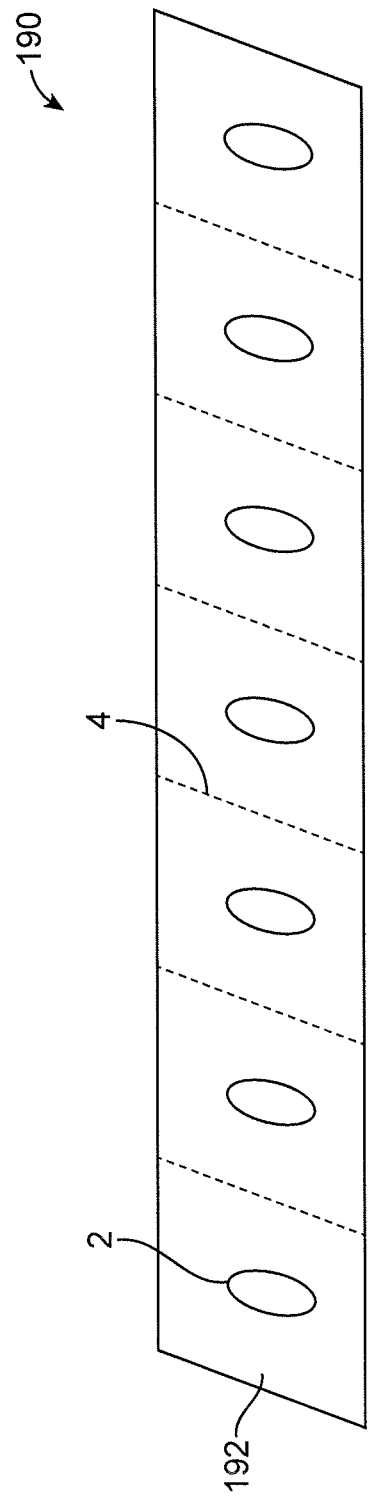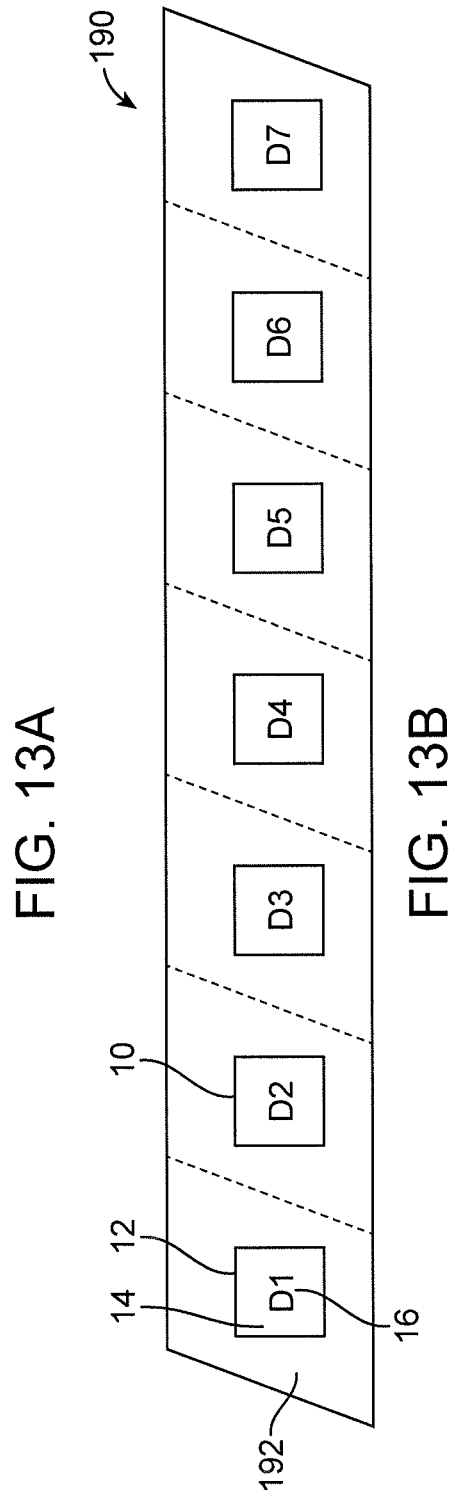
FIG. 13A
FIG. 13B

Set up for 3 medicines A, B, C
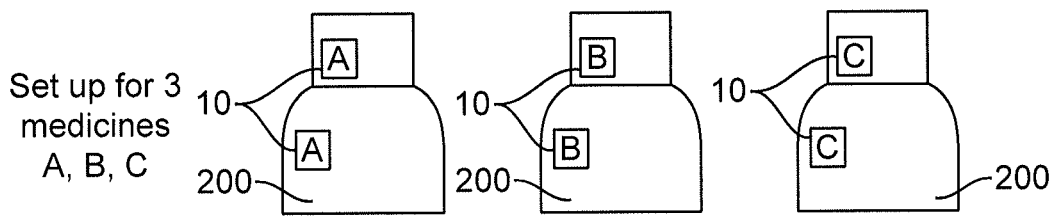
FIG. 17A
Take medicine A ····· But lid / bottle mix up
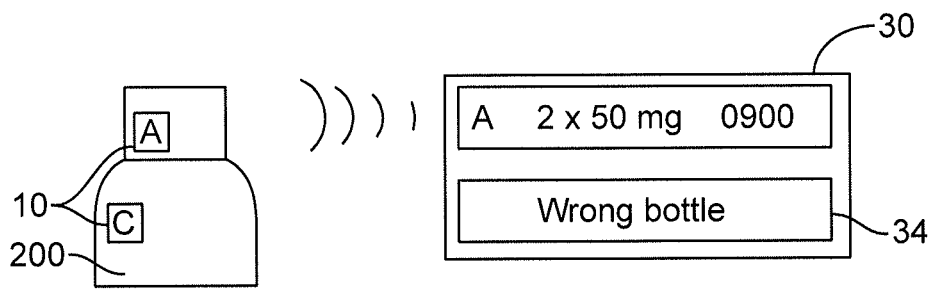
FIG. 17B1      FIG. 17B2
Take medicine A, bottle / lid correct
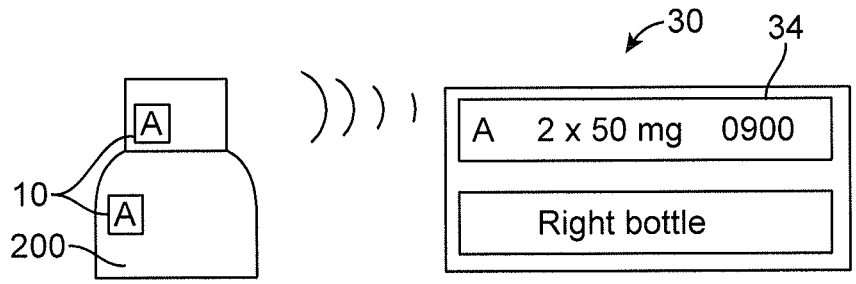
FIG. 17C1      FIG. 17C2
Alternative Indications Including Audible
| Check bottle | Ding, Bingo, You got it |
| ✗ | ✓ |
| Alarm / Buzzer / Boink | Bottle matched |
| Try again | Schedule summary is red |
| Not matched | Schedule summary is green |

141

Upcoming scheduled dose; scheduled to be taken sometime in the future.

142

Late/missed dose; scheduled to be taken now or in the past

143

Completed dose; taken at or near the scheduled time.

144

Additional or unexpected dose; taken at the same time of a scheduled dose, or at any time for unscheduled medications.

145 🙂 Patient A; perfect adherence.

145 🙂 Patient B; perfect adherence.

146 😐 Patient C; less than perfect adherence.

147 ☹ Patient D; poor to no adherence.

MULTIPLE USERS COMMON MEDICINE ONE READER

ICON TAG < USER INITIAL > <NUMBER>
    +
PERSONAL TAG

| Pam Rx | Lawrence Rx | Common Med. |
|--------|-------------|-------------|
| P1 | L1 | 1 |
| P2 | L2 | 2 |
| P3 | L3 | 3 |
| P4 | L4 | 4 |
| Pam Tag | Lawrence Tag | |

1  P1 - P4 Bottles scan as usual, same for L1 - L4.
2  PAM takes common 2, scans common 2 bottle tag then Pam tag. System logs PAM common 2 dose at scan time.
3  Lawrence takes common 3, scans common 3 bottle tag then Lawrence tag. System logs Lawrence common 3 dose at scan time.

FIG. 24

SYSTEM AND METHOD FOR ACTIVITY MONITORING

CROSS REFERENCE TO RELATED APPLICATIONS

This application claims priority to U.S. Provisional Patent Application No. 62/117,878, filed Feb. 18, 2015, and titled "SYSTEM AND METHOD FOR ACTIVITY MONITORING," which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Aspects of the inventive system provide an electronic activity monitoring system for a user to indicate the completion of one or more activities through the use of one or more user selected and machine readable activity tags.

BACKGROUND

As the pace of daily life increases, individuals are often overwhelmed by the number, variety and frequency of activities to be completed in the course of a day, week or month. Hand written notes, stickers or calendar entries are often used but many of those techniques fail because there is not an automated system to maintain the schedule and such systems do not provide the user meaningful feedback about adherence to the ordered completion of the desired activities.

In one specific area, the scheduled taking of medicines, patients or other medication-users frequently forget to take medication because: 1) the medicine is for an acute problem and the patient is not used to taking medicine on a regular basis; 2) they take regular medication, but frequently forget; 3) they take many medications and are easily confused if the medicines are to be taken at different times. In addition, patients sometimes may take too much medicine because they forgot that they have already taken the medication.

While some electronic activity monitoring systems have been proposed, these system are generally configured to prevent an activity until a permitted time (obstructive) or are engineered with features to provide a user with detailed information about the contents of an associated container such as the name of the medication, the time for a scheduled dose, side effects and other information related to the user or the medication. Even conventional tracking systems that provide more simplistic interfaces, there is not allowance for user specific features in the monitoring system elements. In this way, the conventional systems accommodate the machine readable aspects (i.e., an RFID tag with sufficient memory and accurately storing the appropriate information) but the user is left with the problem of picking the right container at the right time without assistance from the monitoring system except trial and error until the proper container is located.

What is needed is a simple and user friendly activity monitoring system that permits a user some configurability to ensure easy recognition of an object associated with an activity while the machine readable aspects of the system are provided with appropriate machine detectable elements.

SUMMARY OF THE DISCLOSURE

In general, in one embodiment, an activity tag reader includes a housing, a display on the surface of the housing, a scanner within the housing adapted and configured to detect and machine readable element position in proximity to the portion of the housing containing the scanner; and a computer within the housing in communication with the scanner and the display including computer readable instructions to change the display in response to a detection of the machine readable element by the scanner.

This and other embodiments can include one or more of the following features. In one aspect, the activity tag reader can further include an icon on the surface of the housing to indicate the position of the scanner. In another aspect, the activity tag reader can further include a plurality of user interaction buttons on a surface of the housing. In a further aspect, the scanner can be positioned within the housing on one side of the display and a plurality of user interaction buttons can be positioned within the housing on the opposite side of the display. In an alternative aspect, the activity tag reader can further include a bezel around a portion of the surface of the housing containing the display. In another aspect, the activity tag reader can further include a bezel around the perimeter of the housing wherein the display. The user interaction buttons and the scanner can be within the perimeter. In an alternative aspect, the bezel can be adapted and configured to change colors in response to instructions from the computer. In yet another aspect, the computer readable instructions can include computer readable instructions for displaying a unique icon on the display for each one of a predetermined number of states based on an interaction of a unique machine readable element with the scanner. In still another aspect, the computer readable instructions can include computer readable instructions for displaying a unique icon on the display for each one of four predetermined status states of a user activity. In another aspect, the four predetermined status states of a user activity can be a completed scheduled activity, an uncompleted future activity, an incomplete scheduled activity and an additional unscheduled activity. In a further aspect, the four predetermined status states of a user activity can be associated with the user activity of the user taking one or more pills. In yet another aspect, the bezel can change colors in response to instructions from the computer as a result of an interaction between a machine readable element and the scanner. In yet another aspect, the machine readable element can contain less than 8 bits of data. In another aspect, the machine readable element can contain about 1 bit of data. In a further aspect, the machine readable element can contain only data used to associate the machine readable element with a user selected activity tag. In another aspect, the machine readable element can contain only data used to associate the machine readable element with a user selected icon. In another aspect, the bezel can change color or the activity tag reader emits a sound when the scanner interacts with a machine readable element. In yet another aspect, the bezel can change color to a unique color selected to identify with a preselected user activity status. In yet another aspect, the sound emitted by the activity tag reader can change sounds to a unique sound selected to identify with a preselected user activity status. In still another aspect, a preselected user activity status can be one or more of an indication of wellness, completion of an activity, or degree of adherence to a schedule of activities.

In general, in one embodiment, a machine readable patient state indicator includes a multisided structure having at least 3 sides, a machine readable element attached to each side of the multisided structure, and an icon attached to each side of the multisided structure. Each icon uniquely identifies a patient state.

This and other embodiments can include one or more of the following features. In one aspect, the multisided structure can have six sides and each icon corresponds to a unique pain scale indication. In another aspect, each icon can uniquely identify a state of wellness. In a further aspect, when the scanner detects the machine readable patient state indicator of the display, the bezel or the sound emitted by the activity tag reader can uniquely identify a particular side of the multisided structure presented to the scanner indicative of the patient state.

In general, in one embodiment, a method for tracking the activity of a user includes passing a unique machine readable element in relation to a scanner, identifying a user activity corresponding to the unique machine readable element; and displaying an icon of one of a predetermined number of activity states in a display based on a comparison of the time that the identifying was performed compared to a scheduled time for a user activity associated with the unique machine readable element.

This and other embodiments can include one or more of the following features. In one aspect, the unique machine readable element can be part of a user selected activity tag affixed to the lid of a pill bottle. In another aspect, the predetermined number of activity states can be four and the icon displayed corresponds to one of a completed scheduled activity, an uncompleted future activity, an incomplete scheduled activity, and an additional unscheduled activity. In a further aspect, each predetermined activity state can include a specific indication by a light or a sound.

In general, in one embodiment, a method for tracking a scheduled activity of a user, includes passing a unique machine readable element in relation to a scanner and recording a time stamp, identifying a schedule of user activity corresponding to the unique machine readable element; and displaying an icon of one of four predetermined activity state indicators in a display based on a comparison of the schedule of user activity to the time stamp.

This and other embodiments can include one or more of following features. In one aspect, the passing of a unique machine readable element can be completed by passing the lid of a pill bottle past the scanner. In another aspect, the unique machine readable element can be part of a user selected activity tag. In a further aspect, the four predetermined activity states can be a scheduled activity is completed, a scheduled activity is late or missed, an unscheduled activity is completed and a remaining uncompleted scheduled future activity. In an alternative aspect, the method can further include displaying on the display the icon for the predetermined activity state indicator of a scheduled activity is completed when the comparison of the schedule of user activity to the time stamp determines that an activity associated with that machine readable element was completed. In another aspect, the method can further include displaying on the display the icon for the predetermined activity state indicator of a scheduled activity is late or missed when the comparison of the schedule of user activity to the time stamp determines that an activity associated with that machine readable element is not detected or was detected beyond the scheduled time. In a further aspect, the method can further include displaying on the display the icon for the predetermined activity state indicator of an unscheduled activity is completed when the comparison of the schedule of user activity to the time stamp determines that the scan of the tag is recognized but does not correspond to any scheduled activity. In yet another aspect, the method can further include displaying on the display the icon for the predetermined activity state indicator of an uncompleted scheduled future activity.

In general, in one embodiment, an electronic activity tag reader includes a housing having an electronic display and a scanner, a computer readable memory containing a first patient specific activity associated with a unique machine readable element and a schedule for performing the first patient specific activity, control electronics within the housing in electronic communication with the electronic display and the scanner containing computer readable instructions responsive to the computer readable memory and an output of the scanner indicating the detection of the unique machine readable element for reminding a user of an upcoming performance of the first patient specific activity, for tracking the completion of a scheduled performance of the first patient specific activity, or for alerting a user or a caregiver of non-performance of a first patient specific activity and generating an output for presentation on the electronic display corresponding to the reminding, the alerting or the tracking, and a communication module to provide wired or wireless access to the control electronics.

This and other embodiments can include one or more of the following features. In one aspect, computer readable instructions for generating an output for presentation on the electronic display corresponding to the reminding, the alerting or the tracking and an electronic device can also be provided using the communications module to an electronic device separate from the electronic activity tag reader. In another aspect, the electronic device separate from the electronic activity tag reader can be a local server. In a further aspect, the electronic device separate from the electronic activity tag reader can be a cloud based server. In an alternative aspect, the electronic device separate from the electronic activity tag reader can be a smart phone, a tablet or a smart watch. In yet another aspect, computer readable instructions for generating an output for presentation on the electronic display corresponding to the reminding, the alerting or the tracking can further include instructions for determining one of three adherence states related to whether the scanner detects the machine readable element in accordance with the scheduled performance of the first patient specific activity. In still another aspect, the three adherence states can be perfect adherence to the scheduled performance of the first patient specific activity schedules activity, near perfect adherence to the scheduled performance of the first patient specific activity and non-performance of the scheduled performance of the first patient specific activity. In another aspect, the computer readable instructions can include an electronic notification to a user or a caregiver of the activity state or the adherence state.

In general, in one embodiment, a method for tracking the activity of a user includes passing a unique machine readable element in relation to a scanner, identifying a user activity corresponding to the unique machine readable element, displaying an icon of one of four predetermined number of activity states in a display based on a comparison of the time that the identifying was performed compared to a scheduled time for a user activity associated with the unique machine readable element; and providing an alert corresponding to the selected predetermined activity state.

This and other embodiments can include one or more of the following features. In one aspect, the unique machine readable element can be part of a user selected activity tag affixed to the lid of a pill bottle. In another aspect, the four predetermined number of activity states can correspond to one of a completed scheduled activity, an uncompleted future activity, an incomplete scheduled activity, and an additional unscheduled activity. In a further aspect, each predetermined activity state can include a specific indication by a light or a sound. In an alternative aspect, the method can further include displaying on the display the icon for the predetermined activity state indicator of a scheduled activity is completed when the comparison of the schedule of user activity to the time stamp determines that an activity associated with that machine readable element was completed. In yet another aspect, the method can further include displaying on the display the icon for the predetermined activity state indicator of a scheduled activity is late or missed when the comparison of the schedule of user activity to the time stamp determines that an activity associated with that machine readable element is not detected or was detected beyond the scheduled time. In another aspect, the method can further include displaying on the display the icon for the predetermined activity state indicator of an unscheduled activity is completed when the comparison of the schedule of user activity to the time stamp determines that the scan of the tag is recognized but does not correspond to any scheduled activity. In a further aspect, the method can further include displaying on the display the icon for the predetermined activity state indicator of an uncompleted scheduled future activity. In an alternative aspect, the providing an alert step can send an electronic message to a caregiver reporting the current activity state. In yet another aspect, the providing an alert step can send an electronic message to a caregiver reporting the adherence level of the user activity. In still another aspect, an electronic display in communication with the electronic activity tag reader can provide an icon associated with a user defined scheduled activity and an activity indicator icon indicating one of four predetermined activity states or indicating one of three adherence level states for the user defined scheduled activity. In a further aspect, the electronic display can be the electronic display in the housing of the electronic tag reader or the electronic display can be on an electronic device in communication with the electronic activity tag reader via a communications module in the electronic activity tag reader. In another aspect, the electronic device in communication with the electronic activity tag reader via a communications module in the electronic activity tag reader can be a smart phone, a tablet or a smart watch. In an alternative aspect, a method can further include providing an alert to a caregiver by sending an electronic communication to the caregiver via instant messaging, email, in app notification, SMS messaging or text messaging including an indication of any of a scheduled activity, degree of adherence to scheduled activity, exceptions to scheduled activity or indication of specific medication consumption. In one specific embodiment, the user is undergoing post-surgical rehabilitation and the caregiver is receiving indications related to when the user activity includes the taking of a pain reliever including prescription pain relievers provided for post-surgical rehabilitation pain relief. In another aspect, a method can further include using the machine readable patient state indicator of at a pre-defined time interval, when scanning an activity tag or after performing a pre-defined action. In still another aspect, the pre-defined time interval on the pre-defined action can be related to the participation of the activity tracking system user in a clinical trial.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1E is a perspective view of another alternative embodiment of a user selected activity tag 10.

FIG. 1F illustrates a bottom-up view of a base 12 having an adhesive rim 22 around the perimeter.

FIG. 1G is a side view of a generally cylindrical activity tag 10 having a peel backing to expose a pressure sensitive adhesive 24 along the bottom surface.

FIG. 1H is a top view of an activity tag 10 that includes a strip or band 26 extending from the base 12 and used to secure the activity tag 10.

FIG. 1I is a view of an embodiment of an icon having a fanciful shape and the number 3 within a triangular perimeter.

FIGS. 2C1 and 2C2 are perspective and side views of an alternative configuration of an activity tag reader 30 where the body 30 includes an arm mount 39 for a display 34 fixed or swiveling at a joint 31.

FIG. 2D is a perspective view of an activity tag reader 30 where the body 32 is a smart phone or has the form factor of a handheld device for use with the activity tracking system described herein.

FIGS. 9E, 9F and 9G illustrate exemplary status icons for use as indications for an upcoming scheduled event (FIG. 9A, a late or missed scheduled event (FIG. 9B), a completed event (FIG. 9C) or the completion of an unscheduled event (FIG. 9D). FIGS. 9E, 9F and 9G illustrate exemplary status icons for use as adherence indicators such as perfect adherence to schedule (FIG. 9E), almost perfect adherence to schedule (FIG. 9F) or poor or non-adherence to schedule (FIG. 9G).

FIG. 11 is a perspective view of a weekly, am/pm or twice daily pill box 180 having a user selected activity tag.

FIGS. 12A and 12B are top and bottom views respectively of a weekly once daily pill box 185 including a user selected activity tag.

FIGS. 13A and 13B are top and bottom views respectively of a weekly once daily pill strip 190 having a user selected activity tag.

FIG. 17A illustrates front views of three medicine bottles 200 each having a pair of similarly machine coded user selected activity tags on a lid and the body of the bottle.

FIG. 17B1 illustrates a bottle of FIG. 17A with an incorrect lid (lid A on bottle C) and an exemplary associated display warning as in FIG. 17B2.

FIG. 17C1 illustrates a bottle of FIG. 17A with a correct lid and bottle arrangement (lid A with bottle A) and an exemplary associated display as in FIG. 17C2.

FIG. 24 is a chart illustrating an exemplary set up when multiple users are using a single activity monitoring system including the use of an individual tag used indicate a dose taken from a common source.

Figure 1A:
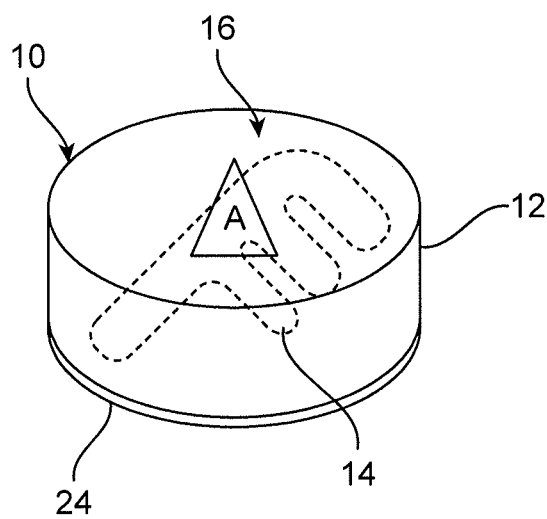
FIG. 1A is a perspective view of a user selected activity tag 10.

SUMMARY OF THE INVENTION (Claims will be summarized here once finalized)

DETAILED DESCRIPTION

While the making and using of various embodiments of the present invention are discussed in detail below, it should be appreciated that various embodiments of the inventive concepts herein can be embodied in a wide variety of specific contexts. The specific embodiments discussed herein are merely illustrative of specific ways to make and use illustrative aspects of the invention and do not delimit the scope of the invention.

In general, an activity tag reader 30 or other suitably configured display-containing portable electronic device electronic device is, for example, a portable medical monitor device, a cell phone, a smart phone, a personal data assistant (PDA), or other portable electronic device commonly carried by the user that has near field communications capability or other capabilities suited to the machine readable element designated for activity monitoring by the user.

In one aspect of an activity monitoring system, a passive, unique communication tag (e.g., RFID or NFC) that is coupled to a user selected icon 16. The user selected or predefined icon 16 may be, for example, a pictogram, a regular geometric shape, a fanciful shape, a color, one or more of a user's initials such as in a monogram, a photo, an emoji, an emoticon, or one or more tactile elements or one or more braille characters. The activity tag 10 is attached to an appropriate object associated with the activity. Each time the user completes a scheduled activity, the associated user activity tag is passed within range of a reader. Within range will vary depending upon the type of tag system used from a short range of a few cm for most RFID tags or in contact with a reader for most NFC tags. The reader will record the read time and date corresponding to when the tag was read by the reader. The reader may maintain the tag read record locally or provide the tag read record to a remote system (i.e., cloud based database, local network or similar suitably networked storage system). The user activity record in the database will include user identifying information and the tag read data, such as for example, tag ID, date and time.

In one embodiment of the activity monitoring system of the present invention the system may be configured for providing information about an action or activity that includes a display-containing portable electronic device capable of reading a machine readable element such as an RF-transponder, NFC tag or other element as an indication as to whether or not a user has taken one or more scheduled actions associated with the machine readable element. In some embodiments, the activity monitoring system may also generate at least one of an audible signal, a visual signal or a physical signal (i.e., vibrate) to remind a user to perform an activity. Moreover, one or more portable electronic devices may be communicably coupled to a computer or server to provide large scale monitoring and management such as via the cloud or suitable API. For example, an activity monitoring system may be used to monitor actions of a single user or a number of users, such as in a group home or family environment. Several transponder arrangements have been developed. One such transponder arrangement is described in U.S. Pat. No. 5,053,774 issued to Schuermann et al. on Oct. 1, 1991, incorporated herein by reference. The '774 patent describes a transponder unit which has a low energy requirement and does not need its own power source. Another transponder arrangement is disclosed by Meier et al. in U.S. Pat. No. 5,548,291 issued Aug. 20, 1996, also incorporated herein by reference. In the '291 patent another transponder arrangement is described which may be updated in a contactless manner subsequent to its manufacture is described. Additional other details for the operation and communications of a tracking system are provided in U.S. Pat. Nos. 5,239,491; 5,963,136 and U.S. Patent Application Publication US 2008/0030309 (Appl. Ser. No. 11/496,326, filed Jul. 31, 2006), each of the above are incorporated herein by reference for all purposes.

In the context of the description that follows, the following definitions are used:

Activity: An activity is a user action associated with a user selected activity tag.

User selected activity tag: A user selected activity tag includes an icon, a base and a machine detectable element.

Icon: An icon is a user defined, or predefined or selectable and identifiable marker uniquely associated with an activity tag. The icon is used to aid the user and identification of a desired tagged object or activity. Icon examples include one or more of or combinations of: a shape, a color, a number, a letter, an existing or designed symbol, a photograph of an animal, a person or a location, a cartoon character, an emoji, an emoticon, or one or more tactile elements or one or more braille characters.

Base: A base is a substrate that provides a form factor for (i) maintaining the relative position between a machine readable element and an associated icon and (ii) enabling an activity tag to be secured in a location appropriate to user performance an associated activity. The base may be a custom-made object or a portion of an existing object used to support an activity tag, or an icon and a machine detectable element combination as suited to the particular object or activity tracking situation.

Machine detectable element: A machine detectable element is any object or structure(s) provided in a form permitting electronic detection, scanning or reading. Examples of machine detectable elements include RFID tags, near field communication tags (NFC tag); optical character recognition symbols such as bar codes, QR codes and the like. A machine detectable element may interact with a machine reader in a contact (i.e., place or tap) or a non-contact mode (i.e., move within recognized field or in relation to a reader such as an optical reader). In one aspect, a machine detectable element contains only a manufacturer or pre-existing identification code without any user specific or article specific or activity specific information in the memory of the machine detectable element. An exemplary 1-bit activity tracking system would be that of an electronic anti-theft surveillance (EAS). When the machine detectable element is in the detection zone of the scanner, indicate 1 (indicating associated activity completed) and when element is not in the zone indicate 0. Opposite setting may also be used.

Event: An event is any machine or computer based detection, scanning or interaction with a machine readable element in an activity tag.

Scheduled event: A scheduled event is an expected detection of or interaction with an activity tag. The number and timing of activity tag detections or interactions corresponds to the user's desired frequency for performing an associated activity.

Unscheduled event: An unscheduled event is an event that does not correspond by timing or frequency to any scheduled event; an unexpected detection of or interaction with a machine readable element in an activity tag.

FIG. 1A is a perspective view of a user selected activity tag 10. The user selected activity tag 10 has a base 12, an icon 16 and a machine detectable element 14. Each of these exemplary elements is shown individually and FIGS. 1B, 1C and 1D.

Figure 1B:
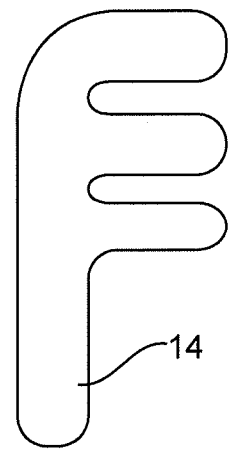
FIG. 1B Illustrates a representative machine detectable element 14 of the tag in FIG. 1A.

FIG. 1B Illustrates a representative machine detectable element 14 of the tag in FIG. 1A. A machine detectable element 14 may be any element that may be used and detected by any RFID, near field communication (NFC), noncontact communication or optical machine or computer readable means. In an embodiment, the tag 10 comprises wireless automatic identification technology wherein the machine detectable element 14 is one or more of a passive device, a semi-passive device, an active device, a read only device, a read/write capable device, an optically readable device, a radio frequency identification (RFID) device, and a micro electromechanical system (MEMS) device. In an additional aspect, the machine readable element 14 may provide or an activity tag 10 may be configured to include a MEMS-enabled device including at least one sensor. In one specific embodiment, the machine detectable element 14 is a 1-bit RFID element and the activity tracking system is configured to record/report an associated activity as completed when the associated element is detected.

Figure 1C:
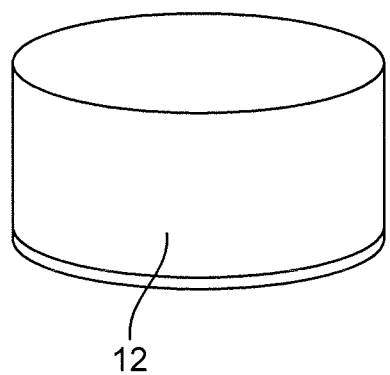
FIG. 1C is a view of a user selected activity tag base 12 of FIG.
Figure 1D:
FIG. 1D is a view of the icon in FIG. 1A (triangle with letter A).

In the illustrated embodiment of FIG. 1A, FIG. 1C is a view of a user selected activity tag base 12 of FIG. 1A that is a cylinder. The base 12 is a material or substrate used to provide a form factor for the user selected activity tag 10. The base 12 is used to co-locate or couple a machine-readable element 14 and an icon 16. The base 12 may also include one or more surfaces used to attach or couple the activity tag 10 and an appropriate location to enable a user to associate the activity tag with an activity. The icon 16 is selected to be identifiable by the user. An icon 16 may be identifiable or perceptible by the user in any of a wide variety of suitable ways depending upon user preferences or capability. An icon may be identifiable to a user by sight, sound or touch individually or in any combination. Visually identifiable icons are provided in many of the embodiments that follow but the various embodiments of the invention are not so limited. By way of example, an icon 16 may be any of a combination of shape, color, number, letter, icon, symbol, photo, animal, cartoon or other identifiable media such an emoji or emoticon selected by the user to identify a particular user selected activity tag 10. The icon 16 in FIG. 1A is a triangle containing the letter A. FIG. 1D is a view of the icon in FIG. 1A (triangle with letter A). Optionally, the icon may include a fanciful shape or user specified design. FIG. 1I is a view of an embodiment of an icon having a fanciful shape and the number 3 within a triangular perimeter. FIG. 1E is a perspective view of another alternative embodiment of a user selected activity tag 10. In this embodiment, the base 12 is planar with a generally rectangular shape and the icon 16 is the letter "A" and number "1" inside of a circle.

FIGS. 1F, 1G, and 1H illustrate various alternative configurations of the base 12 to assist a user in positioning a user selected activity tag 10 in an appropriate location to associate the tag 10 with an activity. FIG. 1F illustrates a bottom-up view of a base 12 having an adhesive rim 22 around the perimeter. FIG. 1G is a side view of a generally cylindrical activity tag 10 having a peel backing to expose a pressure sensitive adhesive 24 along the bottom surface. FIG. 1H is a top view of an activity tag 10 that includes a strip or band 26 extending from the base 12 and used to secure the activity tag 10. It is to be appreciated that any of a variety of fixation means may be used to secure an activity tag 10 such as for example, glues, epoxy, cement, hook/loop, fasteners, or magnets. The design and appearance of an activity tag 10 including the mode of attachment to a suitable mount or surface depending upon the activity to be tracked and the material considerations such as esthetics, design, surroundings, or function of the object receiving the activity tag 10.

Figure 2A:
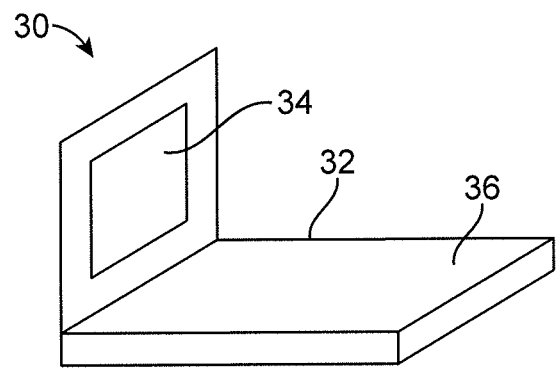
FIG. 2A is a perspective view of an exemplary activity tag reader 30 having a body 32 that includes a tag scanner 36 and a display 34.
Figure 2B:
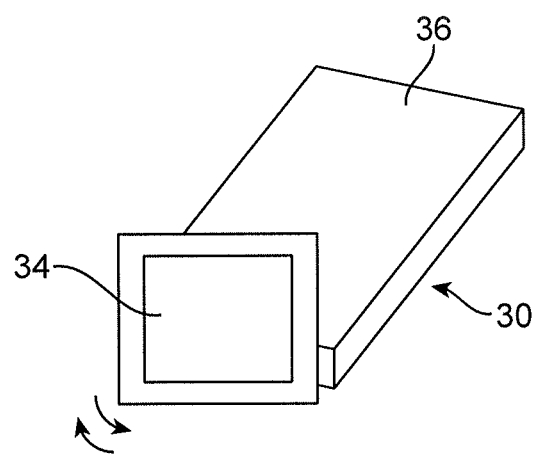
FIG. 2B is a perspective view of an alternative activity tag scanner 30 configuration in which the display 34 is mounted to a swivel permitting movement of the display 34 relative to the body 30 containing the tag scanner 36.

FIGS. 2A-2D Illustrate various embodiments of an activity tag reader 30. FIG. 2A is a perspective view of an exemplary activity tag reader 30 having a body 32 that includes a tag scanner 36 and a display 34. In this embodiment, the display 34 is in a fixed orientation relative to the scanner 36 such that the display 34 is visible when an activity tag 10 is passed over the tag scanner 36. FIG. 2B is a perspective view of an alternative activity tag scanner 30 configuration in which the display 34 is mounted to a swivel permitting movement of the display 34 relative to the body 30 containing the tag scanner 36. In various configurations, the activity tag reader 30 may have a different size of the tag scanner 36 to support the type of communications used to read the machine readable elements used in a particular configuration of the system. In addition, the activity tag reader 30 may include various markings or indications for the location of the tag scanner 36 to make it easier for the user to place machine-readable elements within range of the scanner function. By way of example, a portion of an activity tag reader 30 in proximity to the tag scanner 36 may include markings such as tap here or place here or swipe across here or use arrows or other indicators to aid a user in properly positioning an activity tag reader 10 within relation to the tag scanner 36.

FIGS. 2C1 and 2C2 are perspective and side views of an alternative configuration of an activity tag reader 30 where the body 30 includes an arm mount 39 for a display 34 fixed or swiveling at a joint 31. The arm mount is attached to and extends above the tag scanner 36. Also shown in this embodiment is an additional machine-readable or computer readable device 38 provided in the activity tag reader and additional to the machine-readable capabilities provided by the tag scanner 36. In one aspect, the machine reader 38 may be a barcode or other optical scanner built into the display 34 as illustrated in the figures.

FIG. 2D is a perspective view of an activity tag reader 30 where the body 32 is a smart phone or has the form factor of a handheld device for use with the activity tracking system described herein. In this embodiment the display 34 is the screen of the device or smartphone. The smartphone or device included detector, optical character recognition or near field communications capabilities native to the device would be used to provide the functionality of the tag scanner 36 as appropriate to the machine readable element 14. In this embodiment, the near field communication capabilities or other reader functionality of the smartphone device (i.e., smart phone camera acting as an OCR device) is used to detect activity tags and use an app or other suitable software with functionality as described herein to perform the desired activity tracking reminding and reporting functions.

As will be described in greater detail below, one function of the display 34 is presentation of the activity tracking system dashboard. The dashboard provides a snapshot of the day according to the activity tracking system. All scheduled activities are shown on the day's dashboard with their time and user selected icon 16. The dashboard and other remote monitoring devices (i.e., displayed dashboard for interested persons accessing via website or cloud/API) are updated in real time as user activities are performed (i.e., reader 30 detection/interaction with an activity tag). Completed but unscheduled activities are also shown in the dashboard. Unscheduled activities may appear below the list of scheduled activities. (See FIGS. 9A-9D). In one aspect, the dashboard is cleared and re-created once daily to present the next day activities. In other aspects, the display and activity monitoring system are configured to allow the display viewing of dashboards for previous and future days. In still other aspects, the dashboard also includes a feature indicating a user's adherence to the activity schedule being monitored. In one embodiment, described in greater detail below, the dashboard includes an indication of adherence as one of three states: perfect adherence, near perfect adherence or poor/no adherence. In one embodiment, the three adherence states are indicated by the display of a smiley face, an unhappy face and a sad face (see FIGS. 9E, F and G). In other embodiments, other icons, symbols, or emoji are selected for use by a particular user to indicate adherence state.

Figure 3A:
FIG. 3A illustrates a cactus plant in a planter having an activity tag 10 is attached to the planter.
Figure 3B:
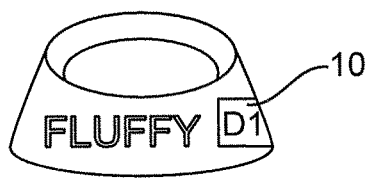
FIG. 3B illustrates a pet bowl having an activity tag 10 attached.
Figure 3C:
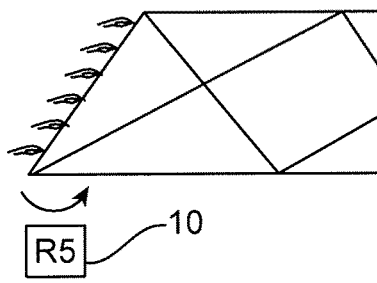
FIG. 3C illustrates a rug having an activity tag 10 attached.
Figure 3D:
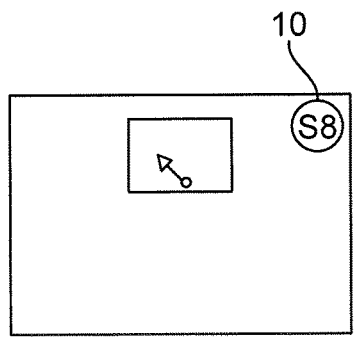
FIG. 3D illustrates a scale having an activity tag 10 with an icon of the letter S and the number 8 as part of a circular base.

FIGS. 3A-3D illustrate various combinations of items, activities and user selected activity tags for a variety of different kinds of tracked activities. FIG. 3A illustrates a cactus plant in a planter having an activity tag 10 is attached to the planter. Within the activity scheduling system the activity "water plant" is associated with the icon P1 is scheduled to occur three times a week. In this embodiment, the activity tag 10 has an icon with the letter P the number 1 within a triangle shaped base. FIG. 3B illustrates a pet bowl having an activity tag 10 attached. In this embodiment, the activity tag 10 has an icon with the letter D and the number 1 on a rectangular base. Within the activity scheduling system the activity "feed dog" is associated with the icon D1 and is scheduled to occur daily. FIG. 3C illustrates a rug having an activity tag 10 attached. In this embodiment, the activity tech 10 has an icon with the letter R and the number 5 on a rectangular base. Within the activity scheduling system the activity "Beat Rug" is associated with the icon R5 and is scheduled to occur twice a year. FIG. 3D illustrates a scale having an activity tag 10 with an icon of the letter S and the number 8 as part of a circular base. Within the activity scheduling system the activity "get weight" is associated with the icon S8 and is scheduled to occur daily.

In one aspect of the activity monitoring system described herein, an RFID/NFC sticker (i.e., machine readable element and base) is suitably attached to each object or location selected by the user as a reminder of the activity to be tracked, scheduled or reminded. Each time the user performed the intended action the user brings the sticker or activity tag within range of an appropriately configured activity tag reader 30. Registration, detection or interaction of the reader with the activity tag would be imputed by the activity monitoring system as the user completing the activity associated with that sticker/activity tag. The activity tag reader 30 (e.g., an RFID reader) may be appropriately configured to relay the data point (tag+date/time of detection or interaction) to the activity monitoring system cloud/API directly via Wi-Fi or Cellular or indirectly via Bluetooth to a smartphone. In one embodiment, the activity tag reader is configured for wireless communications such as with an appropriate cellular technology along with appropriate reading/detecting capabilities to function with the selected machine readable elements. One advantage of such a configuration is that the activity tag reader 30 would communicate with the activity tags and the activity monitoring system in a completely stand-alone system. In this context, stand-alone indicates that the system does not require the presence of any other computing device (either PC or smartphone). As before, the activity monitoring system would still permit/facilitate the involvement of the caregiver/interested party as described herein. In still other aspects, the activity monitoring system may be configured for both remote monitor and remote system setup. In a remote setup a user's activity schedule for all monitored activities, such as taking of certain scheduled medication doses would be transmitted the user's activity tag monitoring device and loaded for use. A passcode or other appropriate authentication procedures may be provided to confirm schedule and user identification and association (i.e., right schedule/right user).

Figure 4:
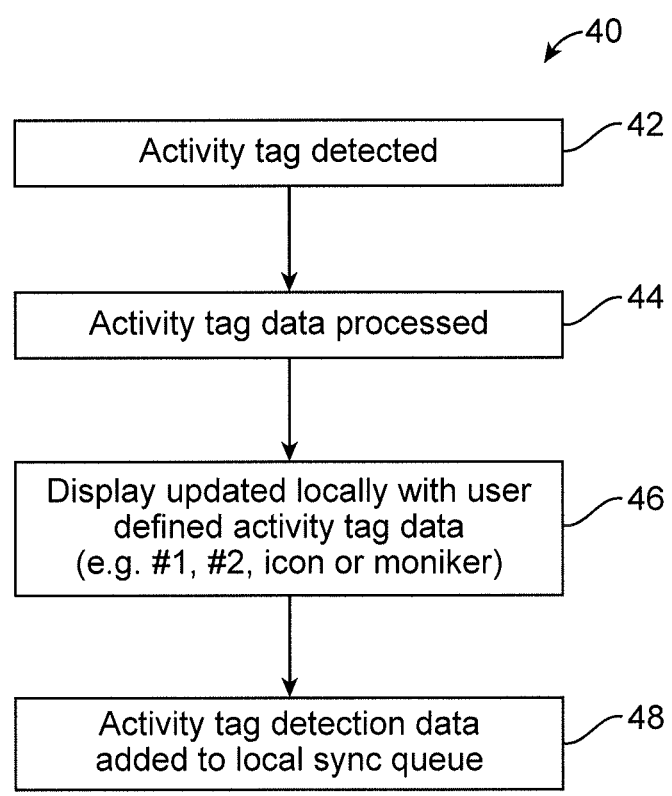
FIG. 4 illustrates an exemplary method 40 for the interaction between an activity tag reader 30 and a user defined activity tag 10.

FIG. 4 illustrates an exemplary method 40 for the interaction between an activity tag reader 30 and a user defined activity tag 10. First, at step 42, the activity tag 10 is detected by the tag scanner 36 or other component of the activity tag reader 30, depending on the reader configuration. The activity tag 10 is detected the tag scanner 36 when the machine readable element 14 within the tag 10 is detected by or interacts with the tag scanner/reader 36. The internal clock of the activity tag reader 30 is used to obtain date and time information associated with the detection.

Next, at step 44, activity tag data is processed. In this step the uniquely identified serial number or code associated with the machine detectable element detected in step 42 is associated with or stored with the date and time data from step 42.

Next, at step 46, display 34 is updated locally with the user-defined activity tag data associated with the detected activity tag. This may include the use of a simple indication of completion of an activity along with the representation of the icon or other indicia of the activity tag that has been detected. Various forms of simple activity indicators are possible and several will be described in greater detail below with respect to FIGS. 9A-9D.

Finally, at step 48, the activity tag detection data is added to the local synchronization queue for later processing (see FIG. 5) to the remote network/cloud/API.

Figure 5:
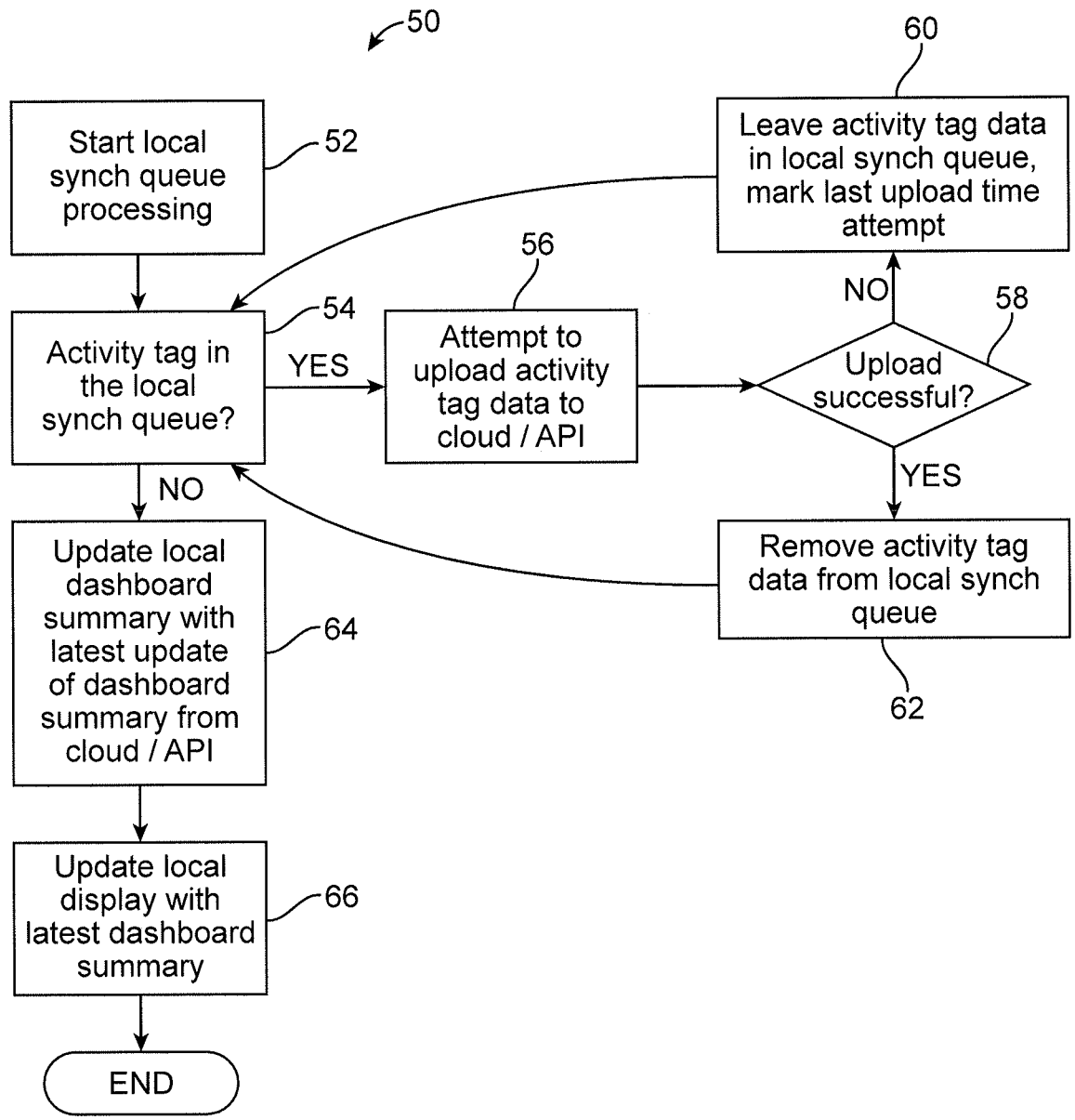
FIG. 5 illustrates an exemplary local synchronization processing method 50.

FIG. 5 illustrates an exemplary local synchronization processing method 50. First, at step 52, start local synchronization queue processing. Next, at step 54, determine if there is activity tag data in the local synchronization queue. This is the information collected locally using the method 40 (FIG. 4). If activity tag data exists, then proceed to step 56 and attempt to upload activity tag data to the cloud/API.

Determine if the upload is successful at step 58. If the upload is not successful, then leave the activity data in the local synchronization queue and mark last upload time attempt (step 60). If the upload is successful, then remove the activity tag data from the local synchronization queue (step 62).

Once all activity tag data in the local synchronization queue has been processed (step 54 result is NO), then the next step is to update the local dashboard summary with latest update of dashboard summary from cloud/API (step 64). Finally, step 66, update the local display (i.e., display 34) with the latest dashboard summary.

Figure 6:
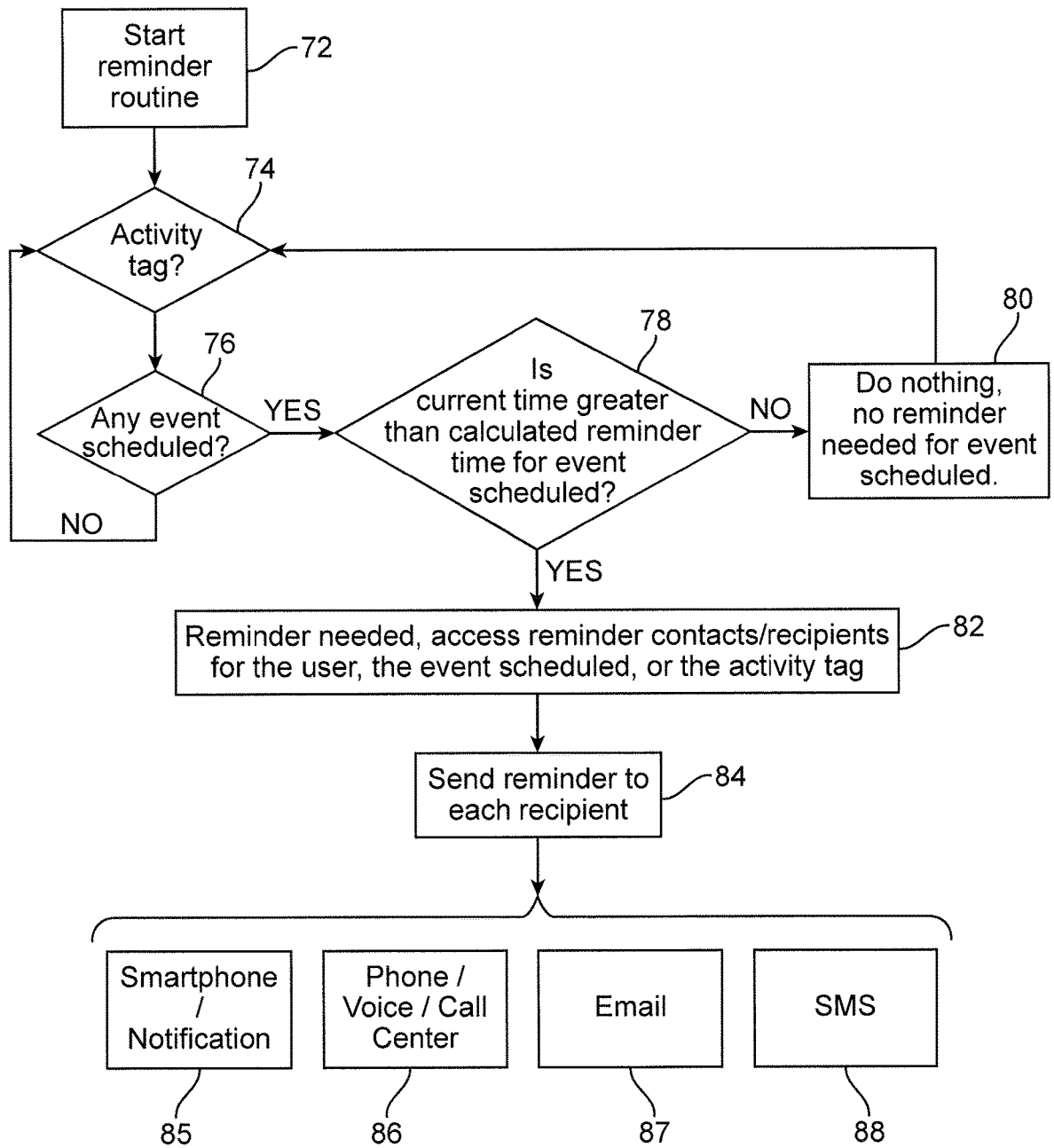
FIG. 6 is an illustrative method for an activity monitoring system used to generate a reminder for an activity (reminder flow chart 70).

FIG. 6 is an illustrative method for an activity monitoring system used to generate a reminder for an activity (reminder flow chart 70). The reminder flowchart 70 first initiates the reminder routine (step 72) and determines whether any activity tags are in the activity monitoring system (step 74). Next, at step 76, determine if there is any event scheduled for the activity tag. If there is no event, then return to step 74 and check for any additional tags. If there is an event scheduled (answer at step 76 is YES) then proceed to step 78.

Step 78 determines whether the current time is greater than the calculated reminder time for the event scheduled. If the current time is not greater than the calculated reminder time, (step 78 is NO) then no reminder is needed for the scheduled event (step 80). Next, return to step 74 to determine if there are more activity tags to check.

If the current time is greater than the calculated reminder time for the event (step 78 is YES) then a reminder is needed (step 82). The system will access contacts and recipients according to the type of reminder to be sent. Reminder characteristics such as recipient, content, frequency, and mode may be tailored to a particular user, an activity, an event or the frequency of detection of an activity tag. Reminders are sent to each recipient (step 84) using one or more mode of communication such as smart phone notification (step 85), phone call/voice mail/call center (step 86), electronic mail (e-mail) (step 87) or SMS/text or other messaging mode (step 88).

In one variation of the reminder flow method 70 in FIG. 6, even if the result at step 78 is YES, reminder needed, the user may, under certain circumstances delay the scheduled activity. Like a snooze button on an alarm clock, the reminder method 70 may be modified with such a "remind-me-later" input that stops or postpones the reminder alert signal (step 82) and instead schedules the actions of step 82 after the snooze or reminder period has passed. The snooze or reminder period may be a preset interval, or the user may input a specific time. In one embodiment, the machine readable element 14 is interrogated by the activity tag reader 30 in a contactless manner (e.g., using any suitable form of near field communication). In one specific embodiment, the machine detectable element 14 is not battery powered or is non-powered or passive until placed within the detection field of the tag scanner 36 or the activity tag reader 30. In still another aspect, the machine detectable element 14 includes only the most minimal of information provided by the manufacturer such as serial number, or model number or manufacturing date. In one aspect, the only information from the element 14 used by the activity monitoring system is a unique address or identification number assigned to the element 14. In other words, when the element 14 is read, the system only registers the unique numerical identification code for that element 14. In this way, the element 14 provides the unique machine ID that is then associated with a unique user selected icon as part of a user selected activity tag 10.

Figure 7:
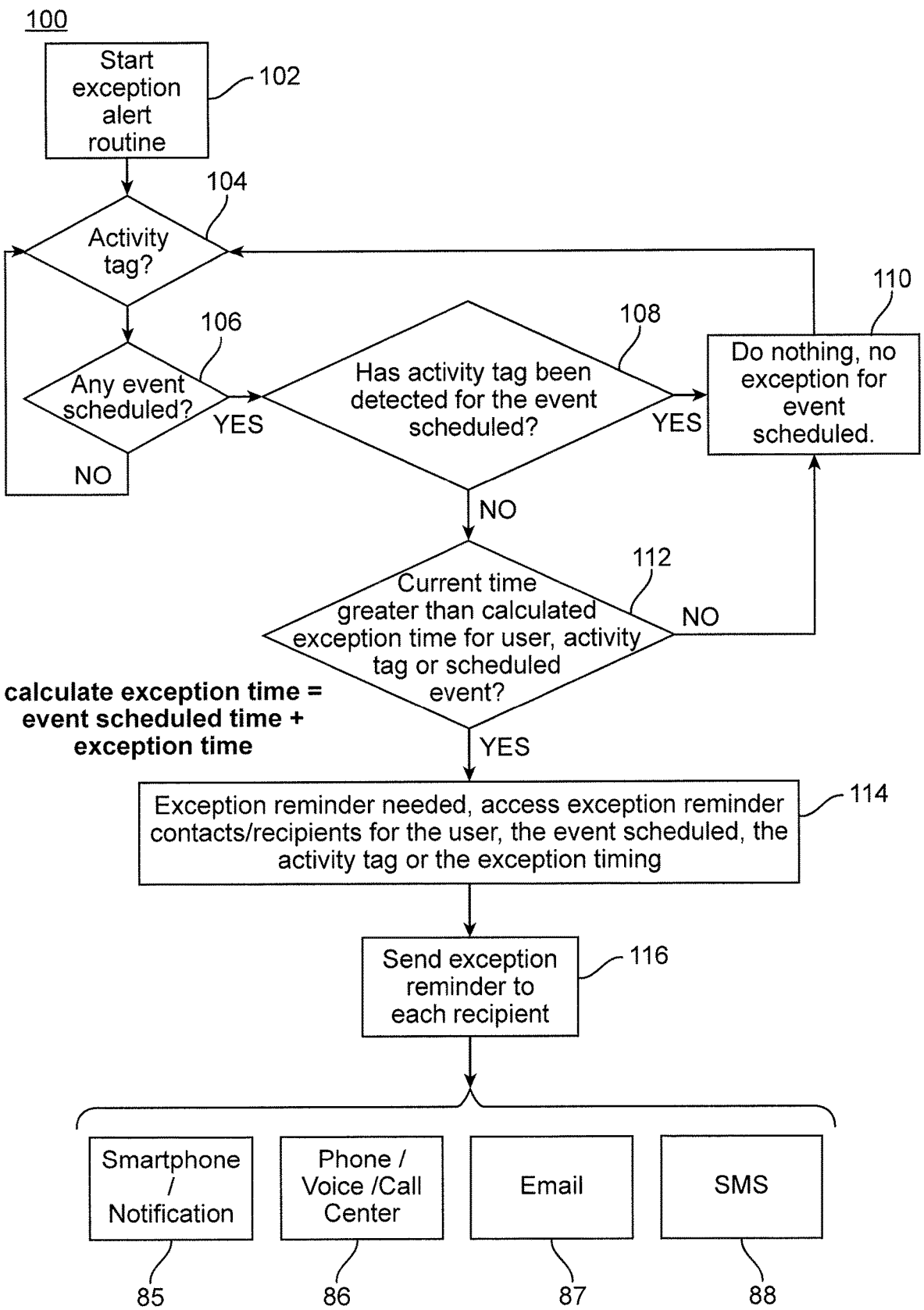
FIG. 7 is an illustrative method 100 for an exception alert generated by an activity monitoring system.

FIG. 7 is an illustrative method 100 for an exception alert generated by an activity monitoring system. First, start the exception alert routine (step 102). Next, step 104, determine if there is any activity tag 10 in the system. Next, at step 106, determine if there is any event scheduled for the activity tag. If there is no event, then return to step 104 and check for any additional tags. If there is an event scheduled (answer at step 106 is YES) then proceed to step 108. Step 108 is used to determine if an activity tag has been detected for the event scheduled. If the appropriate activity tag has been detected for the scheduled event (step 108 is YES) then proceed to step 110. No action is required since the tag was detected therefore no exception occurred for event scheduled. Return to step 104 to identify additional activity tags or exceptions.

If the appropriate activity tag has not been detected for the scheduled event (step 108 is NO) then proceed to step 112. Step 112 determines whether the current time is greater than the calculated exception time for the user, activity tag or event scheduled. If the current time is not greater than the calculated exception time, (step 112 is NO) then no exception is generated for the scheduled event (step 110). Next, return to step 104 to determine if there are more activity tags to check.

It is to be appreciated that reference to medications is not limited to pills. A variety of medications that are not in pill form such as, for example, insulin vial, eye drops and the like may also be tracked using an activity tag affixed as appropriate to the particular item consumed.

If the current time is greater than the calculated exception time for the event (step 112 is YES) then an exception reminder is needed (step 114). The system will access contacts and recipients according to the type of exception reminder to be sent. Reminder characteristics such as type of exception, recipient, content, frequency, and mode may be tailored to a particular user, an activity, an event or the frequency of detection of an activity tag. Exception reminders are sent to each recipient (step 116) using one or more mode of communication such as smart phone notification (step 85), phone call/voice mail/call center (step 86), electronic mail (e-mail) (step 87) or SMS/text or other messaging mode (step 88).

As used herein, a dashboard is a representation provided by display 34 of the status, adherence, schedule or other characteristics of a one or more users of an activity tracking system. When the dashboard updates using an exemplary method 120 (FIG. 8), a user is provided with the icon for the activity along with a status indicator (FIGS. 9A-9D). Advantageously, embodiments of the activity tracking system use simple icons and system states to indicate the status (FIGS. 9A-9D) or adherence (FIGS. 9E-9G) to activities scheduled within the system. FIGS. 9E, 9F and 9G illustrate exemplary status icons for use as indications for an upcoming scheduled event (FIG. 9A, a late or missed scheduled event (FIG. 9B), a completed event (FIG. 9C) or the completion of an unscheduled event (FIG. 9D). FIGS. 9E, 9F and 9G illustrate exemplary status icons for use as adherence indicators such as perfect adherence to schedule (FIG. 9E), almost perfect adherence to schedule (FIG. 9F) or poor or non-adherence to schedule (FIG. 9G). Additionally, or optionally, a dashboard may also be updates to include an adherence indicator reflecting the adherence to schedule for one or more scheduled activities monitored by the activity monitoring system.

Activity status indicators are used to indicate one of four possible states for an activity. An activity is upcoming or scheduled to occur in the future. This state is indicated by, for example, a clock within a circle 141 as shown in FIG. 9A. An activity that has been missed is indicated by an empty circle 142 as shown in FIG. 9B. Activity that has been completed is indicated by a fill-in circle 143 shown in FIG. 9C. An additional activity that was not scheduled but has been completed is indicated by a circle with a cross 144 as shown in FIG. 9D. Adherence to the scheduled activities is also indicated with simple status icons indicating one of three possible states. The three possible adherence states are (1) perfect adherence to schedule, (2) almost perfect adherence to schedule and (3) poor or lacking adherence to schedule. FIG. 9E illustrates a happy face 145 for the perfect schedule adherence. FIG. 9F illustrates a sad face 146 for near perfect adherence. FIG. 9G illustrates a sad face 147 for poor or no adherence.

In one aspect, the activity monitoring system provides for the natural progression of the dashboard (daily snapshot) is to view adherence over time (weekly/monthly snapshot). In one specific embodiment, using the same icons and visual cues, the adherence report cards are available in 2 modes:
 Lifetime of an activity
 Weekly snapshot for all activities
 In addition, all monitored activities are shown in adherence reports.

Figure 8:
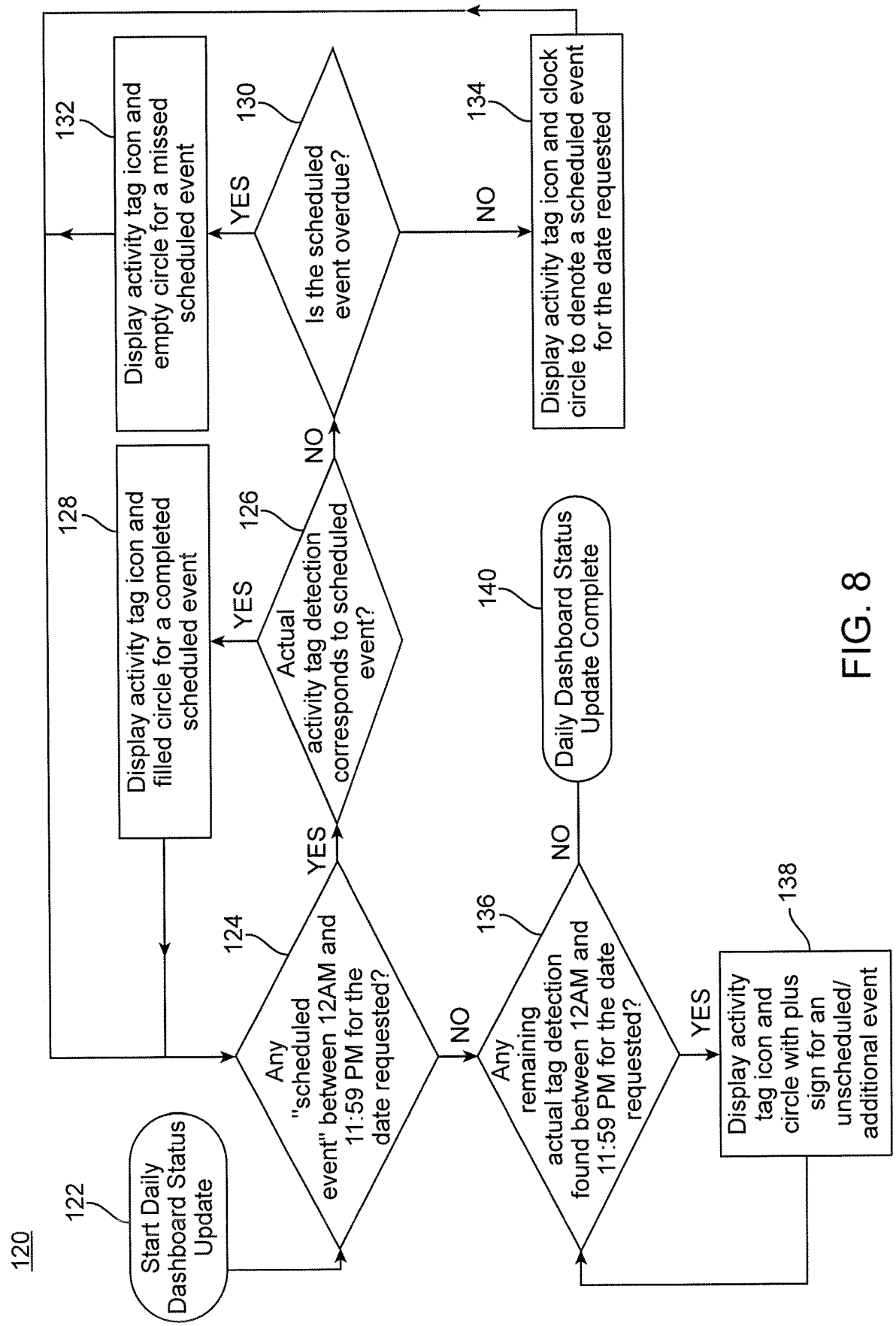
FIG. 8 is an exemplary method 124 for updating a dashboard status based on the expected (scheduled) and actual use of the activity monitoring system.

Turning now to the dashboard update method 120 illustrated in FIG. 8. FIG. 8 is an exemplary method 124 for updating a dashboard status based on the expected (scheduled) and actual use of the activity monitoring system. The dashboard status method 120 begins by starting the status update (step 122). First, determine whether there is any "scheduled event" between 12 AM and 11:59 PM for the date requested (step 124).

If there are scheduled events, step 124 is yes, then proceed to determine whether any actual activity tag detection corresponds to a scheduled event (step 126). If the actual activity tag detection corresponds to a scheduled event (step 126 is YES) then update the dashboard display to show the activity tag icon and a filled in circle (FIG. 9C) to indicate a completed scheduled event. Thereafter, proceed to step 124 to determine whether any additional schedule events are present.

If the actual activity tag detection does not corresponds to a scheduled event (step 126 is NO) then determine whether the scheduled event is overdue (step 130). If the scheduled event is not overdue (step 130 is NO) then update the dashboard display to show the activity tag icon and a clock circle (FIG. 9A) to indicate a scheduled event on the date requested. Thereafter, proceed to step 124 to determine whether any additional schedule events are present. If the scheduled event is overdue (step 130 is YES) then update the dashboard display to show the activity tag icon and an empty circle (FIG. 9B) to indicate a missed scheduled event on the date requested. Thereafter, proceed to step 124 to determine whether any additional schedule events are present.

Once all scheduled events have been processed and the answer to step 124 is no, then proceed to step 136 and determine whether if there are any remaining actual tag detections between 12 AM and 11:59 PM for the date requested (step 136). If the answer is no at step 136, then the status update is complete (step 140). If the answer at step 136 is YES, then proceed to step 138. In step 138, update the dashboard display to indicate the activity tag icon and the circle with plus sign (FIG. 9D) to reflect an unscheduled/additional event for that associated activity. Then return to step 136 and evaluate remaining actual tag detections and indicate as unscheduled/additional activities (step 138) until the answer in step 136 is no and the dashboard update is complete (step 140).

To enable a simpler way to program schedules for use with the activity monitoring system, an auto-scheduling program may be utilized. In one aspect, an auto-scheduling program is used to predict a user activity schedule once the program has completed a learning phase. During the learning phase, the system monitors the time and frequency of activity tag usage. In many circumstances, a user is completing the tracked activities on a daily basis. As a result, the learning phase period could be as short as 24 hours. However, in order to capture or identify daily or weekday type activity schedule variations, the learning phase may run for longer than 24 hours, such as 48, 72, 96 hours or for multiple days such as 7, 12 or 14 days. In one aspect, the learning phase of an auto-scheduling program operates for between 48 hours and 7 days. Once the learning phase is complete, the activity monitoring system creates a user activity schedule based on the user's your actual activity patterns.

Figure 10:
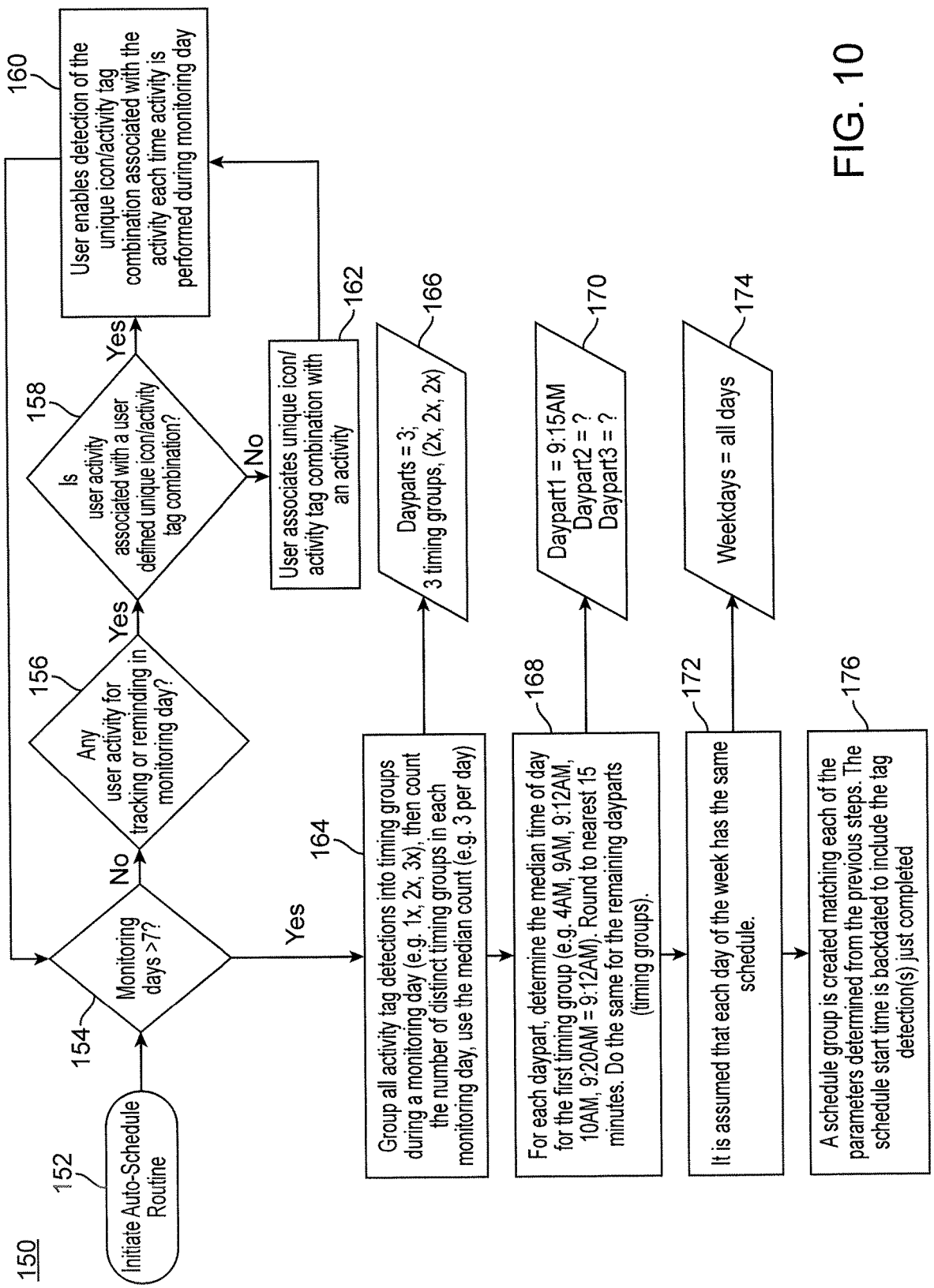
FIG. 10 illustrates an exemplary method 150 for automatically scheduling or predicting the schedule of user activities.

As such, it is to be appreciated that the activity monitoring system may be used to "auto-schedule" or determine a schedule of user activities based upon the timing and frequency of detection of one or more user selected activity tags. FIG. 10 illustrates an exemplary method 150 for automatically scheduling or predicting the schedule of user activities. First, at step 152 the auto-schedule routine is initiated. In this embodiment, the user's schedule being auto-scheduled is estimated to repeat on a weekly basis. As a result, step 154 first determines whether the number of monitoring days is greater than seven. The number of monitoring days will vary depending upon the estimated repetition frequency of a user's activity schedule and may be selected accordingly. If the answer at step 154 is no, proceed to step 156 and determine whether there is any user activity or reminders for monitoring day. If the answer is YES, then proceed to step 158. Step 158 determines whether the user activity is associated with a user-defined unique icon/connectivity tag combination. If the answer to step 158 is YES, then proceed to step 160 and the user enables detection of the unique activity tag/icon associated with the activity each time the activity is performed. If the answer to step 158 is no, then the system has detected a new user selected activity tag (step 162) to be added to be monitoring system. Thereafter the user enables detection of the activity tag by the reader each time the activity is performed during monitoring day (step 160). After step 160 is complete, return to step 154 until the monitoring days are greater than 7.

When the number of monitoring days his greater than seven, the answer to step 154 is yes, then proceed to step 164. In step 164, activity tag detections are grouped into timing groups. The timing groups used to identify distinct timing group activities during the monitoring day such as once, twice, or three times daily. At step 166 there is an example of dayparts=3 timing groups containing two activities during each occurrence (2× activity tag detection at each time).

Next, at step 168 for each daypart, determine the median time of day when the activity was performed. Thereafter at step 170 the daypart timing is determined.

Next, at step 172, each of the activities and dayparts are assumed the same for each activity tag during the week resulting in a schedule of weekdays=all days at step 174.

Finally, at step 176, the schedule group is created matching each of the parameters determined in steps 164, 168 and 172 including each of the detected unique icon/activity tags detected during the monitoring period.

Embodiments of the activity monitoring system may be used to track a user's medication schedule. Similar to the illustrative examples in FIGS. 3A-3D, a user may apply or associate a user selected activity tag with a container or other item used to store a medicine, pill or other item to be ingested on a recurring schedule.

Embodiments of the systems and methods described herein provide an individual the ability to simply schedule, remind and monitor the performance of one or more activities that the individual would like to complete with regularity. In one specific embodiment, an activity monitoring and tracking system is configured to provide scheduling, reminder and adherence information about one or more schedules for taking a medication (e.g., pill, capsule, caplet, powder, liquid, aerosol, gaseous, etc.). In some aspects, the system may provide an alert or a reminder to a medicine user to take the medication or to another person designated in the system. The activity monitoring system uses the detection of a unique machine readable element (e.g., an RF-transponder or RFID tag or NFC tag or optical recognized label) associated with a medicine container as a proxy for the user's action to take the associated medicine. The activity monitoring system may optionally receive or permit input of other data on a medication in the medicine container. When a scheduled time for an activity has arrived or has passed, an activity tag reader 30 or other suitably configured display-containing portable electronic device may generate an audible, a visual and/or a physical (i.e., vibrate) signal or provide other reminder notifications (phone, smart phone update, SMS etc.) to alert the user or a designated recipient of the reminder or other notification.

In one embodiment, a passive, unique communication element or machine readable element 14 (RFID or NFC) that is coupled to a patient selected icon 16 (pictogram, shape, color, initials, photo, etc.) is attached to a medicine container. The container holds a number of pills to be taken by the patient according to a patient specific pill regime. The medication contained in any container associated with a user selected activity tag may be an over-the-counter medicine (e.g., pill, capsule, caplet, powder, liquid, aerosol, gaseous, etc.), or a medicine (e.g., pill, capsule, caplet, powder, liquid, aerosol, gaseous, etc.) provided by a prescription. In still further aspects, the medication tracked by the system may be a vitamin, mineral supplement, dietary supplement, nutraceutical, or the like taken by the user on a recurring or regular basis over a short or long term.

Each time the patent picks up the container to take a pill, the container is passed within range of a reader in such a way to permit detection of the element 14. Within range will vary depending upon the type of machine detectable element and system used from a short range of a few cm for most RFID tags or in contact with a reader for most NFC tags. The reader will record the read time and date corresponding to when the activity tag 10 was read by the reader. The reader may maintain the tag read record locally or provide the tag read record to a remote system (i.e., cloud based activity monitoring system database or similar system). The patient record in the database will include patient identifying information and the tag read data (tag ID, date and time).

In one aspect, a patient medicine taking monitoring schedule within the system includes: patient information; tag identification information (i.e., uniquely identifies the tag to the reader/system) for each tag used by a patient; patient selected icon 16 or moniker for each tag 10 (i.e., the photo, color, letters, shapes etc.); a patient specific schedule for when the medicine associated with that patient specific icon 16/tag 10 is to be taken (1 pill/4 hours; 2 pills every 6 hours; 1 pill daily or similar information)

In one embodiment, the monitoring system does not require or specify the name of any medicine, prescription information, or any interaction with a health care provider or pharmacy or any specific dose information of any medicine being tracked by the system. A user may define the icons used for tracking a medicine bottle and enter an appropriate schedule for the dose of that medicine and begin tacking that icon in the system as a proxy for taking the medicine in the associated bottle or container.

In contrast to prior reminder system that push prescription and compliance actions, the monitoring system described herein permits user medicine scheduling to be augmented using unique tag/user icon and "bottle swipe to show adherence" to a user designed schedule.

Embodiments of the activity monitoring system described herein need only (a) a container identifiable to the system via a tag/reader and an icon or other symbol identifiable to the patient and (b) when taking the medicine the container (i.e., activity tag 10 on the container) is presented so as to be read by the reader to log the user's intention to take the medicine within the selected container. In one aspect, the machine readable element 14 of a tag 10 only contains the information related to the serial number for that element. In other embodiments, the icon/pictograph/symbol/color or other user identifiable attribute is also present. In one embodiment, the machine readable element is an activity tag does not contain any information about any drug, medicine, Rx or patient medical information. In other aspects, the machine detectable elements 14 used in the activity monitoring system are not placed in communication with any writing system containing any of the information above or are not writable elements.

One of the benefits of the user configurable activity monitoring system design is that, in some embodiments, notifications provided to the user are in terms of the time to take a pill in a container that is identified by the user defined/selected icon. The user may name the pill using any moniker including the name of the medicine, generic name or some other identifying characteristic. As an aid to a caregiver a common name or pill description may be included in the reminder but each is assigned by the user. Exemplary reminders include:

"8:15 am Take 2 Blue Boys"<dose> <user moniker>
"8:15 am Take 2 Orange Triangle"<dose> <user selected icon>
"8:15 am Take 2 Motrin/Orange Triangle"<dose> <medicine name> <user selected icon>
"8:15 am Take 2 Adapitrol/Green Cross/Yellow-Red Capsule"<dose> <medicine name> <user selected icon> <medicine description>

As described above, using the same icons and visual cues, an adherence report card for a medicine tracking user of the activity monitoring system may be provided based on a number of different time scales such as monthly, semi-annually, annually or weekly. In one illustrative example, adherence reports are provided in 2 modes:
Lifetime of a medication
Weekly snapshot for all medications In one aspect, all active medications tracked/monitored within the activity monitoring system are shown in adherence reports.

In still further aspects of the pill monitoring implementation of a dashboard and one or more adherence reports, additional alerting and notification systems are provided by the activity monitoring system. Given the importance of the medicine taking scheduled activity, three additional functionalities were included into embodiments of the activity monitoring system. One or more of the following functionalities may be provided:
Alert system to any possible personal disability or serious incident occurring with user inferred by a lack of expected activity
Detect possible technical issues with the activity tag reader or other activity monitoring system operations such as network dependencies, such as Wi-Fi or 3G affecting Internet connectivity
Determine if any user usability or access issues may be preventing use of an activity tag reader or the monitoring system, or even lack of motivation to continue using the device to track medication usage.

As a result, embodiments of the activity monitoring system configured for use in tracking medicine taking activities includes one or more alerting systems. In one aspect, the system provides reminders (see FIG. 6) usually sent before at or the scheduled time for the medication. In one aspect, a reminder may be sent after the time scheduled. In one embodiment, a reminder is always sent, even if the medication has already been taken. In one embodiment, a reminders are sent to the pill-taker.

In another aspect, the activity monitoring system provides exception alerts configured as appropriate for a medicine taking activity (see FIG. 7). In one embodiment, an exception alert may be sent either 30, 60 or 120 minutes after the scheduled medication (expected time) occurred. Exception alerts are only sent when the medication has not been taken before the 30, 60 or 120 minute period after the usual schedule. In one aspect, an exception alert is sent to the pill-taker and any other interested party via email.

In another aspect, the activity monitoring system provides medication logged alerts. In some system configurations, a user is tracking/monitoring certain medications with significant adverse health consequences in not taken on a specific schedule. In these circumstances, alerts can be sent out upon each dose. One example use might be for pain relief medication, as they are often intended to be taken only as needed. In one embodiment, an exception alert is sent to the pill-taker and other interested party via email.

FIGS. 11-17C2 illustrate a variety of different embodiments of medicine containers adapted for use with a user selected activity tag. In this environment, the meaning associated with the dashboard icons is different as the specific activity corresponds to taking one dose or a specific combination of pills to provide a dose or other combination of actions associated to an action tag and taking medicine.

The meaning of the various dashboard icons, previously described in FIGS. 9A-9D are now associated with the meanings set out in FIGS. 18A-18D. It is to be appreciated that even when configured for a specific activity the activity monitoring system functions with the same 4 activity states. Each one of the various pill container embodiments will now be described in turn.

FIG. 11 is a perspective view of a weekly, am/pm or twice daily pill box 180 having a user selected activity tag. The pill box 180 is partitioned into each day of the week. Each day of the week has a pair of chambers 182, 184. The chambers 182, 184 are then filled with as needed according to the user's morning and evening or twice daily pill schedule. A single activity tag 10 is used to indicate that a user is taking an action with the pill box 180. The activity tag 10 is visible on one end of the box 180. The activity tag 10 includes a disc shaped base 12 and an icon 16 that is the number 2. In use, the activity tag 10 would be positioned such that the machine detectable element associated with this activity tag is detected by or interacts with the activity tag reader 30 or scanner 36, depending upon the specific implementation of the activity monitoring system. In use, early in the day detection of the activity tag for the pill box 180 is associated with the action of taking the pills contained in the am chamber 182. The dashboard would indicate the icon 2 and a filled in circle (see 143 FIG. 18C). The next activity tag detection for icon 2—or the later in the day detection of the activity tag for the pill box 180—is associated with the action of taking the pills contained in the pm chamber 184. The dashboard would then update to indicate the icon 2 and an additional filled in circle (i.e., FIG. 18C). For this day, the user would also have perfect adherence since there are two doses associated with activity tag icon 2. Since both the am and the pm activity tag detection events occurred, then the user is presumed to have taken both the am and pm doses for perfect adherence to that two dose daily schedule. The user dashboard may also update to indicate a perfect adherence icon, such as the smile face 145 (FIG. 9E).

FIGS. 12A and 12B are top and bottom views respectively of a weekly once daily pill box 185 including a user selected activity tag. As best seen in FIG. 12A the pill box 185 is partitioned into each day of the week. Each day of the week has a chamber 186. The daily chambers 186 are then filled with as needed according to the user's daily or day of the week pill schedule. As best seen in FIG. 12B, a single activity tag 10 is used to indicate that a user is taking an action with the pill box 185. The activity tag 10 is visible on the bottom of box 185, but may be placed in a different position. The activity tag 10 includes a disc shaped base 12 and an icon 16 that is the number 4. In use, the activity tag 10 would be positioned such that the machine detectable element associated with this activity tag is detected by or interacts with the activity tag reader 30 or scanner 36, depending upon the specific implementation of the activity monitoring system. In use, the detection of the activity tag 10 for the pill box 185 is associated with the action of taking the pills contained in the chamber 186. The dashboard would indicate the icon 4 and a filled in circle (i.e., FIG. 9C). Since this is a once a day regimen, for this day, the user would also have perfect adherence since there is only a single dose associated with activity tag icon 2 per day. Since the scheduled/expected activity tag detection event occurred, then the user is presumed to have taken the once daily dose for perfect adherence to that once daily schedule. The user dashboard may also update to indicate a perfect adherence icon, such as the smile face 145 (FIG. 9E).

In various other embodiments, the pill containers illustrated and described in FIGS. 11-12B may be configured to include a Bluetooth or other wireless communication capability to provide an indication of overall pill box use and/or for each individual container use in a pill box. In such a Bluetooth enabled pill box/strip embodiment, each lid of a compartment 182/184 (FIG. 11) or compartment 186 (FIG. 12A) is adapted to trigger a Bluetooth sensor when the corresponding compartment is accessed. When the compartment is accessed (i.e., the lid on the container is opened) the system assumes that the user has taken the pill(s) or contents in that container. A data point (e.g., the identification of the Bluetooth element detected and the date/time of detection) is then transmitted via Bluetooth to a smartphone or other handheld electronic device. In an alternative example a compact motion sensor or accelerometer or other MEMS-based device may be used to also indicate motion, movement or user action to undertake a tract activity. Thereafter, the data point or plurality of data points are transmitted over the cellular network, via Wi-Fi or other suitable communication mode to a cloud based/API configured for use with the activity monitoring system. In still another alternative embodiment, reader 30, each box/drawer/container of a multiple day pill box may be configured with light-based indicator or an LED, for example. The light-based indicator or LED would flash when the contents associated with that container/LED are to be taken, when an action is taken or to indicate a degree of adherence. The activity schedule for the use of this embodiment would be established in a manner similar to those described herein. In one specific embodiment, one modification is that the machine readable element is a Bluetooth element either alone or part of a MEMS package on the compartment and the activity tag reader 30 is now the Bluetooth enabled smartphone or other suitable electronic device. Notifications, exceptions, reminders and other aspects of system use may be provided as described herein to send email or text message to caregivers/interested parties in the event that the medication had not been taken by a certain pre-determined time.

FIGS. 13A and 13B are top and bottom views respectively of a weekly once daily pill strip 190 having a user selected activity tag. As best seen in FIG. 13A the pill strip 190 is partitioned by perforations 4 containing a pill 2 for each day of the week. As best seen in the bottom up view of FIG. 13B, each pill 2/day of the week has a unique activity tag 10 (i.e., icons 16 are D1-D7 on a square base 12) associated with each pill 2. In use, the individual pill 2 is separated at the perforation 4 and then the single activity tag 10 for that pill (icons D1-D7) is detected to indicate that a user is taking one of or a specific pill 2. It is to be appreciated that the pill strip 190 may also include the same tag 10 on each perforated pill container 192 and each one scanned as indicated in the examples of FIGS. 11, 12A/12B for use of a single tag. The activity tag 10 is visible on the bottom of each perforated pill compartment 192 as best seen in FIG. 13B. The activity tags 10 include a square shaped base and an icon that is the number D and a number 1 to 7. In use, the user would separate the pill compartment 192 with associated tag from the strip 190 using perforation 4. Then the specific activity tag for that pill 2 would be positioned such that the machine detectable element associated with this activity tag (i.e., D1-D7) is detected by or interacts with the activity tag reader 30 or scanner 36, depending upon the specific implementation of the activity monitoring system. The detection of the specific activity tag D1-D7 is associated with the action of taking the pill 2 contained in the designated perforated pill chamber 192. The dashboard would indicate the icon 4 and a filled in circle (i.e., FIG. 9C). Since this is a once a day regimen, for this day, the user would also have perfect adherence since there is only a single dose associated with activity tag per day. Since the scheduled/expected activity tag detection event occurred, then the user is presumed to have taken the once daily dose for perfect adherence to that once daily schedule. The user dashboard may also update to indicate a perfect adherence icon, such as the smile face 145 (FIG. 9E).

Figure 16A:
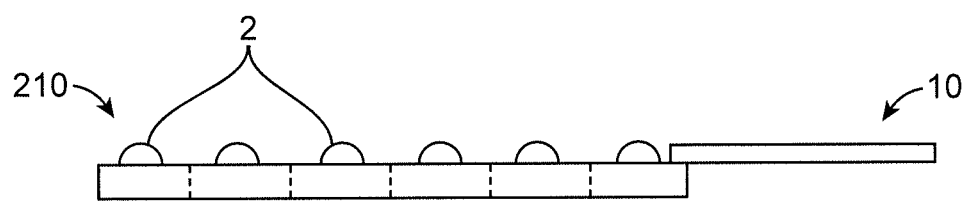
FIGS. 16A and 16B are side and top views respectively of a 15 dose, blister pack 210 including a user selected activity tag affixed to an edge of the pack.
Figure 16B:
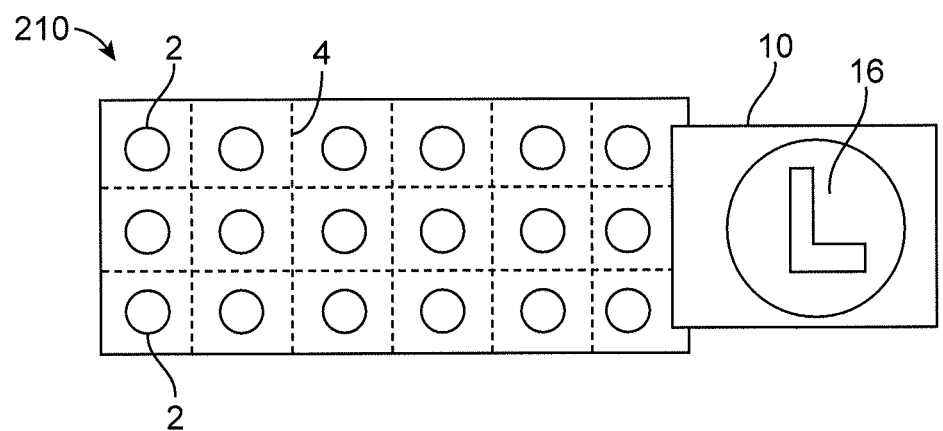

FIGS. 16A and 16B are side and top views respectively of a 15 dose, blister pack 210 including a user selected activity tag affixed to an edge of the pack. As best seen in FIG. 16B the blister pack 210 is partitioned by perforations 4 into 15 individual doses of a pill 2. As best seen in the side view of FIG. 16A a single activity tag 10 (i.e., the icon L on a disc) associated with the pill 2 in the blister pack 210. In use, the individual pill 2 is separated at the perforation 4 and then the single activity tag 10 for the blister pack 210 is detected to indicate that a user is taking one of a pill 2 associated with the blister pack 210. It is to be appreciated that—like the pill strip 190—the blister pack 210 may be configured to include unique or the same tag for each of the pills 2 within the blister pack 210. In the illustrated embodiment, the tag 10 is an example of an edge mounted activity tag. In this way the activity tag is positioned to the side of the blister pack 210 to reduce possible interference with reader/scanner from foil linings that are common to blister packs. Foil or other interfering materials that occur in containers that are being tracked may also be tracked by using a separate activity tag (i.e., one that is not attached to the container) but is placed on the detector when the tracked action occurs. This is similar to the additional tag used in the multiple person embodiment described below with regard to FIG. 24. In still another aspect, the use of potentially interfering containers may be addressed by providing appropriate shielding for the tag/scanner 36 or body 32.

Figures 14, 15:
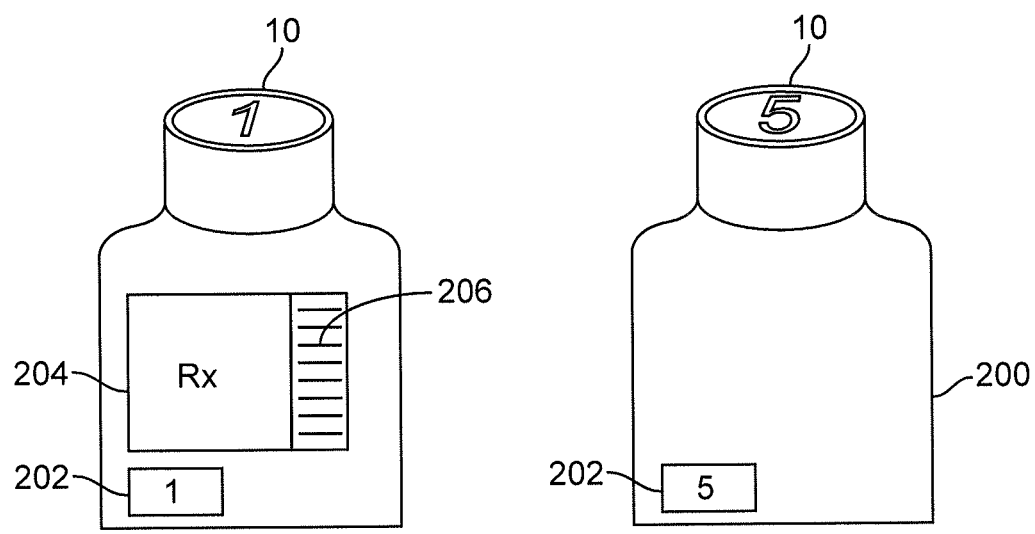
FIGS. 14 and 15 illustrate perspective views of pill bottles 200 having user selected activity tags 10 affixed to the bottle caps as shown.

As the previous examples illustrate, the activity monitoring system correlates the detection of a machine detectable element 14 within, attached to or associated with an activity tag 30 to a user action. As a result, it is important to the efficient and accurate operation of the monitoring system for a user to maintain the proper registration between an activity tag and a container, object or device associated with that activity tag. FIGS. 14 and 15 illustrate perspective views of pill bottles 200 having user selected activity tags 10 affixed to the bottle caps as shown. Given the similarity of many pill bottles, there is a possibility that the bottle cap may be placed on the incorrect bottle. However, once the activity tag is registered to the activity tracking system for a particular bottle, then detection of that activity tag is used as the proxy for the user taking the one or more of the pills in the bottle. In one embodiment, a sticker 202 bearing a likeness to the icon of the correct activity tag may be applied to the bottle of the pill container 200. As shown in FIG. 14, a sticker 202 is used that contains the icon 1 to match that of icon 1 on the tag 10 on the cap. Similarly, as shown in FIG. 15, a sticker 202 is used that contains the icon 5 to match that of the icon 5 on the tag 10 on the cap.

FIG. 14 also illustrates an embodiment of a prescription label 204 on the pill bottle 200. The prescription label 204 may include text as well as machine readable features 206. In the illustrative embodiment of FIG. 14 the machine readable feature is a bar code. Bar codes or other pre-existing machine readable features 206 may be used by the activity monitoring system so long as the feature 206 is detectable by the system to provide a unique identification for tracking the associated container. In some optionally embodiments, the API/cloud or remote server is in communication with the source of the prescription information and a user may populate the activity tracking system is additional information associated with an activity tag. In other aspects, a user may use another device or smart phone or tablet to read the bar code or other machine readable data and then associate that information with an icon within the activity tracking and monitoring system.

FIGS. 14 and 15 are perspective views of pill bottles with a user selected activity tag affixed to the lid. These views also illustrate how a lid affixed activity tag 10 may move from bottle to bottle as pills are consumed and refilled. In this way, the use of the activity tracking system may continue along with refilled prescriptions by simply using the lid with the activity tag associated to that prescription with the new refilled bottle.

FIGS. 17A-17C2 illustrate another alternative embodiment of ensuring that the proper bottle, cap and activity tag remain associated and used together. As shown in FIG. 17A illustrates front views of three medicine bottles 200 each having a pair of similarly machine coded user selected activity tags on a lid and the body of the bottle. The icons on each tag are also identical matched pairs. In this example the tags have A/A, B/B and C/C. The three bottles are registered in an activity monitoring system as described herein each with unique machine readable elements as well as user selected icons A, B and C. In this embodiment of ensuring that correct activity tag to bottle registration is maintained, matching activity tags are provided on the bottle and the cap as shown. In contrast to FIGS. 14 and 15 in which only the icon is represented in sticker 202, the bottles 200 in FIG. 17A have activity tags on both the cap and the body positioned to both be read during a single interaction/detection with the reader/scanner 36 or the activity tag reader 30. FIG. 17B1 illustrates a bottle of FIG. 17A with an incorrect lid (lid A on bottle C) and an exemplary associated display warning as in FIG. 17B2. FIG. 17B1 illustrates a mixed bottle/cap situation with tag having icon A is on the bottle having tag icon C. When positioned near the reader and reminder unit 30 as shown in FIG. 17B2, the activity and monitoring system detects the two different tags (A and C) and not A as scheduled and shown in display 34. This user had configured the system to schedule icon A to correlate to 2×50 mg tables in the associated bottle. The schedule expected the machine readable element associated with icon A to be present at 0900. As a result, the display can update or the system may provide an appropriate warning to the user. The lower portion of the display 34 in FIG. 17B2 has been updated to read "WRONG BOTTLE." FIG. 17C1 illustrates a bottle of FIG. 17A with a correct lid and bottle arrangement (lid A with bottle A) and an exemplary associated display as in FIG. 17C2. In the illustrative embodiment of FIG. 17C1 the bottle and cap both contain identical tags 10—here both have icon A and the corresponding similar machine readable element. Since the tags on the bottle and cap match, the display 34 in FIG. 17C2 indicates that the expected icon A was present according to the schedule. The lower portion of the display 34 is updated to read "RIGHT BOTTLE" as a result. Other warnings such as audible warnings or alarms may be used to indicate proper and improper bottle/cap combinations. Examples include messages such as check bottle, you got it, righto, bingo, bottle/cap match, try again, not matched, a check mark, an X mark, changing the color of the display to red, changing the color of the display to green or other different correct or error indicators as selected by the user.

Figure 18A:
FIGS. 18A-18D are use of icons used to indicate one of four possible states for an activity.
Figure 18B:
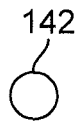
Figure 18C:
Figure 18D:
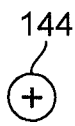

As used herein, a dashboard is a representation provided by display 34 of the status, adherence, schedule or other characteristics of a one or more users of an activity tracking system. When the dashboard updates using an exemplary method 120 (FIG. 8) where the activity is taking a dose at a scheduled time, a user is provided with the icon for the activity along with a status indicator (FIGS. 18A-18D). Additionally, or optionally, a dashboard may also be updates to include an adherence indicator reflecting the adherence to schedule for one or more scheduled activities monitored by the activity monitoring system. Advantageously, embodiments of the activity tracking system use simple icons and system states to indicate the status (FIGS. 18A-18D) or adherence (FIG. 9E-9G) to schedules dose activities within the system. Activity status indicators as shown in the illustrative embodiments of FIGS. 18A-18D are use of icons used to indicate one of four possible states for an activity. An upcoming scheduled dose is upcoming or scheduled to occur in the future. This state is indicated by, for example, a clock within a circle 141 as shown in FIG. 18A. A dose that has been missed is indicated by an empty circle 142 as shown in FIG. 18B. A dose that has been completed is indicated by a fill-in circle 143 shown in FIG. 18C. An additional dose taken that was not scheduled but has been completed is indicated by a circle with a cross 144 as shown in FIG. 18D. Adherence to the dose schedule is also indicated with simple status icons indicating one of three possible states. The three possible adherence states are (1) perfect adherence to schedule, (2) almost perfect adherence to schedule and (3) poor or lacking adherence to schedule. FIG. 9E illustrates a happy face 145 for the perfect schedule adherence. FIG. 9F illustrates a sad face 146 for near perfect adherence. FIG. 9G illustrates a sad face 147 for poor or no adherence.

Since there are some medications that are to be taken "with food" or "without food" or "with milk" or other requirements—there could also be a "FOOD" or "liquids" activity tag provided with the system. A user may swipe such a tag when he is or going to eat or drink (e.g., drank 8 oz. of water). The activity tracking system marks the food time/drink time. As described below with the machine readable patient state indicator 490, the system may also capture or collect or accept user input for a general self-perceived wellness indication. As a result, a user data set will include timing of the dose taken, when he ate or drank, along with an indication of wellness. Variations, correlations or other information drawn from the timing and meaning of those recorded events may be included in a review of activity and/or dose scheduling, adherence and wellness for the user. A user dose or activity schedule may then be modified based on one or more factors such as improving adherence or improving wellness.

Figure 19:
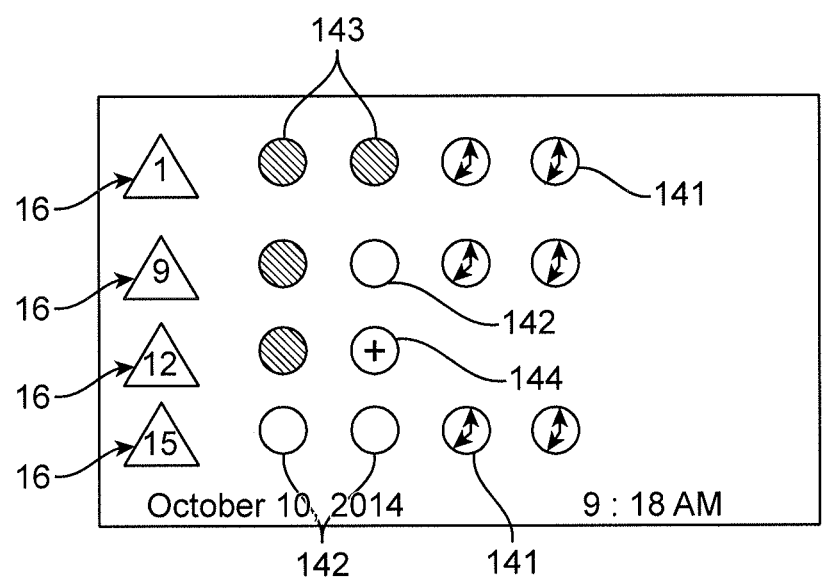
FIG. 19 is an exemplary user dashboard or display or indication by the activity tag reader 30, such as would appear in display 34 showing current status for four tracked activities indicated by icons 1, 9, 12 and 15.

FIG. 19 is an exemplary user dashboard or display or indication by the activity tag reader 30, such as would appear in display 34 showing current status for four tracked activities indicated by icons 1, 9, 12 and 15. In this specific example, a user is taking four different medications as indicated by the unique identifiers 1, 9, 12 and 15. The icons correspond to the definitions provided in FIGS. 18A-18D. In this example, each activity to take the pill (as indicated by icons 1, 9, 12 and 15) will occur 4 times in the case of the pill associated with icons 1, 9 and 15 and twice with the pills associated with icon 12. This dashboard indicates the user's status of all 4 icons as a proxy for the associated activities.

Figure 20:
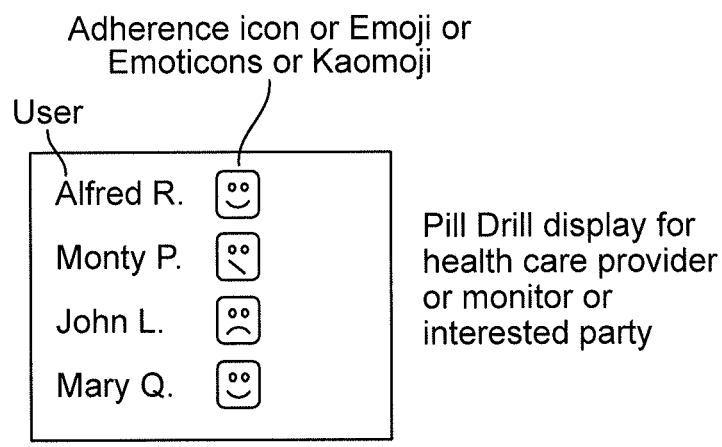
FIG. 20 is an illustration of a display indicating the adherence indication for several users of the monitoring system.

FIG. 20 is an illustration of a display indicating the adherence indication for several users of the monitoring system. This summary adherence for multiple users may be useful when an activity monitoring system as described herein is used with a number of users in a single location or under the care of a single caregiver. By virtue of the three states for activity adherence, a caregiver may quickly scan the display illustrated and determine that Alfred R and Mary Q are doing well at present with perfect adherence (i.e., smile 145). Similarly, while not perfect, Monty P. is likely doing well enough (i.e., side grin 146). The display makes it readily apparent to the care giver that of the four patients being monitored John L has non-adherence or poor adherence to his schedule (frown icon 147). At a glance, the caregiver knows to check on John L. first followed by Monty P. in other embodiments, different adherence indicators may be used such as symbols, icons, emoji, or emoticons to indicate at a glance adherence to scheduled activity.

Figure 21:
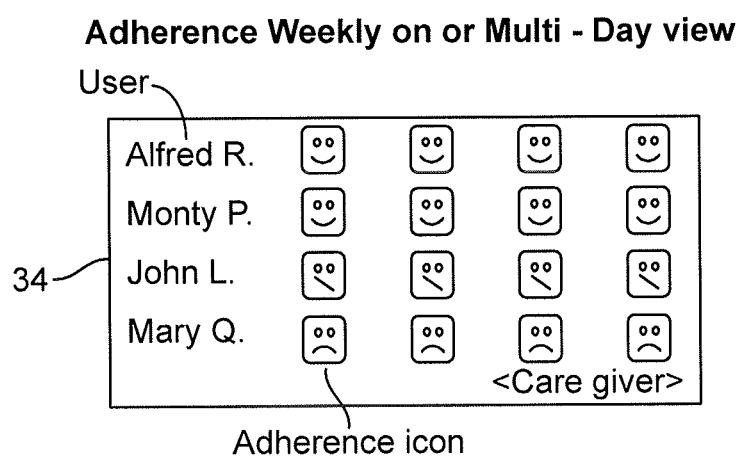
FIG. 21 is a screen shot of a display 34 indicating a multiple patient multiple day or multiple monitoring period view of adherence for four different patients.

FIG. 21 is a screen shot of a display 34 indicating a multiple patient multiple day or multiple monitoring period view of adherence for four different patients.

Figure 22:
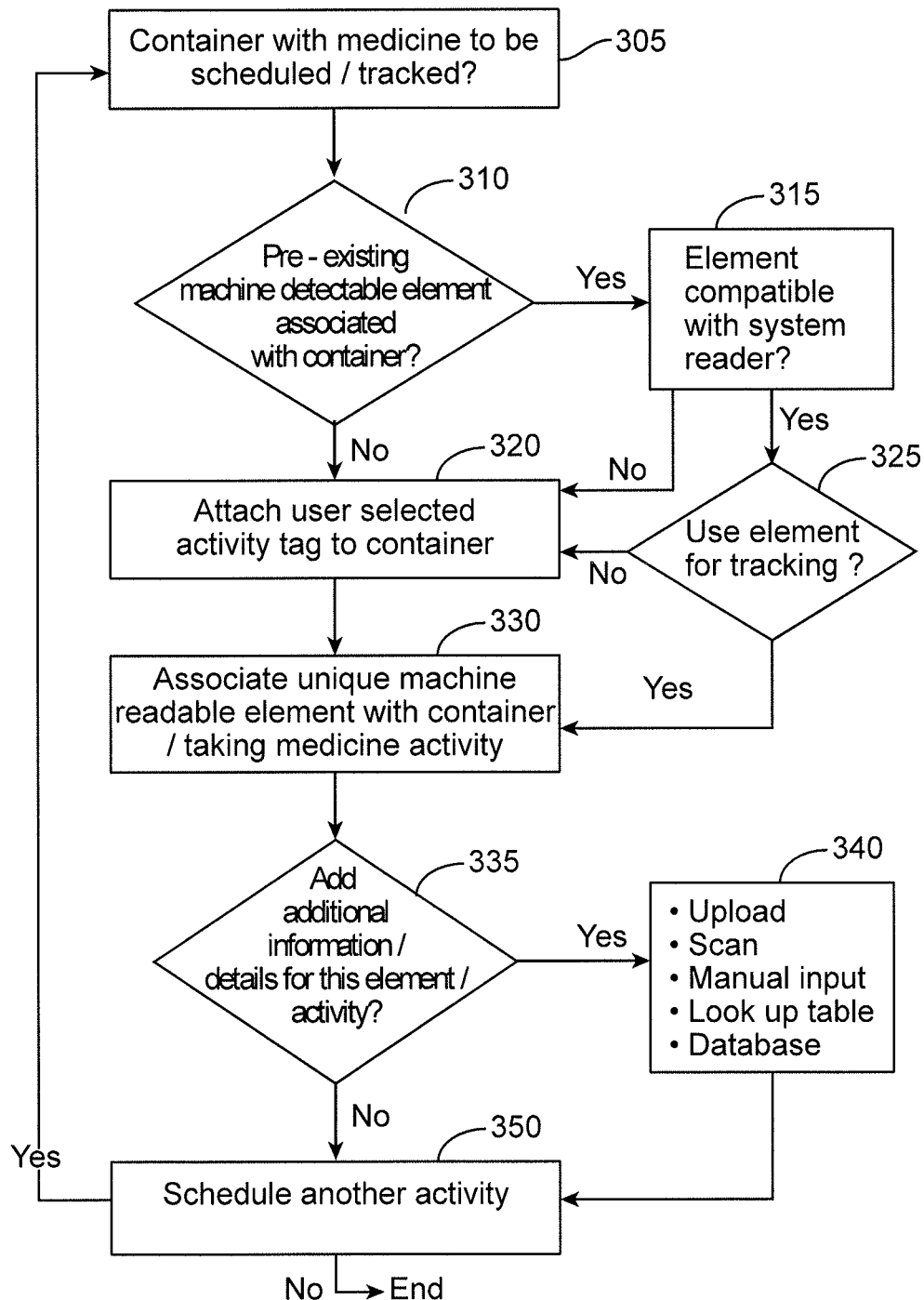
FIG. 22 is a method 300 for establishing an activity monitoring system adapted for use in tracking or scheduling a person's medicine regime.
Figure 23:
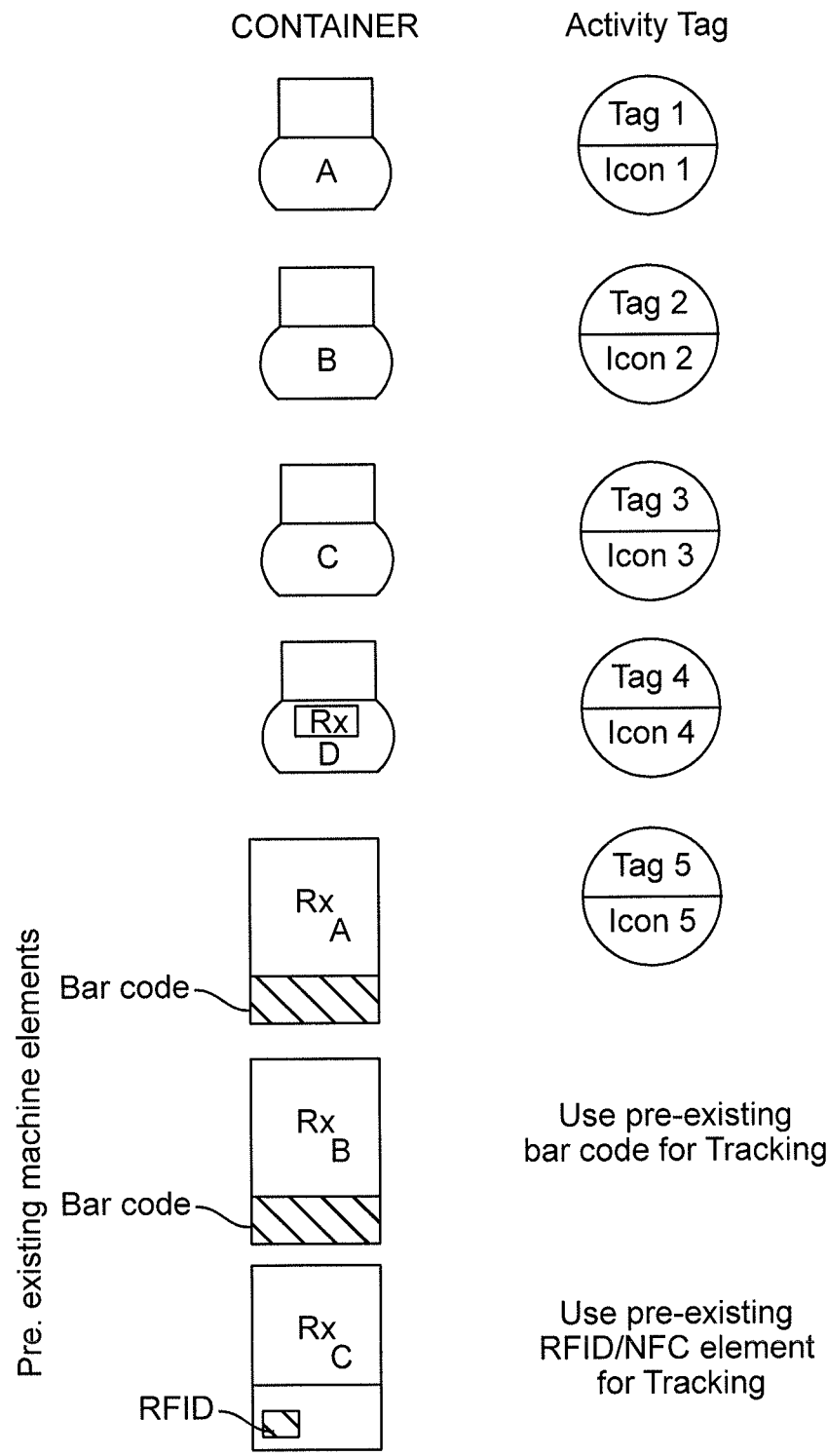
FIG. 23 illustrates various pill bottles that are plain (A, B and C), include text on a label (D) or include a pre-existing machine readable element such as a bar code (RxA and RxB) or an RFID element (RxC).

FIG. 22 is a method 300 for establishing an activity monitoring system adapted for use in tracking or scheduling a person's medicine regime. FIG. 23 illustrates various pill bottles that are plain (A, B and C), include text on a label (D) or include a pre-existing machine readable element such as a bar code (R×A and R×B) or an RFID element (R×C). In some embodiments, pre-existing machine readable elements may contain information that can be read by the system. In other embodiments, the only aspect of the machine readable element that is used by the activity tracking system is a unique element ID. In other embodiments, pre-existing machine readable elements such as printed barcodes on prescription labels are not used by the system and are ignored by the activity tag reader 30.

Returning now to the method 300 of FIG. 22 that will be described with the exemplary patient situation found in FIG. 23. First, determine if there is a container with medicine to be tracked (step 305). In the case of FIG. 23, this user has 7 different containers or medicines to be tracked. At step 310, determine whether there is a pre-existing machine detectable element 14 associated with the container.

If there is a pre-existing machine detectable element 14 (Step 310 YES), step 315 is used to determine if the element is compatible with the activity tag reader 30 in the system. In the case of the bottles R×A, R×B and R×C it would be a matter of determining is the bar code or RFID is recognized or may be used by the system. In any event, if the results of steps 315 or 325 are NO, then proceed to step 320 and attach a user selected activity tag to the container.

If there is not pre-existing machine detectable element 14 (Step 310 NO), then proceed to step 320 and attach a user selected tag 10 as described above. FIG. 23 illustrates that the user has 5 unique tags (tags 1-5) each with its own unique and user selected icon (icons 1-5). The tags are attached one per bottle—as needed—following the steps outlined in method 300.

Next, after attaching a tag (step 320) or determining that a pre-existing tag is acceptable (step 325 is YES), the user will associate the unique machine readable element within the activity tag for a specific bottle with the action of taking the medicine contained in the bottle. Each time that activity tag is detected by the activity tag reader, then the system will indicate that a pill or dose or unit of that bottle has been taken by the user.

Thereafter, at step 335, the user may add additional information to associate with the bottle/activity tag combination. There are many different ways to add information into the activity monitoring system such as by uploading information from a personal record, a medical history, scan from smart phone or hand held device, manual input, look up table, access to a pharmacy database, access to a medical center database or other accessing a source of information available to the user to assist the user in complying with a medicine taking regime. If there is no additional information to add (step 335 NO) or when step 340 is completed by adding information, the user determines (step 350) if there is another activity to add, if so, returns to step 305. If the answer at step 350 is NO, there are no more activities to add then the process 300 ENDS.

FIG. 24 is a chart illustrating an exemplary set up when multiple users are using a single activity monitoring system including the use of an individual tag used indicate a dose taken from a common source. In this example, the first user, Pam, has a medicine prescription (Rx) including 4 medicines associated with icons (i.e., unique activity tags) P1, P2, P3 and P4. The second user, Lawrence, has a medicine prescription (Rx) including 4 different medicines associated with icons (i.e., unique activity tags) L1, L2, L3 and L4. Pam and Lawrence each tag common medicines 1, 2, 3 and 4. Common medicines include, for example, herbal medicines, over-the-counter medicines, vitamins or pain relievers and the like. Pam has a separately registered tag designated Pam tag as does Lawrence, Lawrence tag. The separately registered tags are not associated with any particular bottle. These tags are used to indicate a system action taken by a specific registered user, in this example, Pam or Lawrence.

In use, Pam and Lawrence will use the activity monitoring system as described above for their own individual activity tags P1-P4 and L1-L4 respectively. When a medicine is taken from an individual bottle, the tag for that bottle is positioned so as to be detected by the reader 30. The detected machine readable element within the registered tag is used to indicate that the action (taking the medicine in the bottle) was taken. When Pam or Lawrence is scheduled to take one of the common medicines (having tags 1, 2, 3 and 4) the common bottle tag and the separate tag (Pam or Lawrence) are each scanned when the medicine from the common bottle is taken.

In the case of the patient specific bottles, P1-P4 for Pam and L1-L4 for Lawrence, each will swipe the bottle relative to the tag reader as scheduled and described above. Each action for these patient specific bottles is recorded against their specific activity tags. In the case of the common medications, the user will scan the common tag followed by their individual tag. For example, if Pam takes, she would scan the common to bottle tag and then the Pam tag. The system would then log that Pam took the common to dose at that particular scan time. In another example, Lawrence takes common 3, and would scan the common 3 bottle tag. Thereafter, he would scan the Lawrence tag. In this case system would log the Lawrence took the common 3 dose at the scan time Activity Tracking System Configured for Clinical Trial In one aspect any of the steps described below may also include having the user indicate wellness or other specified subjective information using the machine readable patient indicator 490. Use of the machine readable wellness indicator in conjunction with the steps of taking medication or other actions in the clinical trial would provide a better accuracy for the time lag between when the drug if taken (i.e., detection of machine element on drug bottle or other scan to indicate completion of dose) and subsequent scans of the machine readable patient wellness indicator 490. Such actions would provide increased accuracy for any time lag between medication consumption and the onset of any side-effect, if any. In one aspect, a user may be prompted to swipe the wellness indicator 490 at regular intervals after drug consumption in order to standardize data collection.

Challenges exist in clinical trials relating to:
Confirming enrollment of participants, providing medications, scheduling routine for taking medications and participant follow up at intervals
Ensuring participant compliance with scheduled routine and prompt notification for variations in compliance and severity of non-compliance with trial protocol for a particular patient
Simple interface used by both trial participants and trial organizers
Tracking of other patient actions including other medications and timing of medications for insights into possible drug interactions or patient well-being monitoring Activity Monitoring System configuration for use in Clinical Trial Compliance and Monitoring A. Set up trial groups and factor(s) explored in clinical trial. In this example, Test Drug is being evaluated for possible new Drug Interaction with potentially interfering drug B. (Pot interfering Drug B) to test timing intervals between doses at two time intervals (Time 1 & Time 2)

| Trial Group | Description |
| --- | --- |
| A | Test Drug Only |
| B. | Test Drug + Pot interfering Drug B @ Time 1 |
| C. | Test Drug + Pot interfering Drug B @ Time 2 |
| D. | Sham group 1 takes placebo + Drug B @ Time 1 |
| E. | Sham group 2 takes placebo + Drug B @ Time 2 |

B. Load activity specific protocol for each of the trial groups A-E into activity tracking system containing Trail Group Specific activity tag.

C. Enroll test subjects from each trial group into activity tracking system and then correlate test subject to specific dosing protocol according to Trial Group A, B, C, D, or E dosing regimen. Each test subject is identified in the system by test subject ID, trial group and activity tag identification.

D. Deliver, ship or provide activity tracking system to each test subject. The reader/scanner is pre-loaded with activity tracking software or internet enabled specific enrollment for that subject for that clinical trial. Optionally, the system may also include all medications for the trial period or a specific segment decanted into containers labeled/registered for use in week 1, 2 . . . etc.

E. Test subject activates the activity tracking system at home, is trained online or visited by clinical trial or activity tracking system representative for "initial set up" and training. Note that there may be an additional processing decision loop to the clinical trial team if shipment received "Yes" but activation "No." In this case, there is a follow up call/contact with the test subject.

F. As set out in the trial protocol, the test subject takes the appropriate medicine and interacts with the activity tracking system as described herein.

G. Activity tracking system monitors test subject compliance according to Trial Group regime. Note inclusion of feedback if test subject regime timing pill+'yes' but test subject indication of taking pill+'No'→call/contact test subject.

H. Activity tracking system captures trial test subject health/mood/wellness/activity etc. indicators alongside drug dose timing data when entered by test subject (optional)

I. Activity tracking system queries the test subject at a pre-determined interval or if exception occurs or at other times about general health, side effects or other indications particular to the clinical trial. Query may be timed to a particular trial group or period. For example, general health inquiry once week during trial period. In particular for testing interaction or sensitivity (i.e., taking medicine with or without food or with milk instead or water) a wellness query could be automatically generated at set intervals from last activity tag detection. In other configurations depending upon specifics of a clinic test, a test drug interaction for timing between dosing of different but potentially interfering or adverse side effects inducing drugs by prompting wellness at intervals 60 min., 90 min., 120 min., or other timing to check interaction (optional).

J. (Optional) Within the context of a clinical trial monitor or as additional functionality provided to any of the activity systems described herein, an activity monitor user may also use the activity monitoring system for self-monitoring and potential mitigation of self-observed adverse reactions. For example, most medicines provide a range of time between does or when taken with another medication. In this instance, an activity tracking system user may use the activity tracking system along with self-reported wellness (i.e., using numeric scale or letter scale or emotion/expression face icon as in FIG. 25A-25F) to test and adjust different pill timing within prescribed ranges and record wellness, side effects or other symptom alleviation based on the particular pill/dose combinations or timing. Advantageously, an activity monitoring system user may monitor his activity and analyze activity data collected in an embodiment of an activity tracking system described herein to adapt or adjust particular dose timing in order to test different timing and compare the resulting sense of wellness/interactions/side effects (better or worse).

In one aspect, embodiments of the activity monitoring system described herein may be adapted and configured to receive an input from a wellness indication or a pain indication device. The pain indication device indicates a user determined level of pain or wellness coupled to a unique machine readable element as described herein. The machine readable element is coded to the corresponding pain or wellness indicator so that when the element is detected the appropriate level of wellness or pain is recorded with a date and time of element detection at an appropriate scanner, such as an embodiment of an activity tag reader 30.

One exemplary universal pain scale includes six discreet pain levels. The pain levels are represented by a number, a short text description and a smiley face that varies in varying levels of smile/grimace depending on the level of pain. This exemplary pain scale is also known as the Wong Baker pain scale.

In one aspect a text descriptor, icon, or number alone or in any combination may be used to indicate a user's mood, mental state, wellness or other subjective characteristic to be tracked. A unique machine readable element 14 may be associated with each tracked subjective characteristic and tracked by the user with a reader 30 as described herein.

Each one of the icons in FIGS. 25A-25F may be configured as an icon 16 (i.e., color plus expression or imoji or emoticon) on a disc-shaped base 12 containing a unique machine detectable element 14. FIGS. 25A-25F illustrate icons representative each of the six different levels on an exemplary pain scale. Optionally or additionally, FIGS. 25A-25F also illustrate activity tags with icons for each level and machine elements 14 coded to be recognized by reader 30 for each level. Such uses are possible in all of the various embodiments of the machine readable patient state indicator 490 described herein.

Figure 25A:
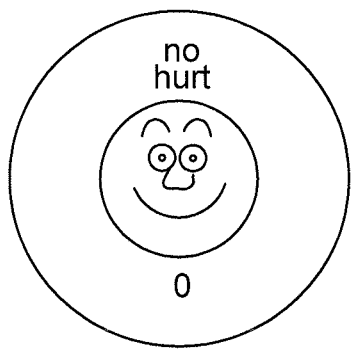
FIGS. 25A-25F illustrate icons representative each of the six different levels on an exemplary pain scale.
Figure 25B:
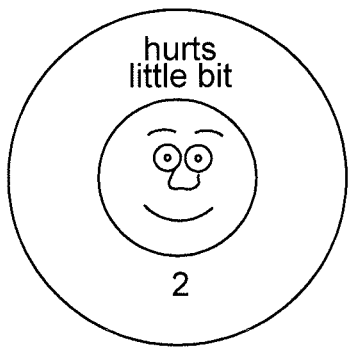
Figure 25C:
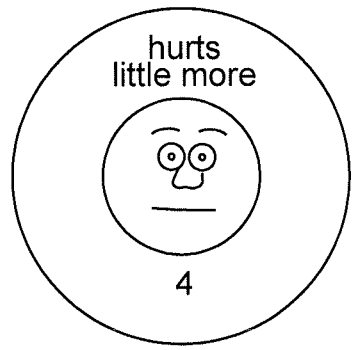
Figure 25D:
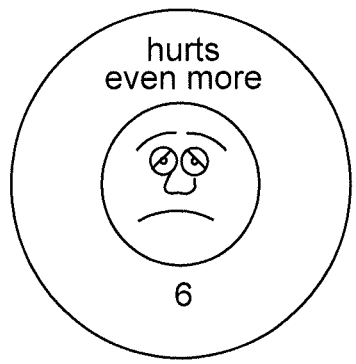
Figure 25E:
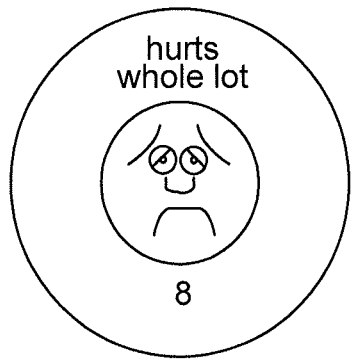
Figure 25F:
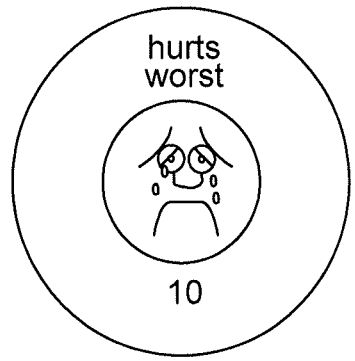

FIG. 25A illustrates an exemplary icon 16 or tag coded for a pain level 0 "no hurt" face on a green colored background. FIG. 25B illustrates an exemplary icon 16 or tag coded for a pain level 2 "hurts little bit" face on a lime colored background. FIG. 25C illustrates an exemplary icon 16 or tag coded for a pain level 4 "hurts little more" face on a blue colored background. FIG. 25D illustrates an exemplary icon 16 or tag coded for a pain level 6 "hurts even more" face on a yellow colored background. FIG. 25E illustrates an exemplary icon 16 or tag coded for a pain level 8 "hurts whole lot" face on a pink colored background. FIG. 25F illustrates an exemplary icon 16 or tag coded for a pain level 10 "hurts worst" face on a red colored background.

Figure 26C:
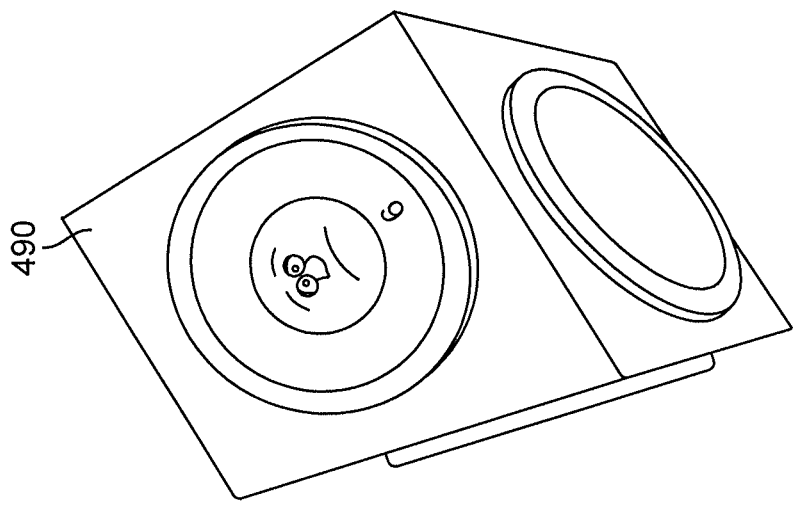
FIGS. 26A-26C illustrate an isometric view of different icons alone or configured as user selected activity tags for a machine readable patient state indicator 490.
Figure 26B:
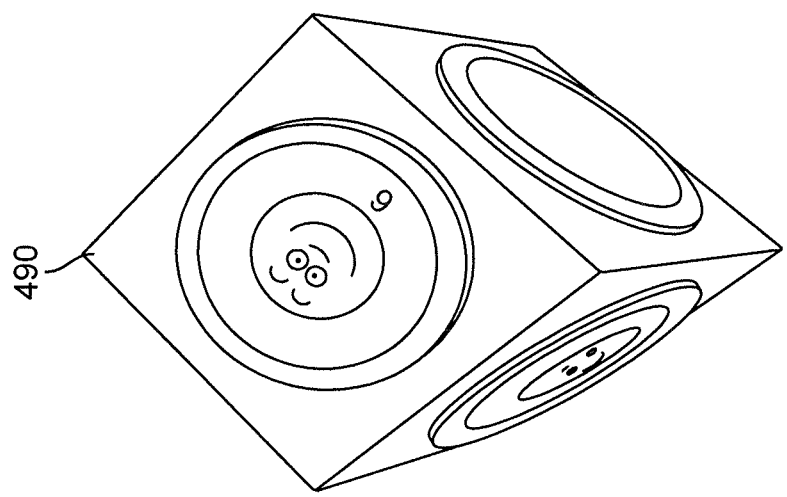
Figure 26A:
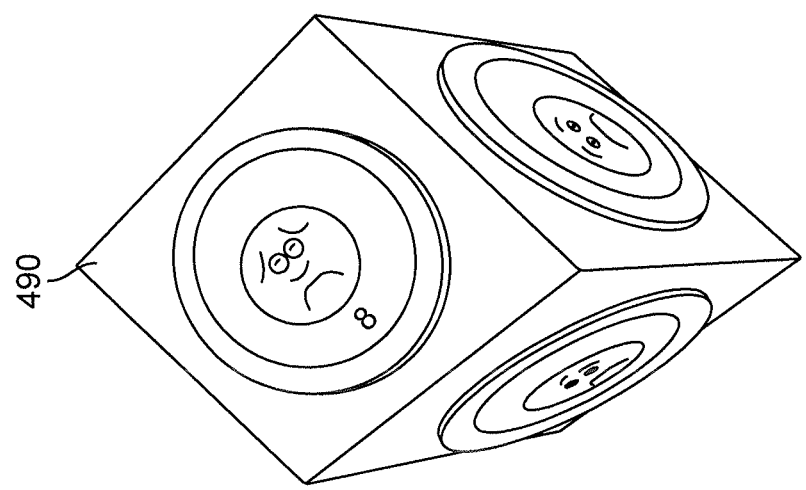

FIGS. 26A-26C illustrate an isometric view of different icons alone or configured as user selected activity tags for a machine readable patient state indicator 490. In this particular embodiment, the patient state indicator is a cube having different subjective patient states indicated on each or some of the faces. While illustrated as a cube, the patient state indicator may take on other shapes to have more or fewer faces to align with the desired number of subjective patient states or activities to be indicated. In a specific embodiment of FIGS. 26A-26C a patient state indicator 490 has been configured as a pain cube or pain dice embodiment. The icon for each side of the cube relates to one of a different pain level. In this embodiment, the pain levels are those illustrated and described in FIGS. 25A-25F, others may be used in different embodiments or to suit a specific user configuration. Each icon is associated with a unique machine readable element as described herein. As with previously described embodiments, there is also an adhesive base and machine readable element included on each base. The base and element may be separate elements or made as a single combined element. The patient state indicator may be configured whereby the patient state to be registered by the tag reader is face up or face down when the patient state indicator is past relative to the scanner. Machine readable element 14 associated with each indicated state is appropriately positioned depending upon the desired reader state used in a particular patient state indicator embodiment.

In the embodiment illustrated in FIG. 26A the level 8 pain icon is visible on the top face and two other icons are visible on the other two visible faces. FIG. 26B illustrate the machine readable patient state indicator 490 of FIG. 26A where the "level 0" face is on the upper surface and FIG. 26C illustrates the "level 6" face on the upper surface.

In one embodiment, an RFID sticker is attached to each face of a small cube (about 1.5" square face). In one aspect, conventional commercial adhesive labels are printed to include the six pain level faces, numbers and text. The printed pain face labels are attached to the RFID stickers each of which is encoded for the corresponding pain level—first sticker=0, second sticker=2, third sticker=6, etc. There are six pain levels and each one is associated with a single face of the die. Other pain scales with more or fewer level icons may be used along with those icons and machine readable elements attached to each unique face of a multi-sided object corresponding to the number of unique pain levels.

Exemplary machine readable patient state indicator 490 configured for a Pain Dice Use Case Each morning or at any time, a user of the activity monitoring system described herein presents the face of the pain dice that represents his current feeling of wellness to the scanner. The scanner records only the sticker of the face that is presented to it. The date and time that the sticker is read is recorded when the tag is detected. The action of presenting the appropriate face of the pain cube to the scanner then forms a historic record of the patient's level of pain/wellness. Thereafter, a user log, report, screen shot, dashboard or other update may include the scanned pain or wellness indication.

In one alternative configuration, the activity monitoring system or PillDrill system alert system detailed above may be modified to include notifications (e.g., text/voicemail/email/or in app alert) to a caregiver upon each scan of machine readable patient state indicator 490 or a user pain dice or wellness indicator. Providing detection occurrence of a unique face of the machine readable patient state indicator 490 allows the caregiver to know in real time the current self-reported state of wellness of the patient. Advantageously, this is of particular benefit in the context of a "fragile" patient. The addition of self-reported pain/wellness provides additional peace of mind to the caregiver over and above the earlier stated advantages of reporting/knowing that a user/patient has taken scheduled medications.

In yet another advantageous configuration, the machine readable patient state indicator 490 enables a very simple way for the patient to communicate his state of wellness to their caregiver. A user or patient need only position the relevant face of the machine readable patient state indicator 490 within range of the scanner or reader. This is particularly important in the context of the often complex psychological/emotional relationship that exists between patient and caregiver. Oftentimes, there is latent guilt in the patient that the caregiver is burdened by the patient's sub-optimal state and the patient's need to be monitored. Patients often feel obliged to pro-actively communicate their status to their caregiver but traditional means of doing so (e.g. telephone, email, text, etc.), often require significant time investment and effort on the part of the patient. The ease of use by the machine readable patient state indicator 490 profoundly changes that dynamic by requiring only a simple scan or wave of the dice in relation to the system scanner or reader. The caregiver instantly knows that the patient's self-reported wellness.

Figure 39:
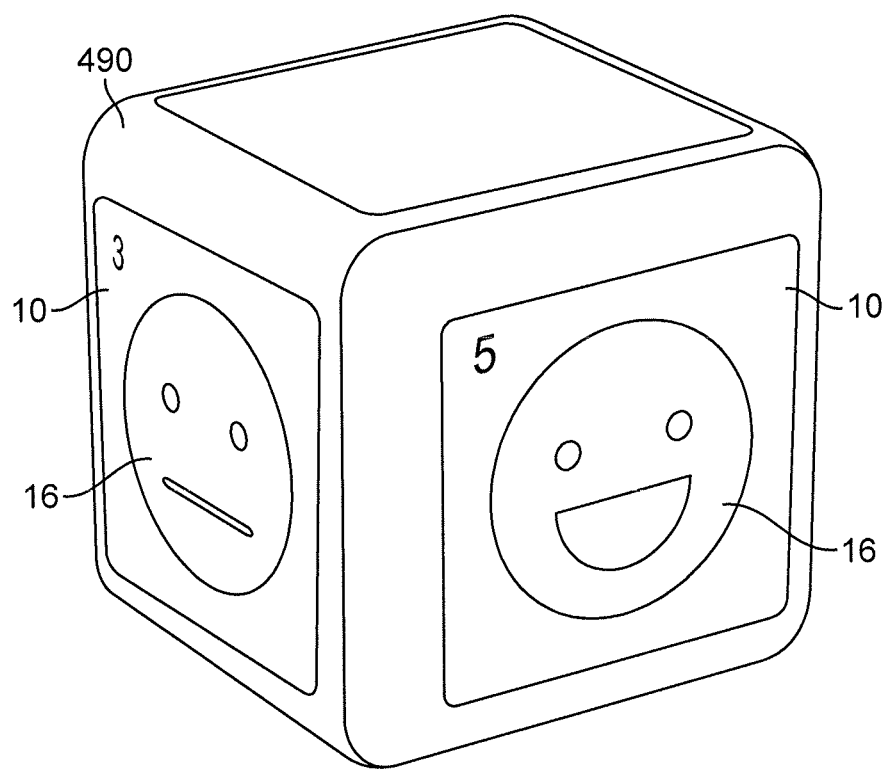
FIG. 39 illustrates an embodiment of a machine readable patient state indicator 490 using a number scale and simple facial expressions.
Figure 40:
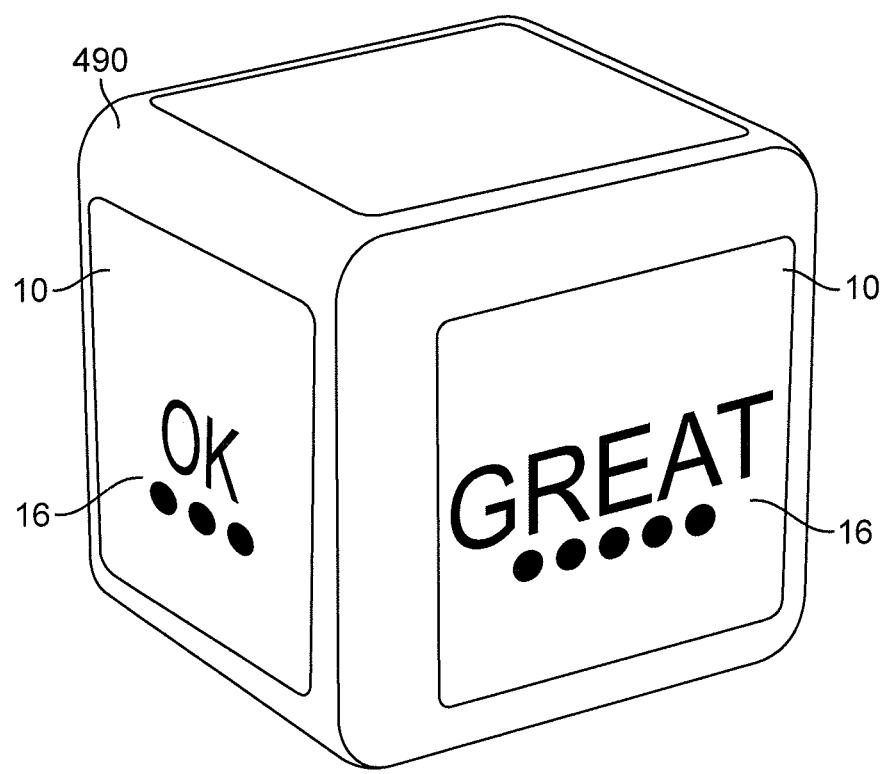
FIG. 40 illustrates another embodiment of a machine readable patient state indicator 490 using text and one or more dots or bumps or other tactile elements.

Wellness or mood may be provided by any of a number of different configurations of the patient state indicator 490. In contrast or addition to the pain scale (FIGS. 25A-26C), optional alternative patient states are illustrated in FIGS. 39 and 40. FIG. 39 illustrates an embodiment of a machine readable patient state indicator 490 using a number scale and simple facial expressions. FIG. 40 illustrates another embodiment of a machine readable patient state indicator 490 using text and one or more dots or bumps or other tactile elements. In the embodiment of FIG. 40, the patient state indicator 490 uses text descriptors such as OK, GREAT, FINE, GOOD or even expressions selected by the patient to indicate patient state. Also shown in the embodiment of FIG. 40, are a series of dots that correspond to the text descriptor. The dots also provide for a scale level to convert the text descriptor to a numerical value to aid in tracking wellness. Optionally, the series of dots shown in FIG. 40 may also be tactile or braille characters to enable use by visually impaired or blind users. Additionally or optionally, the characters of the text or portions of an image may be raised or textured for tactile perception to similarly aid in the use of the patient indicator 490 by visually impaired or blind users.

An added benefit of machine readable patient wellness indicator 490 is the added scanning activity by use of the indicator 490 also indicates that the user is still mobile and has not fallen or is otherwise incapacitated. In still another advantage, the regular use of the machine readable patient state indicator 490 will provide both the patient and the caregiver a more granular view on the patient's wellness.

Another additional benefit or advantage of an embodiment of the machine readable patient state indicator 490 is the correlation/trigger tracking. In one aspect, capturing a series of time stamped data points around how one is feeling (i.e., self-reported wellness) may also prove useful in the context of discerning triggers or correlation between actions and wellness. Since the activity monitoring system or PillDrill system allows one to track any physical action—e.g., eating a meal or snack, morning exercises, caffeine consumption, or other activity to be tracked to name a few—over time the recorded activities may also be correlate tracked actions with machine readable patient state indicator 490 records. One or more detected correlation patterns may provide information used to determine triggers or other factors useful in the care of the patient. One example would be an adverse reaction to certain medications. Consider an example where a patient self-reported wellness is plotted over a thirty day period. Alongside the self-reported wellness is the activity tracking information of one or more medicines. Analysis of these two data sets may reveal that within a certain period of time of taking a certain medication the patient recorded a machine readable patient state indicator 490 reading that was meaningfully worse than the user's typical reading. In still other aspects, a similar pattern matching could also identify actions (rather than medications) that caused meaningful changes in the patient's well-being. By way of example, if a patient records better machine readable patient state indicator 490 wellness on the days when he meditates or exercises than on days when they do not, then the wellness indication correlation may be used to reinforce the behaviors that lead to increased wellness. In a similar way, the recorded wellness indication may also be used to avoid those activities or combinations of activities that lead to lower wellness scores.

In still other aspects the concept of using an analog device to digitally record information about a user's wellness as exemplified by the machine readable patient state indicator 490 concept described above can be extended to the recordation of additional user information such as activity, duration of an activity, or other state or indication of being rather than just general wellness. In one aspect, a multiple sided device is provided where a user defined sticker is printed or provided alone for application along with a unique machine identifiable element or in combination with a unique machine identifiable element that corresponds to the activity or other indication that the user would like to have recorded along with other activity or dose information described herein. In one specific example, the user multiple sided block could be a symptom block or dice. The sides of the uniquely identifiable machine readable conditions may include, for example, one or more of cough, congestion, headache, fever, chills, diarrhea, sore throat, aches or exhaustion, for example, as a set of states of being when is suffering from a cold or flu. Other different states may be provided on a different symptom dice or block based on a different set of user states selected to correspond to a particular disease or disorder that a patient is suffering. In still another aspect, there may be a condition or symptom dice or multiple sided block that is keyed to a post-surgical recovery. In one example, a user who has undergone a joint replacement may indicate when cold therapy or physical therapy has been performed along with an indication of stiffness or swelling or pain relative to the joint or procedure.

In still another aspect, an embodiment of the activity or dose scheduling system described herein may be modified to permit a caregiver to respond to a notification from the system as described herein. Alternatively, the system may also allow a caregiver to send a notification within an app or within a website or mobile version of the activity or dose tracking system.

In one aspect, a version of the activity monitoring and tracking system is adapted and configured to provide a feedback loop closure between the user and the caregiver by permitting for easy confirmation or acknowledgement of an action (such as taking dose, scanning a wellness or symptom dice) from within an app or website or by replying or responding to an update or other report generated as described herein. In this way, when the patient scans for an action or wellness or symptom or activity indication, they may then be affirmed by the response from the caregiver who may provide encouragement or express sympathy, depending on the circumstances. By closing the loop on notification and caregiver feedback the user is provided a timely reward/acknowledgement from the caregiver (i.e., causing the immediate dopamine reward by closing the feedback loop on the indication, symptom, wellness or activity dice scanning process). It is believed that such action and reward behavior would give the user a better chance of the activity or dose monitoring system use to become a sticky habit.

Additionally or alternatively, an embodiment of a PillDrill app (i.e., an app designed to implement one or more of the above described activity or dose monitoring and reminding systems) is adapted and configured to enable a caregiver, with one tap, to acknowledge/respond to the scan from the wellness, activity, symptom or other indication dice or block. In one aspect, there is provided a set of icons in the app for this purpose. Any of a wide variety of pre-defined or user selected icons may be used, for example, a "thumbs up" symbol when the patient has declared himself feeling well, a "question mark" when the caregiver is unsure how to interpret the reading, or a "telephone" symbol to indicate the patient to call the caregiver. In particular with the machine readable patient state indicator 490, an additional benefit is that the user is removed from the stigma of feeling "I didn't want to bother you" burden that is often harbored by the patient with respect to the caregiver's busy life. As a result of ease of use for a caregiver to respond to a user indicated scan of wellness, activity, condition or symptom, a caregiver tapping any of the provided icons/symbols in the app in response to a condition scan would immediately send such symbol to the screen of the PillDrill device for viewing by the patient. In still further aspects, the app is adapted and configured to include additional actions/symbols/comments that can be triggered by the caregiver from the app that will also appear in real time on the PillDrill device for viewing by the patient. In one simple example, there is a feature enabling the re-sending of on-device medication reminders by the caregiver based on a missed dosage alert received by the caregiver.

Figure 27:
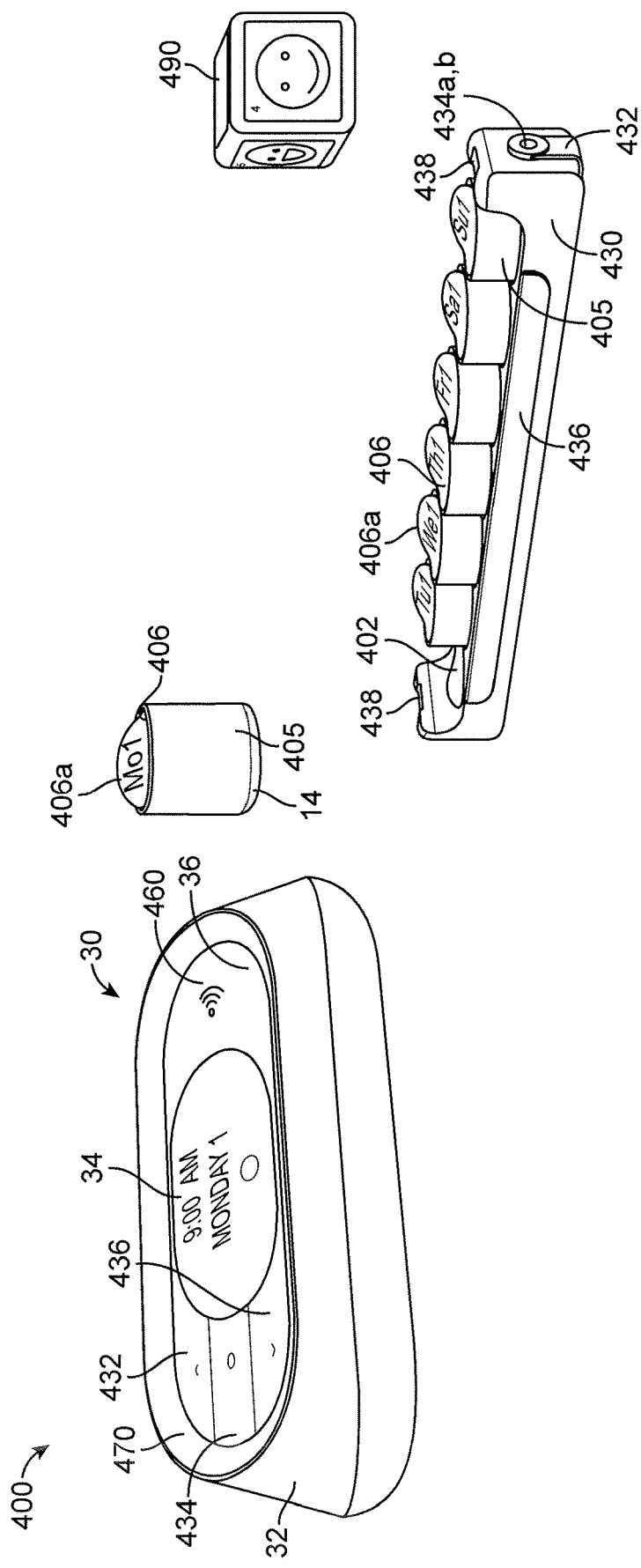
FIG. 27 is a perspective view of a tracking system 400 having an activity tag reader 30, a tray 430 containing seven machine readable containers 405 and a machine readable patient wellness indicator 490.

FIGS. 27-40 provide various views and details of an exemplary user activity tracking system 400. FIG. 27 is a perspective view of a tracking system 400 having an activity tag reader 30, a tray 430 containing seven machine readable containers 405 and a machine readable patient wellness indicator 490. In one embodiment, a user activity tracking system 400 includes an activity tag reader 30 a tray 430 including a number of receivers 402 adapted and configured to receive a corresponding number of uniquely identified containers 405. Each one of the containers 405 includes a unique activity tag 10. Optionally, a machine readable user state indicator 490 is also provided.

The activity tag reader 30 illustrated in FIG. 27 is configured similar to other tag readers described herein. In this embodiment of the activity tag reader 30 there is an oblong body 32 that includes a display 34 on a top angled surface. The display 34 has an oval shape and is flanked on either side by the scanner 36 and the user interaction buttons 432, 434 and 436. A tag scanner 36 is provided on the right-hand side of the device. A scanner icon for 60 is provided to indicate the location where a user may position an activity tag to enable the activity tag to be scanned by the tag reader 30. A bezel 470 surrounds the user interaction buttons 432, 434, 436 the display 34 and the scanner 36 and forms of upper boundary of the activity tag reader 30. In operation, the bezel may be lighted, flash or provide other visual indications that correspond to the operation of or warnings or feedback provided by the activity monitoring system. In some embodiments, the lighted operation of the bezel corresponds to a sound emitted from speaker contained within the activity tag reader 30. The lights and sounds emitted by the activity tag reader 30 may correspond to any of the above disclosed operating features, warnings, reminders or adherence and compliance features described herein.

Figure 28:
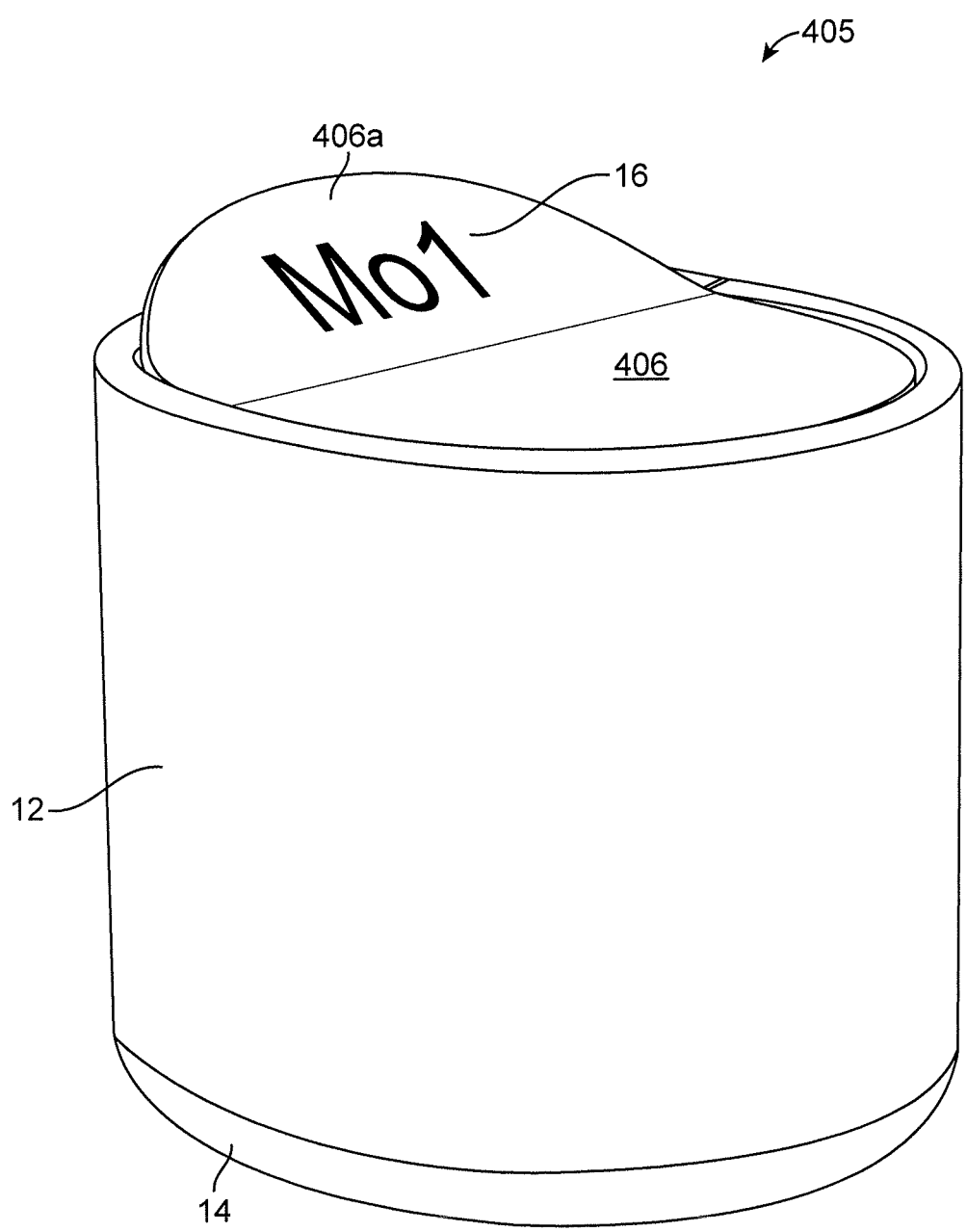
FIG. 28 is a perspective view of a machine readable container 405.
Figure 29:
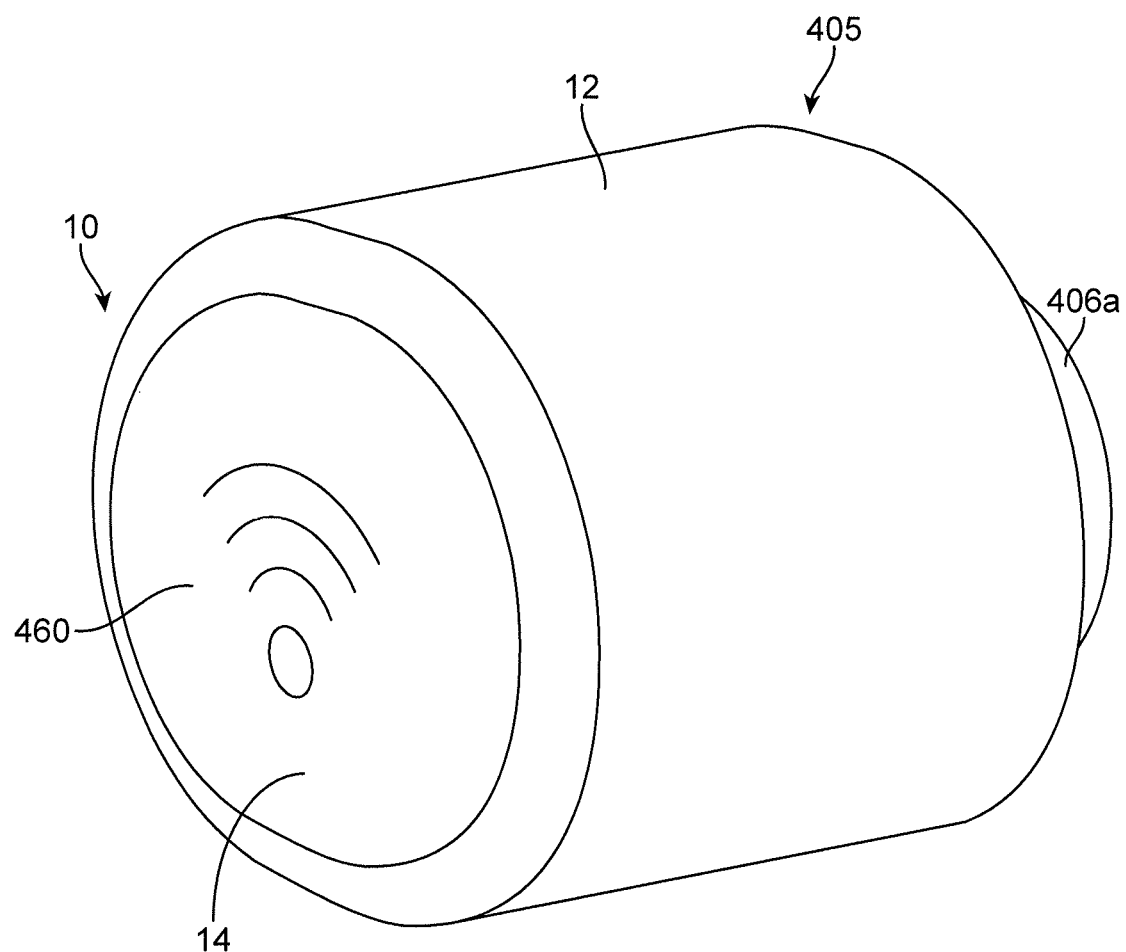
FIG. 29 is a bottom-up view of the machine readable container 405 of FIG. 28.
Figure 30:
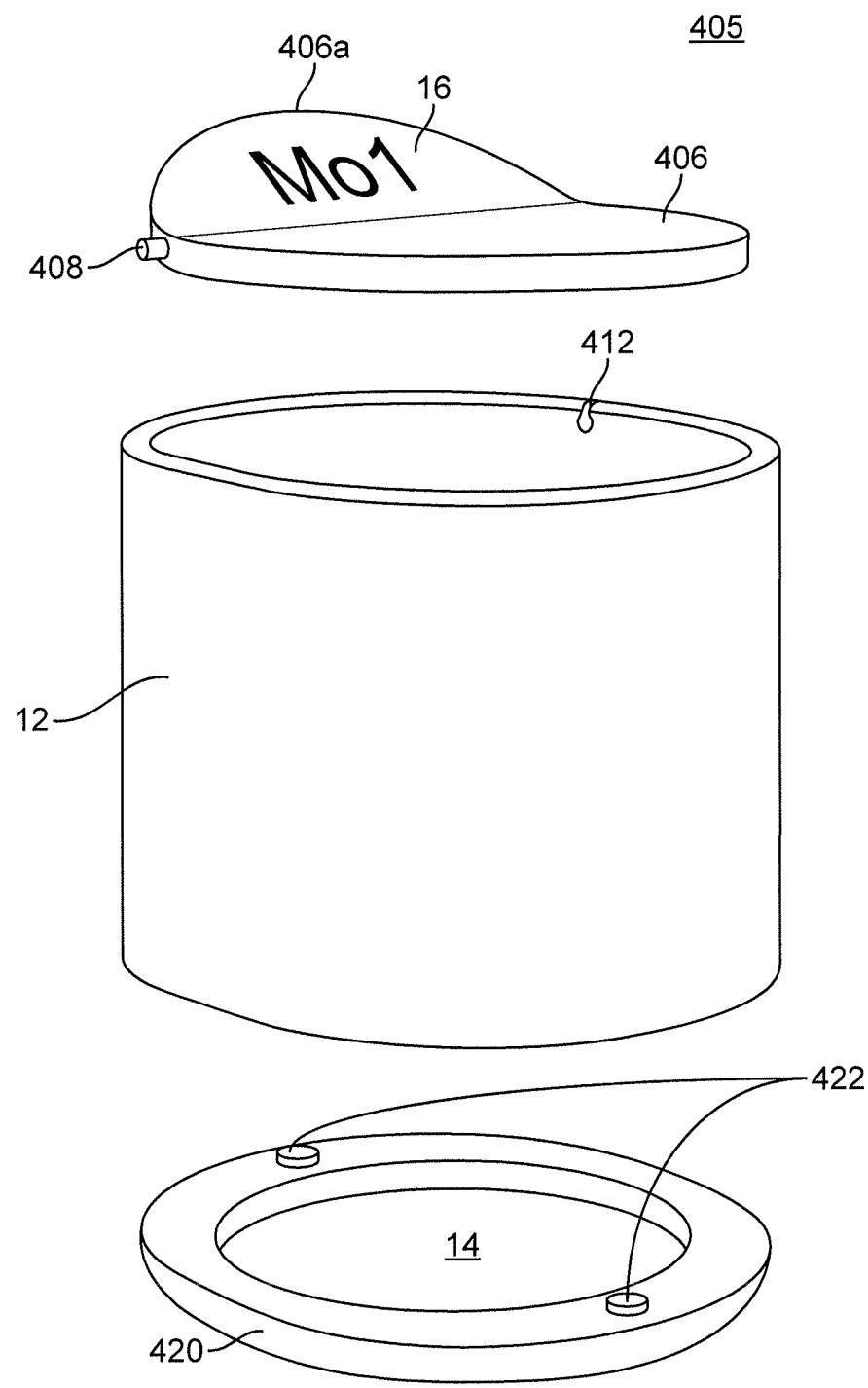
FIG. 30 is an exploded view of a machine readable container 405 of FIG. 28 showing the relative positions of a lid 405, a body 12 and a base 420.
Figure 31:
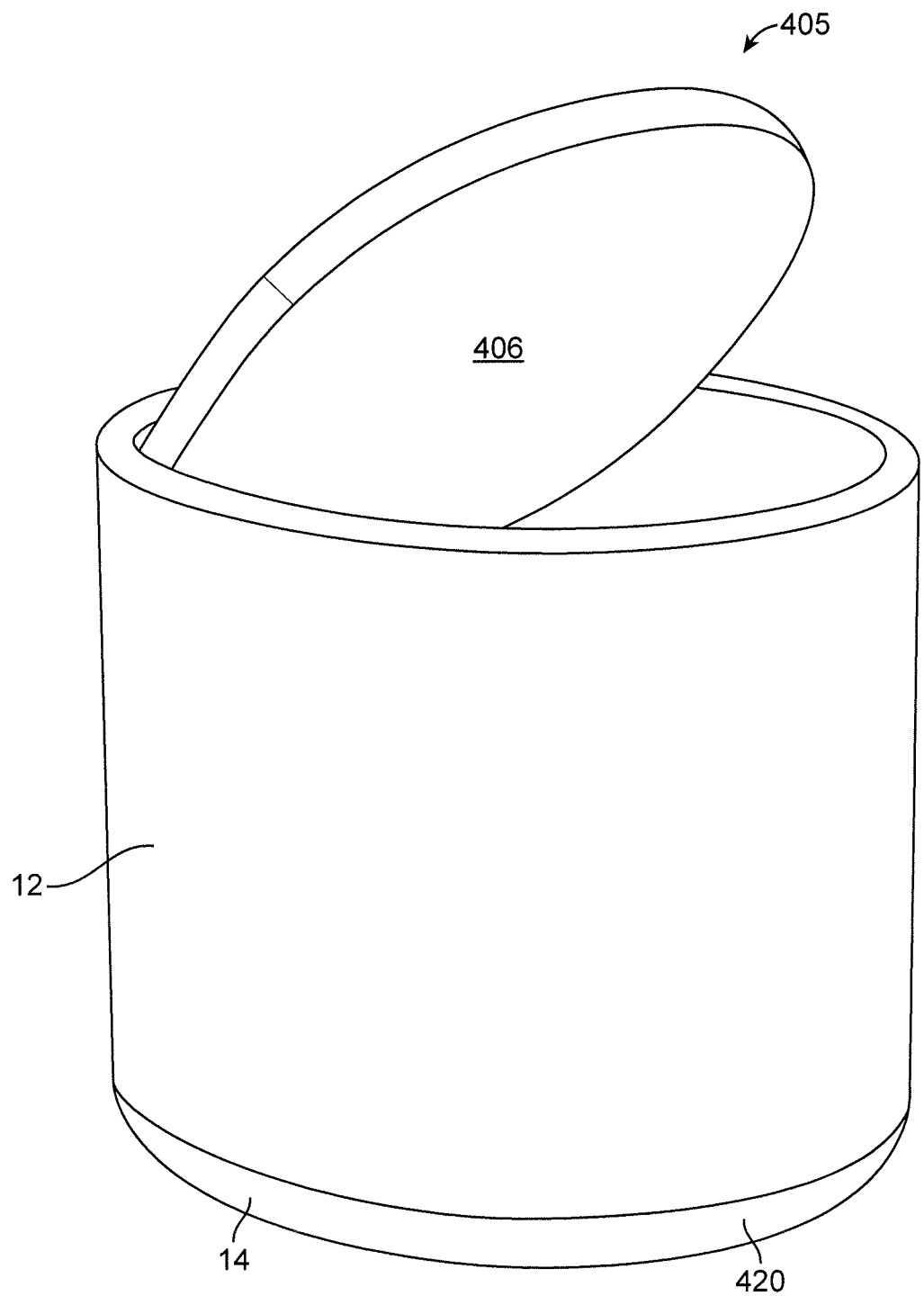
FIG. 31 is a perspective view of the machine readable container 405 with the lid 406 in the open position.

Additional details of a machine readable container 405 shown in FIG. 27 may be appreciated with reference to the various views illustrated in FIGS. 28, 29, 30, and 31. FIG. 28 is a perspective view of a machine readable container 405. FIG. 29 is a bottom-up view of the machine readable container 405 of FIG. 28. FIG. 30 is an exploded view of a machine readable container 405 of FIG. 28 showing the relative positions of a lid 405, a body 12 and a base 420. FIG. 31 is a perspective view of the machine readable container 405 with the lid 406 in the open position. The container 405 includes a hollow cylindrical base 12. A lid 406 closes off the interior of the base 12. The lid 406 includes a raised portion 406a used to open the lid and expose the interior. The raised portion 406a is positioned relative to machine readable container 405 is shown in the open condition in FIG. 31. As best seen in the exploded view of FIG. 30 the lid 406 includes a pair of pins 408 sized for a friction fit into suitably sized recesses 412 in the interior of the container body. The raised portion 406a sized and positioned relative to the pin 408 to provide for an easy to operate snap open hinge.

The unique activity tag 14 associated with the machine readable container 405 is located in the base 420 is best seen in the exploded view of FIG. 30. The bottom view of FIG. 29 shows an embodiment of an icon 16 indicating the position of the machine readable element 14. Scanning icon illustrated in FIG. 29 identifies the location of the portion of the container 405 that is to be positioned adjacent to the scanner 36 of the activity tag reader 30 in order for the container to be read by the activity tracking system.

Figure 32:
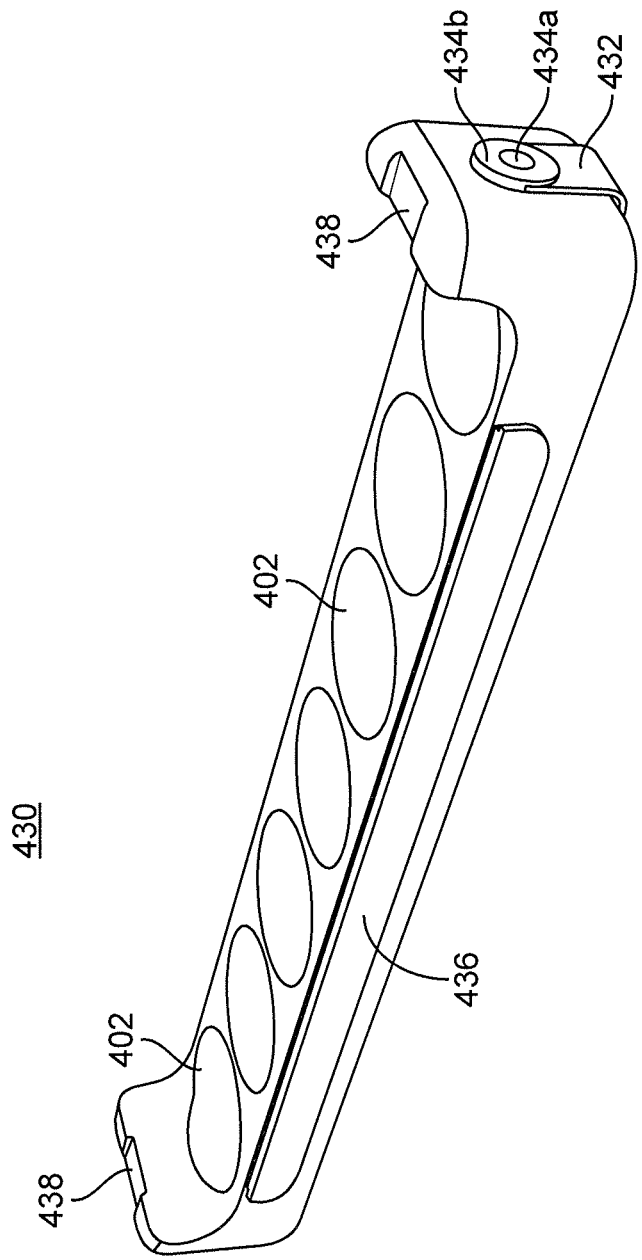
FIG. 32 is a perspective view of the tray 430 having a plurality of sockets 402 sized to hold a container 405.
Figure 33:
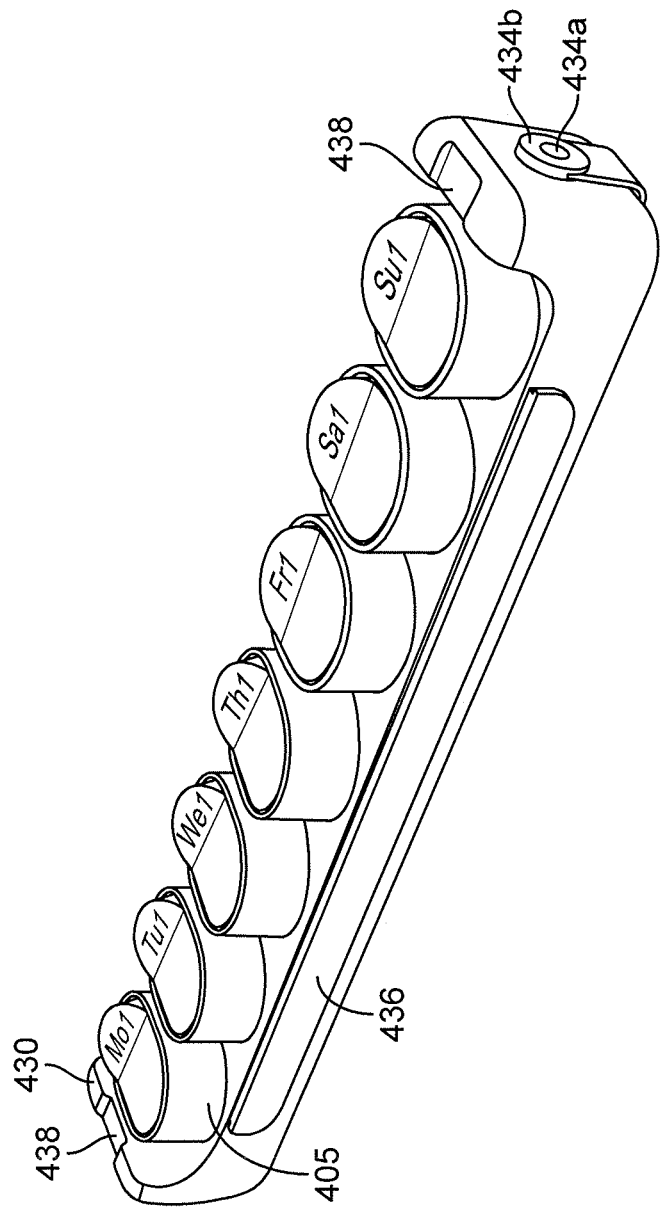
FIG. 33 illustrates a view of a tray 430 configured for use with the machine readable container 405.
Figure 34:
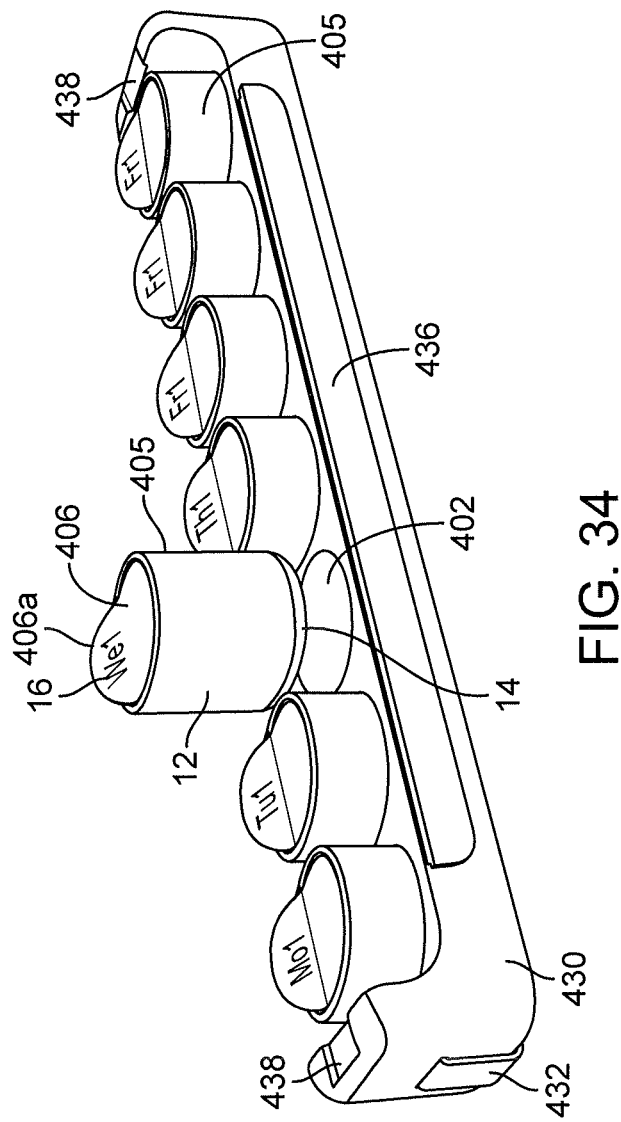
FIG. 34 is a perspective view of a tray 430 loaded with seven machine readable containers 405 with one machine readable container (i.e., with icon We1) removed from its socket 402.
Figure 35:
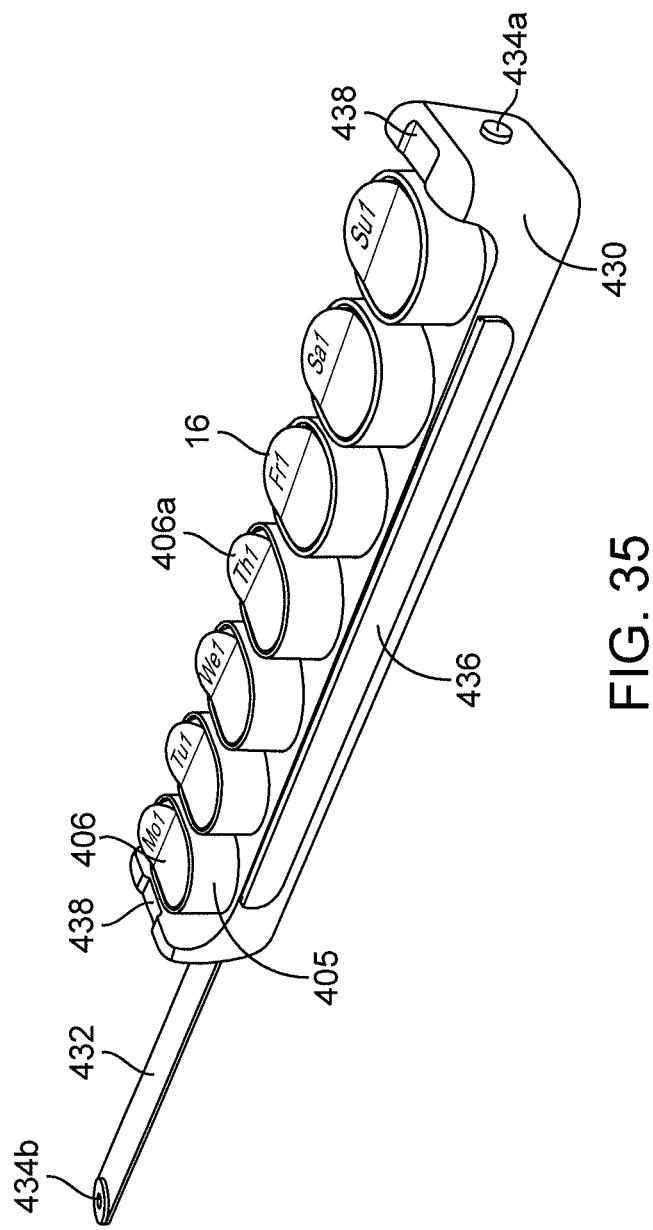
FIGS. 35 and 36 illustrate the use of a strap to secure the plurality of machine readable containers within the tray.
Figure 36:
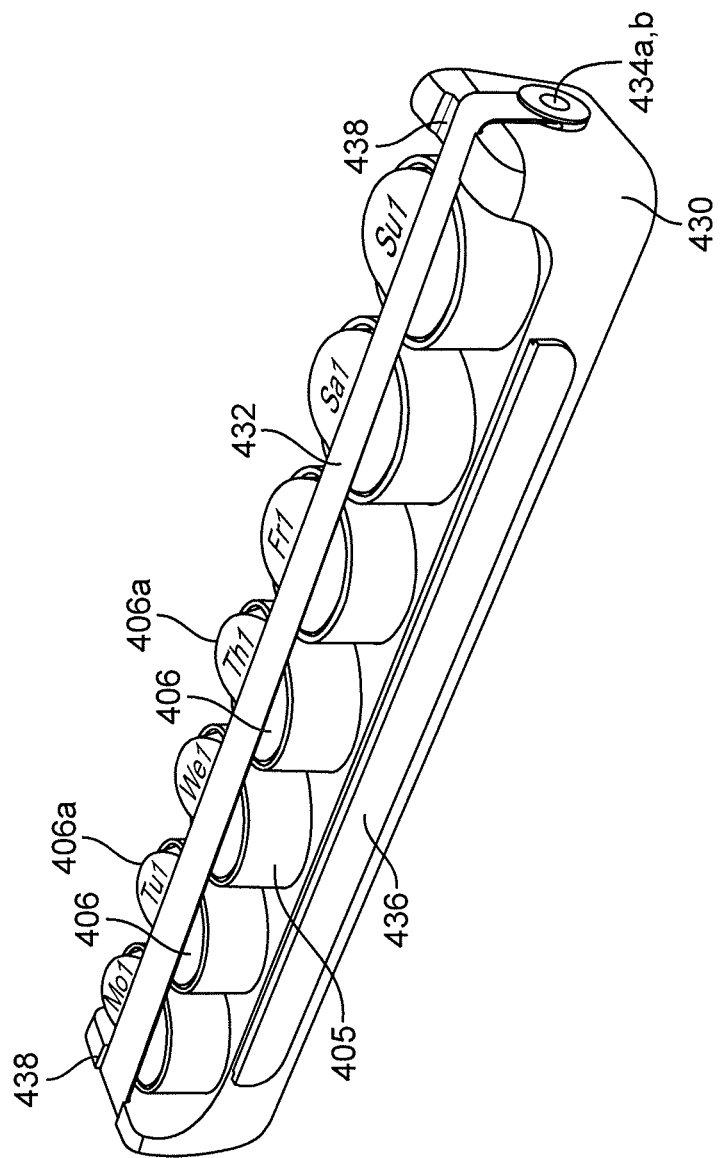

FIGS. 32, 33, 34, 35 and 36 illustrate various views of a tray 430 configured for use with the machine readable container 405. FIG. 32 is a perspective view of the tray 430 having a plurality of sockets 402 sized to hold a container 405. In this illustrated embodiment there are seven sockets 402 configured for one week of daily pill activity tracking. A strap 432 is provided along the length of the container tray 430 held in place by a snap closure 434 a, b. FIGS. 35 and 36 illustrate the use of a strap to secure the plurality of machine readable containers within the tray. As best seen in FIG. 35, the snap closure 434b is released from snap closure 434a the strap 432 is extended. Thereafter, the strap 432 is placed within the recess 438 at each end of the tray 430 and across the lid 406 of each of the machine readable containers 405 within the tray 430. (FIG. 36). The container or 05 height and dimensions of lid 406 are adapted and configured for cooperation with the strap and recesses or 38 of tray 430. In this configuration, the snap closure 434 *a, b* is closed with strap 432 securing the containers 405 in place within sockets 402 of tray 430. The strap extends from one end of the tray through a recess, across the lid of each container, another recess and is then secured back to the end of the tray.

FIG. 34 is a perspective view of a tray 430 loaded with seven machine readable containers 405 with one machine readable container (i.e., with icon We1) removed from its socket 402. In one aspect, the tray 430 and the plural sockets 402 are provided simply as a convenient container for holding machine readable containers 405. In an alternative embodiment, the tray 430 may be configured to include a detector or an indicator within each socket 402 used to detect removal, placement, removal/replacement or correct placement of a machine readable container 405. Additionally, the tray 430 may include a processor or controller adapted and configured to detect the operation of the socket indicators and to provide wired or wireless communication of the operation of the socket detectors to the activity tag reader 30. In this way the tray 430 may also provide an additional check for example of missing container or if the container was removed but a corresponding swipe was not captured by the activity tag reader 30 then the system may provide an alarm, reminder or other indication as described herein.

Figure 37:
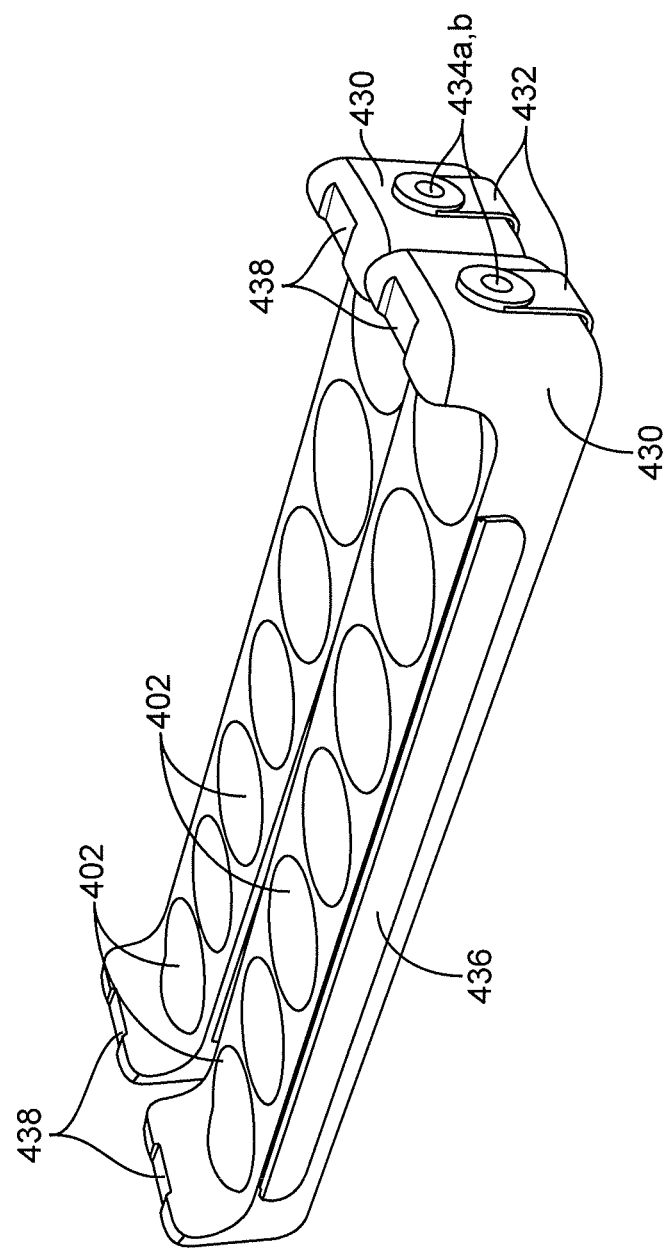
FIGS. 37 and 38 illustrate two trays 430 joined using adjacent complementary elements or 36 with empty sockets 402 (FIG. 37) and sockets containing machine readable containers 405 (FIG. 38).
Figure 38:
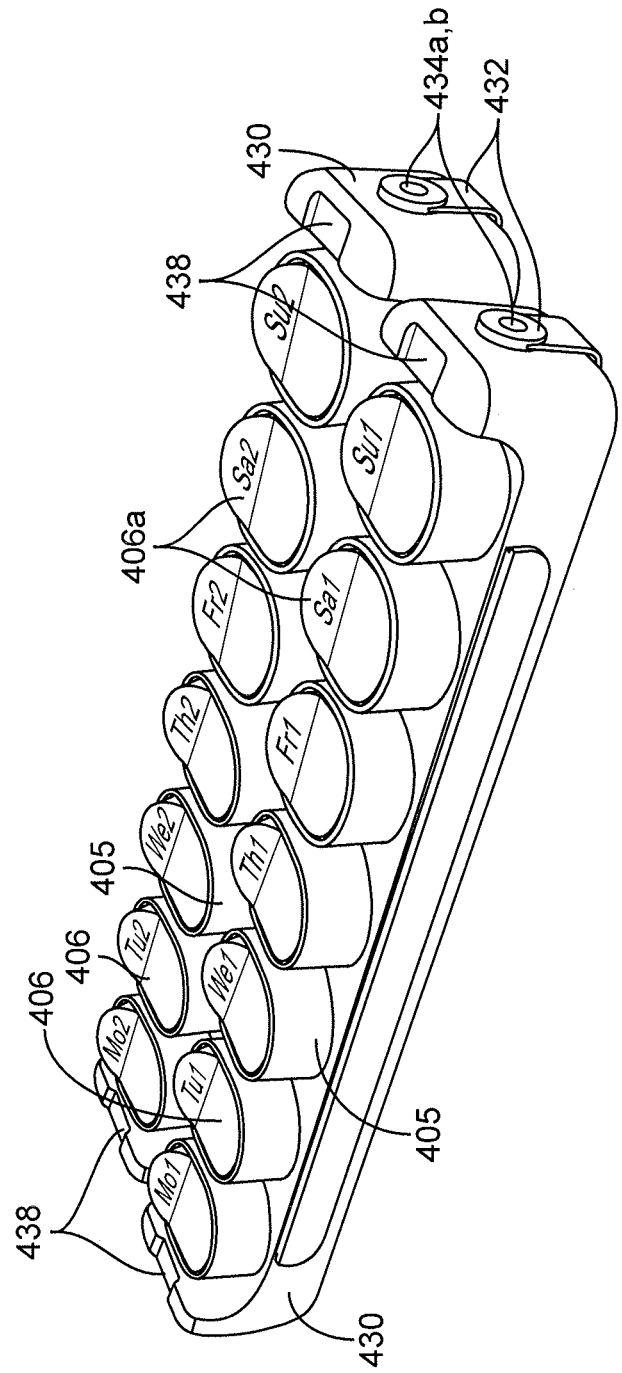

The tray 430 also includes a cooperative attachment component 436 that extends along the lateral sides. The cooperative attachment component 436 may be used to couple together two, three or more trays 430. FIGS. 37 and 38 illustrate two trays 430 joined using adjacent complementary elements or 36 with empty sockets 402 (FIG. 37) and sockets containing machine readable containers 405 (FIG. 38). The operation of a pair of cooperative attachment components 436 may include any of a wide variety of releasable coupling techniques such as snap fit, friction fit, dovetail, Velcro (i.e., hook and loop) with sufficient strength to maintain the adjacent relative position of the trays 430. FIG. 38 illustrates a perspective view of a pair of coupled trays 430. One tray 430 is loaded with containers 405 for use on a first daily dose (i.e., icons Mo1, Tu1, We1, Th1, Fr1, Sa1, Su1) and the other tray 430 loaded with containers 405 for use in a second daily dose (i.e., icons Mo2, Tu2, We2, Th2, Fr2, Sa2, Su2).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more."

We claim:

1. An activity tag reader, comprising:
    a housing having a surface;
    a display on the surface of the housing;
    a scanner within the housing below the surface of the housing adapted and configured to detect a machine readable activity tag element positioned above the surface of the housing in proximity to the portion of the housing containing the scanner;
    an icon on the surface of the housing to indicate a position of the scanner beneath the surface within the house;
    a computer within the housing in communication with the scanner and the display including computer readable instructions to change the display in response to a detection of the machine readable activity tag element by the scanner; and
    a bezel that forms an upper boundary of the activity tag reader around a portion of the surface of the housing containing the display and the icon, the bezel is in electronic communication with and responsive to electronic signals from the computer, wherein the bezel is configured to provide visual indications corresponding to operation, warnings, or feedback provided by the activity tag reader.

2. The activity tag reader of claim 1 further comprising a plurality of user interaction buttons on the surface of the housing.

3. The activity tag reader of claim 1 wherein the scanner is positioned within the housing below the surface of the housing on one side of the display and a plurality of user interaction buttons are positioned within on the surface of the housing on the opposite side of the display.

4. The activity tag reader of claim 3, wherein the bezel extends around the surface forming a bezel defined perimeter of the housing wherein the display, the user interaction buttons and the icon on the surface of the housing to indicate the position of the scanner are within the bezel defined perimeter.

5. The activity tag reader of claim 4 wherein a bezel color change occurs and is adapted and configured to change colors in response to instructions from the computer.

6. The activity tag reader of claim 1 wherein the computer readable instructions include computer readable instructions for displaying a unique icon on the display for each one of a predetermined number of states based on an interaction of a unique machine readable activity tag element with the scanner.

7. The activity tag reader of claim 1 wherein the computer readable instructions include computer readable instructions for displaying a unique icon on the display for each one of four predetermined activity status states of a user activity associated with the machine readable activity tag element.

8. The activity tag reader of claim 7 wherein the four predetermined status states of a user activity are a completed scheduled activity, an uncompleted future activity, an incomplete scheduled activity and an additional unscheduled activity.

9. The activity tag reader of claim 8 wherein the four predetermined activity status states of a user activity are associated with the user activity of the user taking one or more pills.

10. The activity tag reader of claim 7 wherein a bezel color change changes colors is responsive to each one of the four predetermined activity status states of the user activity in response to instructions from the computer as a result of an interaction between the machine readable activity tag element and the scanner.

11. The activity tag reader of claim 1 wherein the machine readable activity tag element contains less than 8 bits of data.

12. The activity tag reader of claim 1 wherein the machine readable activity tag element contains about 1 one bit of data.

13. The activity tag reader of claim 1 wherein the machine readable activity tag element contains only data used to associate the machine readable activity tag element with a user selected activity tag.

14. The activity tag reader of claim 1 wherein the machine readable activity tag element contains only data used to associate the machine readable activity tag element with a user selected icon.

15. The activity tag reader of claim 1 wherein the bezel changes color or the activity tag reader emits a sound when the scanner interacts with a machine readable activity tag element.

16. The activity tag reader of claim 15 wherein the bezel changes color to a unique color selected to identify with a preselected user activity status wherein a preselected user activity status is one or more of an indication of wellness, completion of an activity, or degree of adherence to a schedule of activities.

17. The activity tag reader of claim 15 wherein the sound emitted by the activity tag reader changes sounds to a unique sound selected to identify with a preselected user activity status wherein a preselected user activity status is one or more of an indication of wellness, completion of an activity, or degree of adherence to a schedule of activities.

18. The activity tag reader of claim 6 wherein a preselected user activity status is one or more of an indication of wellness, completion of an activity, or degree of adherence to a schedule of activities.

19. The activity tag reader of claim 6 wherein the predetermined number of states correspond to a subjective characteristic of the user.

20. The activity tag reader of claim 1 the computer readable instructions including instructions for presenting a unique icon on the display for each one of a predetermined number of activity states associated with an activity utilizing an object coupled to the unique machine readable activity tag element.

21. The activity tag reader of claim 20 wherein each one of the predetermined number of activity states associated with an activity utilizing the object relate to a scheduled use of the object.

22. The activity tag reader of claim 1 further comprising a six sided object having a unique icon and an associated machine readable tag on each of the six sides wherein when one of the six associated machine readable tags is positioned within range of the scanner, the activity tag reader includes computer readable instructions to indicate a unique subjective user state associated with the unique icon on one of the six sides.

23. The activity tag reader of claim 1 the computer readable instructions further comprising recognizing an indication of a subjective user condition when a surface of a multisided object is placed within range of the scanner.

24. The activity tag reader of claim 23 wherein the indication of a subjective user condition relates to one or more of a user's mood, mental state, wellness or tracked characteristic.

* * * * *